United States Patent
Ouchi et al.

(10) Patent No.: US 11,997,048 B2
(45) Date of Patent: May 28, 2024

(54) TERMINAL APPARTUS AND METHOD

(71) Applicants: SHARP KABUSHIKI KAISHA, Sakai (JP); FG Innovation Company Limited, Tuen Mun (HK)

(72) Inventors: Wataru Ouchi, Sakai (JP); Toshizo Nogami, Sakai (JP); Daiichiro Nakashima, Sakai (JP); Shoichi Suzuki, Sakai (JP); Tomoki Yoshimura, Sakai (JP); Taewoo Lee, Sakai (JP); Huifa Lin, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 440 days.

(21) Appl. No.: 17/289,967

(22) PCT Filed: Nov. 1, 2019

(86) PCT No.: PCT/JP2019/043046
§ 371 (c)(1),
(2) Date: Apr. 29, 2021

(87) PCT Pub. No.: WO2020/091049
PCT Pub. Date: May 7, 2020

(65) Prior Publication Data
US 2022/0014337 A1    Jan. 13, 2022

(30) Foreign Application Priority Data
Nov. 1, 2018 (JP) .................................. 2018-206554

(51) Int. Cl.
*H04L 5/00* (2006.01)
*H04W 74/0808* (2024.01)

(52) U.S. Cl.
CPC ....... *H04L 5/0057* (2013.01); *H04W 74/0808* (2013.01)

(58) Field of Classification Search
CPC ............ H04L 5/0057; H04W 74/0808; H04W 16/14; H04W 24/10
See application file for complete search history.

(56) References Cited

U.S. PATENT DOCUMENTS

2018/0160405 A1    6/2018  Akkarakaran et al.
2018/0302203 A1   10/2018  Kim et al.
(Continued)

FOREIGN PATENT DOCUMENTS

| CN | 106105303 A | 11/2016 |
| CN | 106899395 A | 6/2017 |
| JP | 2018-526928 A | 9/2018 |

OTHER PUBLICATIONS

3GPP TS 38.212 V15.3.0 (Sep. 2018), 3rd Generation Partnership Project; Technical Specification Group Radio Access Network; NR; Multiplexing and channel coding (Release 15).
(Continued)

*Primary Examiner* — Jung H Park
(74) *Attorney, Agent, or Firm* — ScienBiziP, P.C.

(57) ABSTRACT

A terminal apparatus and a method are provided. The terminal apparatus includes a receiver configured to receive at least a channel state information-reference signal (CSI-RS) in a bandwidth part (BWP), a measurer configured to measure and evaluate one or more values of a channel quality indicator (CQI) by using at least the CSI-RS, the CQI including a wideband CQI or a subband CQI, and to measure and update a value of the wideband CQI in a case that an indicator, corresponding to the BWP, indicates the wideband CQI, and at least one of a first condition and a second condition is not satisfied, and a transmitter configured to
(Continued)

Priority 0:
Part 2 wideband CSI for CSI reports 1 to $N_{Rep}$

Priority 1:
Part 2 subband CSI of even subbands for CSI report 1

Priority 2:
Part 2 subband CSI of odd subbands for CSI report 1

Priority 3:
Part 2 subband CSI of even subbands for CSI report 2

Priority 4:
Part 2 subband CSI of odd subbands for CSI report 2

⋮

Priority $2N_{Rep}-1$:
Part 2 subband CSI of even subbands for CSI report $N_{Rep}$ Priority $2N_{Rep}$:
Part 2 subband CSI of odd subbands for CSI report $N_{Rep}$ transmit a CSI report including the value of the wideband CQI.

6 Claims, 14 Drawing Sheets

(56) References Cited

U.S. PATENT DOCUMENTS

| | | | | |
|---|---|---|---|---|
| 2019/0166625 | A1* | 5/2019 | Nam | H04L 1/0058 |
| 2020/0153541 | A1* | 5/2020 | Faxér | H04L 1/0026 |
| 2020/0177254 | A1* | 6/2020 | Lee | H04W 76/27 |
| 2021/0235487 | A1* | 7/2021 | Park | H04L 1/0068 |
| 2021/0391964 | A1* | 12/2021 | Kwak | H04L 27/26 |

OTHER PUBLICATIONS

Qualcomm Incorporated, "TxOP Frame Structure for NR unlicensed", R1-1811249, 3GPP TSG RAN WG1 Meeting #94bis, Chengdu, China, Oct. 8-Oct. 12, 2018.

Ericsson, "Summary of views on CSI reporting v4", R1-1812015, 3GPP TSG-RAN WG1 Meeting #94bis, Chengdu, P.R. China, Oct. 6-12, 2018.

Nokia Siemens Networks, Nokia, "CQI format to facilitate eNode-B link adaptation", 3GPP TSG RAN WG1 #50-bis Meeting Shanghai, Oct. 8-12, 2007, R1-074352, Paragraphs [0001] to [0003].

Ericsson, "Agreements on value ranges for Physical layer parameters", 3GPP TSG-RAN WG2 #63 Jeju, South Korea, Aug. 18-22, 2008, R2-084877, paragraph [0002].

NTT Docomo, "New SID proposal: Study on New Radio Access Technology," RP-160671, 3GPP TSG RAN Meeting #71, Goteborg, Sweden, Mar. 7-10, 2016.

3GPP TR 38.889, "3rd Generation Partnership Project; Technical Specification Group Radio Access Network; Study on NR-based access to unlicensed spectrum; (Release 15)", V0.0.2 (May 2018).

R1-1807617, Qualcomm Incorporated, 3GPP TSG RAN WG1 Meeting # 93, Busan, Korea, May 21-25, 2018.

* cited by examiner

Figure A: Number of OFDM symbols per slot, slots per frame, and slots per subframe for normal cyclic prefix.

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure B: Number of OFDM symbols per slot, slots per frame, and slots per subframe for extended cyclic prefix.

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2

| PUCCH format | Length in OFDM symbols $N^{PUCCH}_{symb}$ |
|---|---|
| 0 | 1 - 2 |
| 1 | 4 - 14 |
| 2 | 1 - 2 |
| 3 | 4 - 14 |
| 4 | 4 - 14 |

FIG. 4

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command; for reporting on PUSCH, the UE receives triggering on DCI | Triggered by DCI; additionally, activation command |
| Semi-Persistent CSI-RS | Not supported | For reporting on PUCCH, the UE receives an activation command; for reporting on PUSCH, the UE receives triggering on DCI | Triggered by DCI; additionally, activation command |
| Aperiodic CSI-RS | Not supported | Not supported | Triggered by DCI; additionally, activation command |

FIG. 11

| Bandwidth part [PRBs] | Subband size [PRBs] |
|---|---|
| < 24 | N/A |
| 24 - 72 | 4, 8 |
| 73 - 144 | 8, 16 |
| 145 - 275 | 16, 32 |

FIG. 12

Priority 0:
Part 2 wideband CSI for CSI reports 1 to $N_{Rep}$

Priority 1:
Part 2 subband CSI of even subbands for CSI report 1

Priority 2:
Part 2 subband CSI of odd subbands for CSI report 1

Priority 3:
Part 2 subband CSI of even subbands for CSI report 2

Priority 4:
Part 2 subband CSI of odd subbands for CSI report 2

⋮

Priority $2N_{Rep}-1$:
Part 2 subband CSI of even subbands for CSI report $N_{Rep}$ Priority $2N_{Rep}$:
Part 2 subband CSI of odd subbands for CSI report $N_{Rep}$

FIG. 13

TERMINAL APPARTUS AND METHOD

CROSS-REFERENCE TO RELATED APPLICATION(S)

This application is a national stage application of International Patent Application PCT/JP2019/043046, filed Nov. 1, 2019, now published as WO/2020/091049. International Patent Application PCT/JP2019/043046 claims the benefit of JP Patent Application 2018-206554, filed Nov. 1, 2018. JP Patent Application 2018-206554 and International Patent Application PCT/JP2019/043046, now published as WO/2020/091049, are incorporated herein by reference.

TECHNICAL FIELD

The present disclosure relates to a terminal apparatus and a method.

BACKGROUND ART

In the 3$^{rd}$ Generation Partnership Project (3GPP), a radio access method and a radio network for cellular mobile communications (hereinafter referred to as "Long Term Evolution (LTE)" or "Evolved Universal Terrestrial Radio Access (EUTRA)") have been studied. In LTE, a base station apparatus may also be referred to as an evolved NodeB (eNodeB), and a terminal apparatus may also be referred to as a user equipment (UE). LTE is a cellular communication system in which multiple areas are deployed in a cell structure, with each of the multiple areas being covered by a base station apparatus. A single base station apparatus may manage one or multiple serving cells.

3GPP has been studying a next generation radio communication standard (New Radio (NR)) (NPL 1) to make a proposal for International Mobile Telecommunication (IMT)-2020, a standard for a next-generation mobile communication system, standardized by the International Telecommunication Union (ITU). NR is required to satisfy requirements for three scenarios including enhanced Mobile BroadBand (eMBB), massive Machine Type Communication (mMTC), and Ultra Reliable and Low Latency Communication (URLLC) in a single technology framework.

Further, NR-Unlicensed (NR-U), which is a radio communication scheme and/or a radio communication system applying NR Radio Access Technology (NR-RAT) to an unlicensed frequency band (unlicensed band, unlicensed spectrum), has been reviewed (NPL 2).

CITATION LIST

Non Patent Literature

NPL 1: "New SID proposal: Study on New Radio Access Technology," RP-160671, NTT DOCOMO Inc., 3GPP TSG RAN Meeting #71, Goteborg, Sweden, 7th to 10 Mar. 2016.

NPL 2: "TR38.889 v0. 0. 2 Study on NR—based Access to Unlicensed Spectrum", R1-1807617, Qualcomm Incorporated, 3GPP TSG RAN WG1 Meeting #93, Busan, Korea, 21-25 May, 2018.

SUMMARY OF DISCLOSURE

Technical Problem

One aspect of the present disclosure provides a terminal apparatus capable of efficiently performing communication and a method used for the terminal apparatus.

Solution to Problem (1) According to a first aspect of the present disclosure, a terminal apparatus is provided. The terminal apparatus includes a receiver configured to receive at least a channel state information-reference signal (CSI-RS) in a bandwidth part (BWP); a measurer configured to measure and evaluate one or more values of a channel quality indicator (CQI) by using at least the CSI-RS, the CQI including a wideband CQI or a subband CQI, the measurer further configured to measure and update a value of the wideband CQI in a case that an indicator, corresponding to the BWP, indicates the wideband CQI, and at least one of a first condition and a second condition is not satisfied; and a transmitter configured to transmit a CSI report including the value of the wideband CQI. The first condition is that the BWP is in an unlicensed carrier and a plurality of Listen Before Talk (LBT) subbands are configured in the BWP, and the second condition is that an LBT failure is indicated for at least one LBT subband among the plurality of LBT subbands.

(2) According to a second aspect of the present disclosure, in the terminal apparatus according to the first aspect, the measurer is further configured to update one or more values of the subband CQI for the plurality of LBT subbands in a case that the indicator indicates the subband CQI.

(3) According to a third aspect of the present disclosure, in the terminal apparatus according to the second aspect, in a case that the first condition and the second condition are satisfied, the measurer updates a value of the subband CQI for at least one of the plurality of LBT subbands in which LBT is successful and does not update a value of the subband CQI for at least one of the plurality of LBT subbands in which LBT is unsuccessful.

(4) According to a fourth aspect of the present disclosure, in the terminal apparatus according to the first aspect, the indicator is a cqi-FormatIndicator.

(5) According to a fifth aspect of the present disclosure, a method is provided. The method includes: receiving at least a CSI-RS in a BWP; measuring and evaluating one or more values of a CQI by using at least the CSI-RS, the CQI including a wideband CQI or a subband CQI; measuring and updating a value of the wideband CQI in a case that an indicator, corresponding to the BWP, indicates the wideband CQI, and at least one of a first condition and a second condition is not satisfied; and transmitting a CSI report including the value of the wideband CQI. The first condition is that the BWP is in an unlicensed carrier and a plurality of LBT subbands are configured in the BWP, and the second condition is that an LBT failure is indicated for at least one LBT subband among the plurality of LBT subbands.

(6) According to a sixth aspect of the present disclosure, the method according to the fifth aspect further includes updating one or more values of the subband CQI for the plurality of LBT subbands in a case that the indicator indicates the subband CQI.

(7) According to a seventh aspect of the present disclosure, the method according to the sixth aspect further includes in a case that the first condition the second condition are satisfied, updating a value of the subband CQI for at least one of the plurality of LBT subbands in which LBT is successful; and not updating a value of the subband CQI for at least one of the plurality of LBT subbands in which LBT is unsuccessful.

(8) According to a eighth aspect of the present disclosure, the method according to the fifth aspect, the indicator is a cqi-FormatIndicator.

Advantageous Effects of Disclosure

According to one aspect of the present disclosure, the terminal apparatus can efficiently perform communication. In addition, the base station apparatus can efficiently perform communication.

BRIEF DESCRIPTION OF DRAWINGS

FIG. 2 is an example illustrating a relationship between $N^{slot}_{symb}$, an SCS configuration μ, and a Cyclic Prefix (CP) configuration according to one aspect of the present embodiment.

FIG. 4 is a diagram illustrating an example of a relationship between a physical uplink control channel (PUCCH) format and a PUCCH format length $N^{PUCCH}_{symb}$ according to one aspect of the present embodiment.

FIG. 11 is a diagram illustrating an example of triggering/activation of channel state information (CSI) reporting for a possible CSI-reference signal (CSI-RS) configuration according to an aspect of the present embodiment.

FIG. 12 is a diagram illustrating an example of a configurable subband size according to an aspect of the present embodiment.

FIG. 13 is a diagram illustrating an example of a priority reporting level for a part 2 CSI according to one aspect of the present embodiment.

DESCRIPTION OF EMBODIMENTS

Embodiments of the present disclosure will be described below.

Figure 1:
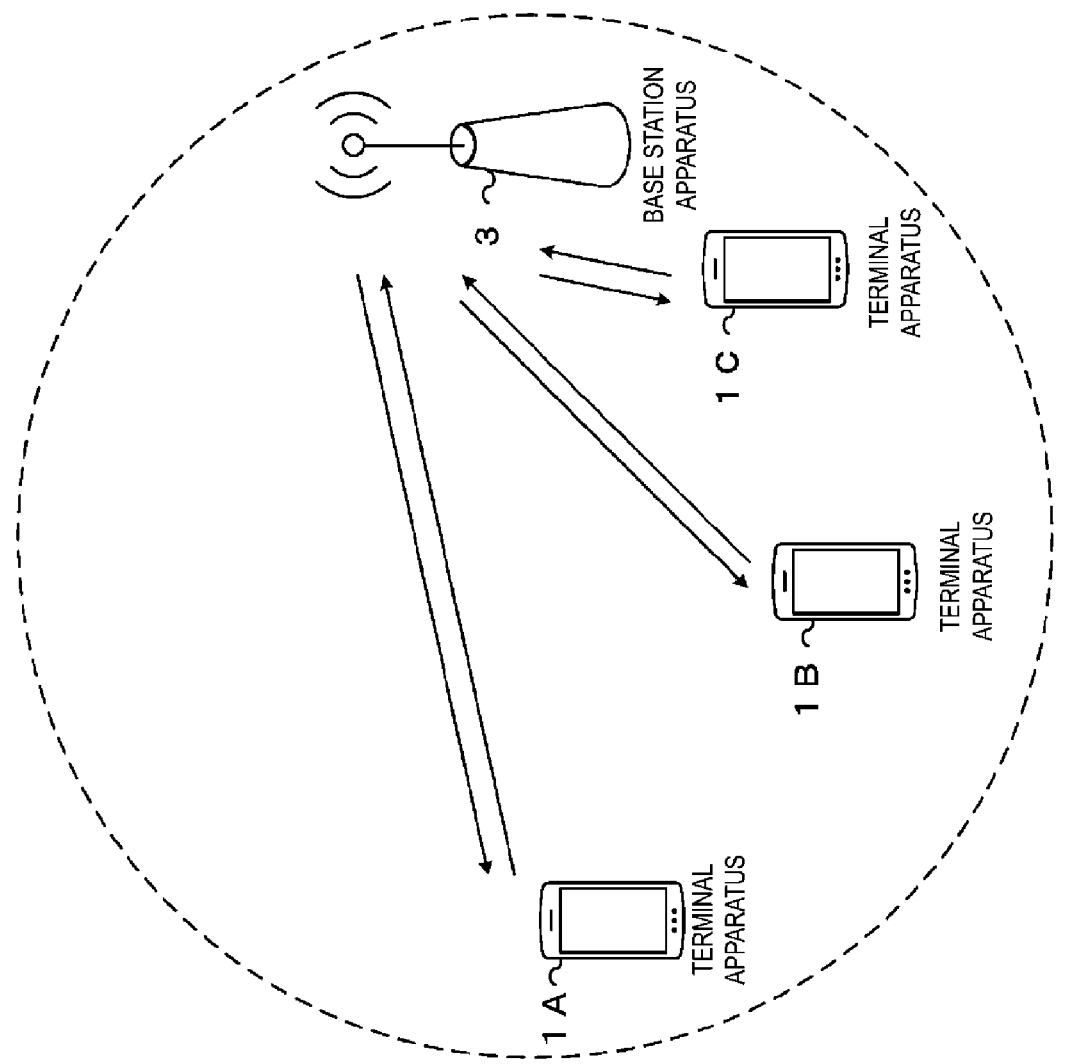
FIG. 1 is a conceptual diagram of a radio communication system according to one aspect of the present embodiment.

FIG. 1 is a conceptual diagram of a radio communication system according to an aspect of the present embodiment. In FIG. 1, the radio communication system includes terminal apparatuses 1A to 1C and a base station apparatus 3. Hereinafter, each of the terminal apparatuses 1A to 1C may also be referred to as a terminal apparatus 1. The base station apparatus 3 may include some or all of a communication device, a node, a NodeB (NB), an eNB, a gNB, a network apparatus (a core network, a gateway), and an access point. The terminal apparatus 1 may also be referred to as a user equipment (UE). The eNB is a node that provides an EUTRA user plane and a control plane protocol termination for one or multiple terminal apparatuses 1, and, in particular, an eNB that is connected to a fifth generation core network (5 GC) through a Next Generation (NG) interface will be referred to as "ng-eNB." The gNB is a node that provides an NR user plane and a control plane protocol termination for one or multiple terminal apparatuses 1 and is connected to the 5 GC through the NG interface.

The base station apparatus 3 may configure one or both of a Master Cell Group (MCG) and a Secondary Cell Group (SCG). The MCG is a group of serving cells configured to include at least a Primary Cell (PCell). In addition, the SCG is a group of serving cells configured to include at least a Primary Secondary Cell (PSCell). The PCell may be a serving cell provided based on an initial connection. The MCG may be configured to include one or multiple Secondary Cells (SCells). The SCG may be configured to include one or multiple SCells. The PCell and the PSCell may be referred to as Special Cells (SpCells). Performing communication by configuring one CG using one SpCell and one or multiple SCells may also be referred to as carrier aggregation.

The MCG may include one or multiple serving cells on the EUTRA. The SCG may include one or multiple serving cells on the NR. In addition, the MCG may include one or multiple serving cells on the NR. Furthermore, the SCG may include one or multiple serving cells on the EUTRA. The MCG and the SCG may include one or multiple serving cells of either the EUTRA or the NR. Here, being on the EUTRA may include a meaning representing that a EUTRA Radio Access Technology (RAT) is applied. In addition, being on the NR may include a meaning representing that the NR RAT is applied.

The MCG may include one or multiple serving cells on the EUTRA. In addition, the SCG may include one or multiple serving cells on the NR-U. The MCG may include one or multiple serving cells on the NR. The SCG may include one or multiple serving cells on the NR-U. The MCG may include one or multiple serving cells of any one of the EUTRA, the NR, and the NR-U. In addition, the SCG may include one or multiple serving cells of any one of the EUTRA, the NR, and the NR-U.

The operating bands applied to the EUTRA, the NR, and the NR-U may be individually defined (regulated).

The MCG may be configured by a first base station apparatus. In addition, the SCG may be configured by a second base station apparatus. In other words, the PCell may be configured by the first base station apparatus. The PSCell may be configured by the second base station apparatus. Each of the first base station apparatus and the second base station apparatus may be the same as the base station apparatus 3.

Hereinafter, the configuration of a frame will now be described.

In the radio communication system according to an aspect of the present embodiment, at least Orthogonal Frequency Division Multiplexing (OFDM) is used. An OFDM symbol is a unit of the time domain of the OFDM. The OFDM symbol includes at least one or multiple subcarriers (subcarrier). The OFDM symbol is converted into a time-continuous signal in generation of a baseband signal. In a downlink, at least Cyclic Prefix-Orthogonal Frequency Division Multiplexing (CP-OFDM) is used. In an uplink, one of the CP-OFDM and Discrete Fourier Transform—spread—

Orthogonal Frequency Division Multiplexing (DFT-s-OFDM) is used. The DFT-s-OFDM may be given by applying transform precoding to the CP-OFDM.

The subcarrier spacing (SCS) may be given as subcarrier spacing $\Delta f = 2^\mu \cdot 15$ kHz. For example, the SCS configuration $\mu$ may be configured to be one of 0, 1, 2, 3, 4, and/or 5. For a certain BandWidth Part (BWP), the SCS configuration $\mu$ may be given using a higher layer parameter. In other words, the value of $\mu$ may be configured for each BWP (for each downlink BWP, for each uplink BWP) regardless of the downlink and/or the uplink.

In a radio communication system according to an aspect of the present embodiment, a time unit $T_c$ is used for representing a length in the time domain. A time unit $T_c$ may be given as $T_c = 1/(\Delta f_{max} \cdot N_f)$. $\Delta f_{max}$ may be a maximum value of the SCS that is supported in a radio communication system according to an aspect of the present embodiment. $\Delta f_{max}$ may be $\Delta f_{max} = 480$ kHz. $N_f$ may be $N_f = 4096$. A constant $\kappa$ is $\kappa = \Delta f_{max} \cdot N_f/(\Delta f_{ref} N_{f,\,ref}) = 64$. $\Delta f_{ref}$ may be 15 kHz. $N_{f,\,ref}$ may be 2048.

The constant $\kappa$ may be a value that indicates a relationship between the reference SCS and $T_c$. The constant $\kappa$ may be used for the length of a subframe. The number of slots included in the subframe may be given at least based on the constant $\kappa$. $\Delta f_{ref}$ is the reference SCS, and $N_{f,\,ref}$ is a value corresponding to the reference SCS.

Transmission of a signal in the downlink and/or transmission of a signal in the uplink are configured using frames each having a length of 10 ms. A frame is configured to include 10 subframes. A length of the subframe is 1 ms. The length of the frame may be given regardless of SCS $\Delta f$. In other words, the configuration of the frame may be given regardless of the value of $\mu$. The length of the subframe may be given regardless of SCS $\Delta f$. In other words, the configuration of the subframe may be given regardless of $\mu$.

For a certain SCS configuration $\mu$, the number of slots included in one subframe and an index may be given. For example, slot numbers $n^\mu_s$ may be given in ascending order in the range of 0 to $N^{subframe,\mu}_{slot} - 1$ in a subframe. For the SCS configuration $\mu$, the number of slots included in one frame and an index may be given. In addition, slot numbers $n^\mu_s$, f may be given in ascending order in the range of 0 to $N^{frame,\mu}_{slot} - 1$ in a frame. $N^{slot}_{symb}$ consecutive OFDM symbols may be included in one slot. $N^{slot}_{symb}$ may also be given at least based on a part or all of the Cyclic Prefix (CP) configuration. The CP configuration may be given at least based on a higher layer parameter. The CP configuration may be given at least based on dedicated RRC signaling. The slot number may also be referred to as a slot index.

FIG. 2 is an example illustrating a relationship between $N^{slot}_{symb}$, the SCS configuration $\mu$, and a CP configuration according to an aspect of the present embodiment. In FIG. 2A, for example, in a case that the SCS configuration $\mu$ is 2, and the CP configuration is a normal CP (NCP), $N^{slot}_{symb} = 14$, $N^{frame,\mu}_{slot} = 40$, and $N^{subframe,\mu}_{slot} = 4$. In addition, in FIG. 2B, for example, in a case that the SCS configuration $\mu$ is 2, and the CP configuration is an expanded CP (ECP), $N^{slot}_{symb} = 12$, $N^{frame,\mu}_{slot} = 40$, and $N^{subframe,\mu}_{slot} = 4$.

Hereinafter, physical resources according to the present embodiment will be described.

An antenna port is defined in such a manner that a channel on which a symbol on one antenna port is conveyed can be inferred from a channel on which another symbol on the same antenna port is conveyed. In a case that large scale properties of a channel in which symbols are conveyed in one antenna port can be estimated from a channel in which symbols are conveyed in another antenna port, the two antenna ports may be referred to as being Quasi Co-Located (QCL). The large scale properties may include at least a long term property of a channel. The large scale properties may include at least some or all of delay spread, Doppler spread, Doppler shift, an average gain, an average delay, and beam parameters (spatial Rx parameters). A first antenna port and a second antenna port being QCL with respect to a beam parameter may mean that a reception beam assumed by the reception side for the first antenna port may be the same as a reception beam assumed by the reception side for the second antenna port. The first antenna port and the second antenna port being QCL with respect to a beam parameter may mean that a transmission beam assumed by the reception side for the first antenna port may be the same as a transmission beam assumed by the reception side for the second antenna port. In a case that large scale properties of a channel in which symbols are conveyed in one antenna port can be estimated from a channel in which symbols are conveyed in another antenna port, the terminal apparatus 1 may assume that the two antenna ports are QCL. Two antenna ports being QCL may mean that the two antenna ports are assumed to be QCL.

For an SCS configuration $\mu$ and a carrier set, a resource grid defined by $N^{size,\mu}_{grid,\,x} N^{RB}_{sc}$ subcarriers and $N^{subframe,\mu}_{symb}$ OFDM symbols is given. $N^{size,\mu}_{grid,\,x}$ may indicate the number of resource blocks given for the SCS configuration $\mu$ for a carrier x. $N^{size,\mu}_{grid,\,x}$ may indicate a bandwidth of the carrier. $N^{size,\mu}_{grid,\,x}$ may correspond to a value of a higher layer parameter CarrierBandwidth. The carrier x may indicate either a downlink carrier or an uplink carrier. In other words, x may be "DL" or "UL." $N^{RB}_{sc}$ may indicate the number of subcarriers included in one resource block. $N^{RB}_{sc}$ may be 12. At least one resource grid may be given for each antenna port p and/or for each SCS configuration $\mu$ and/or for each transmission direction configuration. The transmission direction includes at least Downlink (DL) and Uplink (UL). Hereinafter, a set of parameters including at least some or all of the antenna port p, the SCS configuration $\mu$, and a transmission direction configuration may also be referred to as a first radio parameter set. In other words, one resource grid may be given for each first radio parameter set. A radio parameter set may be one or multiple sets including one or multiple radio parameters (physical layer parameters or higher layer parameters).

In the downlink, a carrier included in a serving cell will be referred to as a downlink carrier (or a downlink component carrier). In the uplink, a carrier included in a serving cell will be referred to as an uplink carrier (or an uplink component carrier). The downlink component carrier and the uplink component carrier may also be collectively referred to as component carriers (or carriers).

The type of serving cell may be any one of a PCell, a PSCell, and an SCell. The PCell may be a serving cell that is identified based on at least a cell ID (a physical layer cell ID, a physical cell ID) acquired from a Synchronization signal/Physical broadcast channel block (SSB) in an initial connection. The SCell may be a serving cell that is used in carrier aggregation. The Scell may be a serving cell that is provided based on at least a dedicated RRC signal.

Each element in the resource grid given for each first radio parameter set may be referred to as a resource element. The resource element is identified by an index $k_{sc}$ of the frequency domain and an index $l_{sym}$ of the time domain. For a certain first radio parameter set, the resource element is identified by the index $k_{sc}$ of the frequency domain and the index $l_{sym}$ of the time domain. A resource element identified by the index $k_{sc}$ of the frequency domain and the index $l_{sym}$ of the time domain may also be referred to as a resource element ($k_{sc}$, $l_{sym}$). The index $k_{sc}$ of the frequency domain represents one value in the range of 0 to $N^{\mu}_{RB}N^{RB}_{sc}-1$. $N^{\mu}_{RB}$ may be the number of resource blocks given for the SCS configuration μ. $N^{\mu}_{RB}$ may be $N^{size,\mu}_{grix,x}$. $N^{RB}_{sc}$ the number of subcarriers included in a resource block, and $N^{RB}_{sc}=12$. The index $k_{sc}$ of the frequency domain may correspond to a subcarrier index $k_{sc}$. The index $l_{sym}$ of the time domain may correspond to an OFDM symbol index $l_{sym}$.

Figure 3:
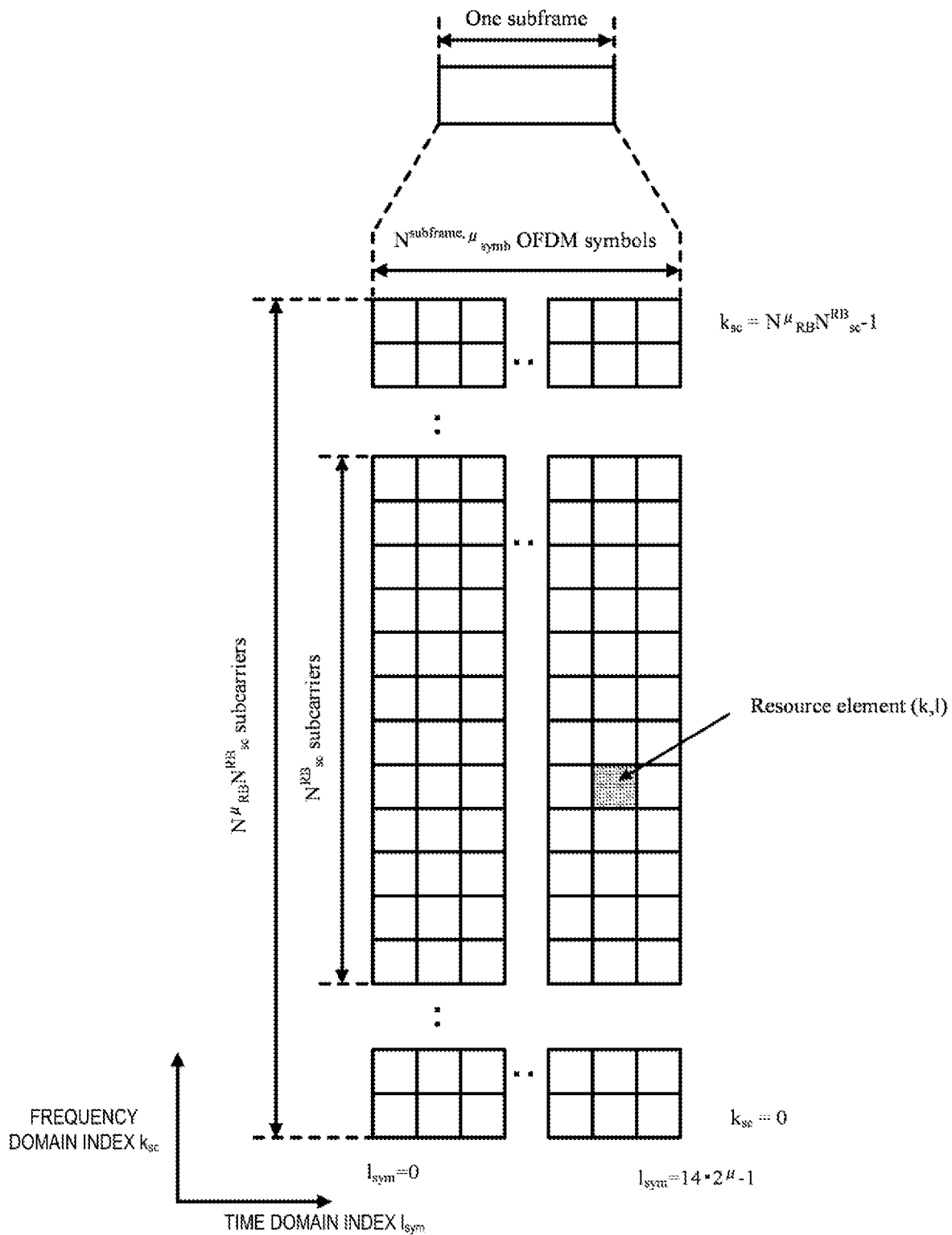
FIG. 3 is a schematic diagram illustrating an example of a resource grid in a subframe according to an aspect of the present embodiment.

FIG. 3 is a schematic diagram illustrating an example of a resource grid in a subframe according to an aspect of the present embodiment. In the resource grid illustrated in FIG. 3, the horizontal axis is the index $l_{sym}$ of the time domain, and the vertical axis is the index $k_{sc}$ of the frequency domain. In one subframe, the frequency domain of the resource grid includes $N^{\mu}_{RB}N^{RB}_{sc}$ subcarriers. In one subframe, the time domain of the resource grid may include 14·2 μ OFDM symbols. One resource block is configured to include $N^{RB}_{sc}$ subcarriers. The time domain of the resource block may correspond to one OFDM symbol. The time domain of the resource block may correspond to 14 OFDM symbols. The time domain of the resource block may correspond to one or multiple slots. The time domain of the resource block may correspond to one subframe.

The terminal apparatus 1 may receive an indication to perform transmission and/or reception by using only a subset of the resource grid. The subset of the resource grid is also referred to as a BWP and the BWP may be given based on at least some or all of the higher layer parameter and/or the DCI. The BWP may also be referred to as a Carrier Bandwidth Part (CBP). The terminal apparatus 1 may not be indicated to perform transmission/reception using all the sets of resource grids. The terminal apparatus 1 may be indicated to perform transmission/reception using some of frequency resources within a resource grid. One BWP may include multiple resource blocks in the frequency domain. One BWP may include multiple resource blocks that are consecutive in the frequency domain. A BWP configured for a downlink carrier may also be referred to as a downlink BWP. A BWP configured for an uplink carrier may also be referred to as an uplink BWP. The BWP may be a subset of the band of the carrier (a subset of the frequency domain in the carrier).

One or multiple downlink BWPs may be configured for each serving cell. One or multiple uplink BWPs may be configured for each serving cell.

One downlink BWP among the one or multiple downlink BWPs configured for the serving cell may be configured as an active downlink BWP. The downlink BWP switch is used for deactivating one active downlink BWP and activating inactive downlinks BWP other than the one active downlink BWP. The switching of the downlink BWP may be controlled by a BWP field included in downlink control information. The switching of the downlink BWP may be controlled based on a higher layer parameter.

The downlink-shared channel (DL-SCH) may be received in the active downlink BWP. In the active downlink BWP, the physical downlink control channel (PDCCH) may be monitored. In the active downlink BWP, a physical downlink shared channel (PDSCH) may be received.

In the inactive downlink BWP, a DL-SCH is not received. In the inactive downlink BWP, the PDCCH is not monitored. CSI for the inactive downlink BWP is not reported.

Two or more downlink BWPs among the one or multiple downlink BWPs configured for the serving cell may not be configured in the active downlink BWP.

One uplink BWP among the one or multiple uplink BWPs configured for the serving cell may be configured as an active uplink BWP. An uplink BWP switch is used for deactivating one active uplink BWP and activating an inactive uplink BWP other than the one active uplink BWP. The switching of the uplink BWP may be controlled by a BWP field included in the downlink control information. The switching of the uplink BWP may be controlled based on a higher layer parameter.

In the active uplink BWP, an uplink-shared channel (UL-SCH) may be transmitted. In the active uplink BWP, the physical uplink control channel (PUCCH) may be transmitted. In the active uplink BWP, a physical random access channel (PRACH) may be transmitted. In the active uplink BWP, a sounding reference signal (SRS) may be transmitted.

In the inactive uplink BWP, no UL-SCH is transmitted. In the inactive uplink BWP, no PUCCH is transmitted. In the inactive uplink BWP, no PRACH is transmitted. In the inactive uplink BWP, no SRS is transmitted.

Two or more uplink BWPs among the one or multiple uplink BWPs configured for one serving cell may not be configured as active uplink BWPs. In other words, there may be at least one active uplink BWP for the serving cell including uplink BWPs.

A higher layer parameter is a parameter included in higher layer signaling. The higher layer signaling may be a Radio Resource Control (RRC) signaling or a Medium Access Control (MAC) Control Element (CE). Here, the higher layer signaling may be RRC layer signaling or MAC layer signaling. The higher layer parameter given by a signal of the RRC layer may be configured by the terminal apparatus 1 being notified thereof from the base station apparatus 3.

The higher layer signaling may be common RRC signaling. Common RRC signaling may have at least some or all of the following features C1 to C3.

Feature C1) Being mapped into a broadcast control channel (BCCH) logical channel or a common control channel (CCCH) logical channel Feature C2) Including at least a ReconfigurationWithSync information element Feature C3) Being mapped into a physical broadcast channel (PBCH)

The ReconfigurationWithSync information element may include information that indicates a configuration that is commonly used for the serving cell. The configuration commonly used in the serving cell may include at least a PRACH configuration. The PRACH configuration may indicate at least one or multiple random access preamble indexes. The PRACH configuration may indicate at least a time/frequency resource of a PRACH.

The common RRC signaling may include at least a common RRC parameter. The common RRC parameter may be a cell-specific parameter that is commonly used within the serving cell.

The higher layer signaling may be dedicated RRC signaling. The dedicated RRC signaling may include at least one or both of the following features D1 and D2.

Feature D1) Being mapped into a dedicated control channel (DCCH) logical channel Feature D2) A ReconfigurationWithSync information element is not included.

For example, a Master Information Block (MIB) and a System Information Block (SIB) may be included in the common RRC signaling. In addition, a higher layer message that is mapped into a DCCH logical channel and includes at least a ReconfigurationWithSync information element may be included in the common RRC signaling. A higher layer message that is mapped into a DCCH logical channel and does not include a ReconfigurationWithSync information element may be included in dedicated RRC signaling. The MIB and the SIB may be collectively referred to as system information.

Higher layer parameters including one or multiple higher layer parameters may be referred to as information elements (IE). In addition, one or multiple higher layer parameters and/or a higher layer parameter including one or multiple IEs and/or the IE may also be referred to as messages (higher layer messages, RRC messages), information blocks (IB), or system information.

The SIB may indicate at least a time index of the SSB. The SIB may include at least information relating to a PRACH resource. The SIB may include at least information relating to a configuration of an initial connection.

The ReconfigurationWithSync information element may include at least information relating to PRACH resources. The ReconfigurationWithSync information element may include at least information relating to a configuration of an initial connection.

The dedicated RRC signaling may include at least a dedicated RRC parameter. The dedicated RRC parameter may be a (UE-specific) parameter that is dedicatedly used for the terminal apparatus 1. The dedicated RRC signaling may include at least a common RRC parameter.

The common RRC parameter and the dedicated RRC parameter may also be referred to as higher layer parameters.

A physical channel and a physical signal according to various aspects of the present embodiment will be described below.

An uplink physical channel may correspond to a set of resource elements that conveys information generated in a higher layer. The uplink physical channel is a physical channel that is used in an uplink carrier. In the radio communication system according to an aspect of the present embodiment, at least some or all of the uplink physical channels described below are used.

Physical Uplink Control CHannel (PUCCH)
Physical Uplink Shared CHannel (PUSCH)
Physical Random Access CHannel (PRACH)

The PUCCH may be used for transmitting uplink control information (UCI). The uplink control information includes some or all of channel state information (CSI), a scheduling request (SR), and Hybrid Automatic Repeat request ACKnowledgement (HARQ-ACK) information corresponding to a transport block (TB). The TB may also be referred to as a Medium Access Control Protocol Data Unit (MAC PDU), a Downlink-Shared Channel (DL-SCH), or a Physical Downlink Shared Channel (PDSCH).

In the PUCCH, one or multiple types of uplink control information may be multiplexed. The multiplexed PUCCH may be transmitted. In other words, in the PUCCH, multiple HARQ-ACKs may be multiplexed, multiple CSIs may be multiplexed, multiple SRs may be multiplexed, a HARQ-ACK and a CSI may be multiplexed, the HARQ-ACK and an SR may be multiplexed, and multiplexing with a different type of UCI may be performed.

The HARQ-ACK information may include at least a HARQ-ACK bit that corresponds to a TB. The HARQ-ACK bit may indicate an acknowledgement (ACK) or a negative-acknowledgement (NACK) corresponding to the TB. The ACK may be a value that indicates that decoding of the TB has been successfully completed. The NACK may be a value indicating that decoding of the TB has not been successfully completed. The HARQ-ACK information may include at least one HARQ-ACK codebook including one or multiple HARQ-ACK bits. The HARQ-ACK bit being in correspondence with one or multiple TBs may represent that the HARQ-ACK bit is in correspondence with the PDSCH including one or multiple TBs.

The HARQ-ACK bit may indicate an ACK or a NACK that corresponds to one Code Block Group (CBG) included in the TB. The HARQ-ACK may also be referred to as a HARQ feedback, HARQ information, or HARQ control information.

The SR may be used at least for requesting a resource of the PUSCH for initial transmission. The SR may be used for requesting a UL-SCH resource for new transmission. The SR bit may be used for indicating either an SR having positivity (positive SR) or an SR having negativity (negative SR). The SR bit indicating the positive SR may also be referred to as "the positive SR is transmitted". The positive SR may indicate that a resource of the PUSCH for initial transmission is requested by the terminal apparatus 1. The positive SR may indicate that the SR is triggered by a higher layer. The positive SR may be transmitted in a case that transmission of the SR is indicated by a higher layer. The SR bit indicating the negative SR may also be referred to as "the negative SR is transmitted". The negative SR may indicate that a resource of the PUSCH for initial transmission has not been requested by the terminal apparatus 1. The negative SR may indicate that the SR has not been triggered by a higher layer. The negative SR may be transmitted in a case that transmission of the SR has not been indicated by a higher layer.

The SR bit may be used for indicating either a positive SR or a negative SR for each of one or multiple SR configurations. Each of one or multiple SR configurations may correspond to one or multiple logical channels. The positive SR for a certain SR configuration may be a positive SR for one or all of one or multiple logical channels corresponding to the certain SR configuration. The negative SR may not correspond to a specific SR configuration. Indication of a negative SR may represent that a negative SR is indicated for all the SR configurations.

The SR configuration may be a Scheduling Request ID (SR-ID). The SR-ID may be given by a higher layer parameter.

The CSI may include at least some or all of a channel quality indicator (CQI), a precoder matrix indicator (PMI), and a rank index (RI). The CQI is an index relating to quality (for example, propagation strength) of a channel, and the PMI is an index indicating a precoder. The RI is an index indicating a transmission rank (or the number of transmission layers).

The CSI may be given based on at least reception of a physical signal (for example, a CSI-RS) used for at least channel measurement. The CSI may include a value that is selected by the terminal apparatus 1. The CSI may be selected by the terminal apparatus 1 based on at least reception of a physical signal that is used at least for channel measurement. The channel measurement may include interference measurement. The CSI-RS may be set based on the CSI-RS configuration or may be set based on the SSB configuration.

The CSI report is a report of the CSI. The CSI report may include a CSI part 1 and/or a CSI part 2. The CSI part 1 may be configured to include at least some or all of wideband channel quality indicator (wideband CQI), a wideband precoder matrix indicator (wideband PMI), and the RI. The number of bits of the CSI part 1 multiplexed in the PUCCH may be a predetermined value regardless of the value of the RI of the CSI report. The number of bits of the CSI part 2 multiplexed in the PUCCH may be given based on the value of RI of the CSI report. The rank index of the CSI report may be a value of a rank index used for calculation of the CSI report. The RI of the CSI information may be a value indicated in an RI field included in the CSI report.

The set of RIs allowed in the CSI report may be a part or all of 1 to 8. In addition, the set of RIs allowed in the CSI report may be given based on at least a higher layer parameter RankRestriction. In a case that the set of RIs allowed in the CSI report includes only one value, the RI of the CSI report may be the one value.

A priority level may be configured for the CSI report. The priority level of the CSI report may be given based on at least some or all of the configuration relating to a behavior (processing) of the time domain of the CSI report, the type of content of the CSI report, the index of the CSI report, and/or the index of a serving cell for which the measurement of the CSI report is configured.

The configuration relating to a behavior (processing) of the time domain of the CSI report may be a configuration that indicates whether the CSI report is performed aperiodically, the CSI report is performed semi-persistently, or is performed semi-statically.

The type of content of the CSI report may indicate whether or not the CSI report includes the Reference Signals Received Power (RSRP) of the layer 1.

The index of the CSI report may be given by a higher layer parameter.

The PUCCH supports one or multiple PUCCH formats (PUCCH format 0 to PUCCH format 4). The PUCCH format may be transmitted in the PUCCH. The transmission of the PUCCH format may be transmission of the PUCCH.

FIG. 4 is a diagram illustrating an example of a relationship between a PUCCH format and a length $N^{PUCCH}_{symb}$ of the PUCCH format according to an aspect of the present embodiment. The length $N^{PUCCH}_{symb}$ of PUCCH format 0 is 1 or 2 OFDM symbols. The length $N^{PUCCH}_{symb}$ of PUCCH format 1 is one of 4 to 14 OFDM symbols. The length $N^{PUCCH}_{symb}$ of PUCCH format 2 is 1 or 2 OFDM symbols. The length $N^{PUCCH}_{symb}$ of PUCCH format 3 is one of 4 to 14 OFDM symbols. The length $N^{PUCCH}_{symb}$ of PUCCH format 4 is one of 4 to 14 OFDM symbols.

The PUSCH is used at least for transmitting a TB (MAC PDU, UL-SCH). The PUSCH may be used for transmitting at least some or all of the TB, the HARQ-ACK information, the CSI, and the SR. The PUSCH is used at least for transmitting a random access message 3 (message 3 (Msg3)) corresponding to the random access response (RAR) (Msg2) and/or the RAR grant in the random access procedure.

The PRACH is used at least for transmitting a random access preamble (random access message 1, message 1 (Msg1)). The PRACH may be used at least for some or all of an initial connection establishment procedure, a handover procedure, a connection re-establishment procedure, an initial access procedure, synchronization (timing adjustment) for transmission of the PUSCH, and a request for resources for the PUSCH. The random access preamble may be used to notify the base station apparatus 3 of an index (random access preamble index) given by a higher layer of the terminal apparatus 1.

The random access preamble may be given by cyclic-shifting a Zadoff-Chu sequence corresponding to a physical root sequence index u. The Zadoff-Chu sequence may be generated based on the physical root sequence index u. In one serving cell, multiple random access preambles may be defined. A random access preamble may be identified based at least on an index of the random access preamble. A different random access preamble corresponding to a different index of the random access preamble may correspond to a different combination of the physical root sequence index u and the cyclic shift. The physical root sequence index u and the cyclic shift may be given based at least on information included in system information. The physical root sequence index u may be an index for identifying a sequence included in the random access preamble. The random access preamble may be identified at least based on the physical root sequence index u.

In FIG. 1, the following uplink physical signals are used for uplink radio communication. The uplink physical signals may not be used to transmit information output from a higher layer, but is used by a physical layer.

UpLink Demodulation Reference Signal (UL DMRS)
Sounding Reference Signal (SRS)
UpLink Phase Tracking Reference Signal (UL PTRS)

The UL DMRS is associated with transmission of a PUSCH and/or a PUCCH. The UL DMRS is multiplexed with the PUSCH or the PUCCH. The base station apparatus 3 may use the UL DMRS in order to perform channel compensation of the PUSCH or the PUCCH. Transmission of both a PUSCH and a UL DMRS associated with the PUSCH will be hereinafter referred to simply as transmission of a PUSCH. Transmission of both a PUCCH and a UL DMRS associated with the PUCCH will be hereinafter referred to simply as transmission of a PUCCH. The UL DMRS associated with the PUSCH is also referred to as a UL DMRS for a PUSCH. The UL DMRS associated with the PUCCH is also referred to as a UL DMRS for a PUCCH.

The SRS may not be associated with transmission of the PUSCH or the PUCCH. The base station apparatus 3 may use the SRS for measuring a channel state. The SRS may be transmitted at the end of a subframe in an uplink slot or in a predetermined number of OFDM symbols from the end.

The UL PTRS may be a reference signal that is used at least for phase tracking. The UL PTRS may be associated with a UL DMRS group including at least an antenna port used for one or multiple UL DMRSs. The association of the UL PTRS with UL DMRS group may mean that the antenna port for the UL PTRS and some or all of the antenna ports included in the UL DMRS group are at least QCL. The UL DMRS group may be identified at least based on the antenna port of the lowest index for the UL DMRS included in the UL DMRS group. The UL PTRS may be mapped into an antenna port having a smallest index among one or multiple antenna ports into which one codeword is mapped. In a case that one codeword is mapped at least into a first layer and a second layer, the UL PTRS may be mapped into a first layer. The UL PTRS may not be mapped into the second layer. An index of an antenna port to which the UL PTRS is mapped may be given based on at least the downlink control information.

In FIG. 1, the following downlink physical channels are used for downlink radio communication from the base station apparatus 3 to the terminal apparatus 1. The downlink physical channels are used by the physical layer for transmission of information output from a higher layer.

Physical Broadcast Channel (PBCH)
Physical Downlink Control Channel (PDCCH)
Physical Downlink Shared Channel (PDSCH)

The PBCH is used at least for transmitting an MIB and/or a PBCH payload. The PBCH payload may include at least information indicating an index relating to an SSB transmission timing (SSB occasion). The PBCH payload may include information relating to an identifier (an index) of the SSB. The PBCH may be transmitted at a predetermined transmission interval. The PBCH may be transmitted at an interval of 80 ms. The PBCH may be transmitted at an interval of 160 ms. The content of information included in the PBCH may be updated every 80 ms. A part or all of the information included in the PBCH may be updated every 160 ms. The PBCH may include 288 subcarriers. The PBCH may include 2, 3, or 4 OFDM symbols. The MIB may include information relating to an identifier (index) of the SSB. The MIB may include information that indicates at least some of the number of a slot in which the PBCH is transmitted, a number of a subframe, and/or a number of a radio frame.

The PDCCH is used at least for transmitting downlink control information (DCI). The PDCCH may be transmitted with at least the DCI included therein. The PDCCH may be transmitted with the DCI included therein. The DCI may also be referred to as a DCI format. The DCI may indicate at least one of a downlink grant or an uplink grant. The DCI format used for scheduling the PDSCH may also be referred to as a downlink DCI format and/or a downlink grant. The DCI format used for scheduling the PUSCH may also be referred to as an uplink DCI format and/or an uplink grant. The downlink grant may be referred to as downlink assignment or downlink allocation. The uplink DCI format includes at least one or both of DCI format 0_0 and DCI format 0_1.

The DCI format 0_0 may be configured to include at least some or all of 1A to 1J.

1A) Identifier for DCI formats field
1B) Frequency domain resource assignment field
1C) Time domain resource assignment field
1D) Frequency hopping flag field
1E) Modulation and Coding Scheme field (MCS field)
1F) First CSI request field
1G) New Data Indicator (NDI) field
1H) Redundancy Version (RV) field
1I) HARQ process ID field (HPID field, HARQ process number field)
1J) Transmission Power Control (TPC) command for scheduled PUSCH field 1A may be used at least for indicating one of the one or multiple DCI formats to which the DCI format including the 1A corresponds. The one or multiple DCI formats may be given based on at least some or all of the DCI format 1_0, the DCI format 1_1, the DCI format 0_0, and/or the DCI format 0_1.

1B may be used at least for indicating assignment of frequency resources for the PUSCH scheduled in accordance with the DCI format including the 1B.

1C may be used at least for indicating assignment of time resources for the PUSCH scheduled in accordance with the DCI format including the 1C.

1D may be used at least for indicating whether or not frequency hopping is applied to the PUSCH scheduled in accordance with the DCI format including the 1D.

1E may be used at least for indicating some or all of a modulation scheme and/or a target encoding rate for the PUSCH scheduled in accordance with the DCI format including the 1E. The target encoding rate may be a target encoding rate for the TB of the PUSCH. The size (TBS) of the TB may be given based on at least the target encoding rate.

1F is used at least for indicating the CSI report. The size of 1F may have a predetermined value. The size of 1F may be 0, 1, 2, or 3. The size of 1F may be determined in accordance with the number of CSI configurations configured for the terminal apparatus 1.

1G is used for indicating whether transmission of the PUSCH corresponding to 1I is new transmission or retransmission scheduled in accordance with the DCI format based on whether the value of the 1G has toggled. In a case that the value of the 1G has toggled, the PUSCH corresponding to the 1I is new transmission. Otherwise, the PUSCH corresponding to the 1I is retransmission. The 1G may be a DCI indicating whether the base station apparatus 3 requests retransmission of the PUSCH corresponding to the 1I.

1H is used for indicating a start position of a bit sequence of a PUSCH scheduled in accordance with the DCI format.

1I is used for indicating the number (HPID) of a HARQ process to which the PUSCH scheduled in accordance with the DCI format corresponds.

1J is used for adjusting transmission power of the PUSCH scheduled in accordance with the DCI format.

The DCI format 0_1 is configured to include at least some or all of 2A to 2K.

2A) DCI format identification field
2B) Frequency domain resource assignment field
2C) Time domain resource assignment field
2D) Frequency hopping flag field
2E) MCS field
2F) Second CSI request field
2G) BWP field
2H) NDI field
2I) RV field
2J) HPID field
2K) TPC command field for PUSCH The BWP field may be used for indicating the uplink BWP into which the PUSCH scheduled in accordance with the DCI format 0_1 is mapped.

The second CSI request field is used at least for indicating the CSI report. The size of the second CSI request field may be given based on at least a higher layer parameter ReportTriggerSize.

The fields of the same names as those of 1A to 1J described above include the same details, and thus description thereof will be omitted.

The downlink DCI format includes at least one or both of the DCI format 1_0 and the DCI format 1_1.

The DCI format 1_0 may be configured to include at least some or all of 3A to 3L.

3A) DCI format identification field (Identifier for DCI formats field)
3B) Frequency domain resource assignment field
3C) Time domain resource assignment field
3D) Frequency hopping flag field
3E) Modulation and Coding Scheme (MCS) field
3F) First CSI request field
3G) Timing Indication Field from PDSCH to HARQ feedback (PDSCH to HARQ feedback timing indicator field)
3H) PUCCH resource indication field (PUCCH resource indicator field)
3I) NDI field
3J) RV field
3K) HPID field
3L) TPC command field for PUCCH (TPC command for scheduled PUCCH field)

3B to 3E may be used for the PDSCH scheduled in accordance with the DCI format.

3G may be a field that indicates a timing K1. In a case that the index of the slot including the last OFDM symbol of the PDSCH is a slot n, an index of the slot including the PUCCH or the PUSCH including at least the HARQ-ACK corresponding to the TB included in the PDSCH may be n+K1. In a case that the index of the slot including the last OFDM symbol of the PDSCH is the slot n, the index of the slot including the first OFDM symbol of the PUCCH or the first OFDM symbol of the PUSCH including at least the HARQ-ACK corresponding to the TB included in the PDSCH may be n+K1.

3H may be a field that indicates an index of one or multiple PUCCH resources included in the PUCCH resource set.

3I is used for indicating whether transmission of a PDSCH corresponding to 3K scheduled in accordance with the DCI format is new transmission or retransmission based on whether the value of the 3I has toggled. In a case that the value of 3K has toggled, the PDSCH corresponding to 3K is a new transmission. Otherwise, the PDSCH corresponding to 3K is a retransmission.

3J may be used for indicating a start position of the bit sequence of the PDSCH scheduled in accordance with the DCI format.

3K may be used for indicating the number of the HARQ process to which the PDSCH scheduled in accordance with the DCI format corresponds.

3L may be used for adjusting transmission power of the PUCCH corresponding to the PDSCH scheduled in accordance with the DCI format.

The DCI format 1_1 may be configured to include at least some or all of 4A to 4M.

4A) DCI format identification field
4B) Frequency domain resource assignment field
4C) Time domain resource assignment field
4D) Frequency hopping flag field
4E) MCS field
4F) First CSI request field
4G) Timing indication field from PDSCH to HARQ feedback
4H) PUCCH resource indication field
4I) BWP field
4J) NDI field
4K) RV field
4L) HPID field
4M) TPC command field for PUCCH Similar to 1A and 2A, 3A and 4A are used for identifying the DCI format.

4B to 4E may be used for the PDSCH scheduled in accordance with the DCI format.

4I may be used for indicating the downlink BWP into which the PDSCH scheduled in accordance with the DCI format 1_1 is mapped.

The fields of the same names as those of 3A to 3L described above include the same details, and thus description thereof will be omitted.

Each DCI format may include a padding bit for matching a predetermined bit size (payload size).

DCI format 2 may include a parameter used for transmission power control of the PUSCH or the PUCCH.

In various aspects of the present embodiment, unless otherwise specified, the number of resource blocks (RB) indicates the number of resource blocks in the frequency domain. The indexes of resource blocks are assigned in ascending order from resource blocks mapped into a low frequency domain to resource blocks mapped into a high frequency domain. The common resource blocks and the physical resource blocks are collectively referred to as resource blocks.

A single physical channel may be mapped to a single serving cell. One physical channel may be mapped into one CBP configured by one carrier included in one serving cell.

In the terminal apparatus 1, one or multiple control resource sets (CORESETs) may be given. The terminal apparatus 1 monitors the PDCCH in one or multiple CORESETs.

The CORESET may indicate a time-frequency domain into which one or multiple PDCCHs are mapped. The CORESET may be an area in which the terminal apparatus 1 monitors the PDCCH. The CORESET may be configured using consecutive resources (localized resources). The CORESET may be configured using non-consecutive resources (distributed resources).

In the frequency domain, the unit of mapping of the CORESET may be a resource block (RB). For example, in the frequency domain, the unit of mapping of the CORESET may be six resource blocks. In other words, the mapping of the frequency domain of the CORESET may be performed in 6RB×n (here, n is 1, 2, . . . ). In the time domain, the unit of mapping of the CORESET may be an OFDM symbol. In the time domain, for example, the unit of mapping of the CORESET may be one OFDM symbol.

The frequency domain of the CORESET may be given based on at least the higher layer signal and/or the DCI.

The time domain of the CORESET may be given based on at least the higher layer signal and/or the DCI.

A certain CORESET may be a common CORESET (Common CORESET). The common CORESET may be a CORESET that is configured common to multiple terminal apparatuses 1. The common CORESET may be given based on at least some or all of the MIB, the SIB, the common RRC signaling, and the cell ID. For example, the time resource and/or the frequency resource of the CORESET configured to monitor the PDCCH used for scheduling the SIB may be given based on at least the MIB.

A certain CORESET may be a dedicated CORESET (Dedicated CORESET). The dedicated CORESET may be a CORESET configured to be dedicatedly used for the terminal apparatus 1. The dedicated CORESET may be given based on at least the dedicated RRC signaling.

A set of candidates for the PDCCH monitored by the terminal apparatus 1 may be defined from the point of view of a search space. In other words, the set of PDCCH candidates monitored by the terminal apparatus 1 may be provided using a search space.

The search space may be configured to include one or multiple PDCCH candidates of one or multiple aggregation levels. The aggregation levels of the PDCCH candidates may indicate the number of CCEs constituting the PDCCH.

The terminal apparatus 1 may monitor at least one or multiple search spaces in slots in which discontinuous reception (DRX) is not configured. The DRX may be given based on at least a higher layer parameter. The terminal apparatus 1 may monitor at least one or multiple search space sets (Search space sets) in slots in which the DRX is not configured.

A search space set may be configured to include at least one or multiple search spaces. A type of search space set may be any of a type 0 PDCCH common search space (common search space), a type 0a PDCCH common search space, a type 1 PDCCH common search space, a type 2 PDCCH common search space, a type 3 PDCCH common search space, and/or a UE-specific PDCCH common search space.

The type 0 PDCCH common search space, the type 0a PDCCH common search space, the type 1 PDCCH common search space, the type 2 PDCCH common search space, and the type 3 PDCCH common search space may be referred to as common search spaces (CSS). The UE specific PDCCH search space may also be referred to as a UE-specific Search Space (USS).

Each of the search space sets may be associated with one resource control set. Each of the search space sets may include at least one control resource set. An index of a control resource set associated with the search space set may be given to each of the search space sets.

The type 0 PDCCH common search space may be used at least for a DCI format that accompanies a Cyclic Redundancy Check (CRC) sequence scrambled using System Information—Radio Network Temporary Identifier (SI-RNTI). The configuration of the type 0 PDCCH common search space may be given based on at least four bits of the Least Significant Bits (LSBs) of a higher layer parameter PDCCH-ConfigSIB1. The higher layer parameter PDCCH-ConfigSIB1 may be included in the MIB. The configuration of the type 0 PDCCH common search space may be given based on at least a higher layer parameter SearchSpaceZero. The interpretation of bits of the higher layer parameter SearchSpaceZero may be similar to the interpretation of 4 bits of the LSBs of the higher layer parameter PDCCH-ConfigSIB1. The configuration of the type 0 PDCCH common search space may be given based on at least the higher layer parameter SearchSpaceSIB1. Higher layer parameter SearchSpaceSIB1 may be included in a higher layer parameter PDCCH-ConfigCommon. A PDCCH detected in the type 0 PDCCH common search space may be used at least for scheduling of the PDSCH transmitted with the SIB1 included therein. The SIB1 is one type of SIB. The SIB1 may include scheduling information of the SIB other than the SIB1. The terminal apparatus 1 may receive the higher layer parameter PDCCH-ConfigCommon in the EUTRA. The terminal apparatus 1 may receive the higher layer parameter PDCCH-ConfigCommon in the MCG.

The type 0a PDCCH common search space may be used at least for a DCI format accompanying Cyclic Redundancy Check (CRC) sequence scrambled using a System Information—Radio Network Temporary Identifier (SI-RNTI). The configuration of the type 0a PDCCH common search space may be given based on at least the higher layer parameter SearchSpaceOtherSystemInformation. The higher layer parameter SearchSpaceOtherSystemInformation may be included in the SIB1. The higher layer parameter SearchSpaceOtherSystemInformation may be included in the higher layer parameter PDCCH-ConfigCommon. A PDCCH detected in the type 0 PDCCH common search space may be used at least for scheduling the PDSCH transmitted with the SIB other than the SIB1 included therein.

The type 1 PDCCH common search space may be used at least for a DCI format accompanying a CRC sequence scrambled using a Random Access-Radio Network Temporary Identifier (RA-RNTI) and/or a CRC sequence scrambled using a Temporary Common-Radio Network Temporary Identifier (TC-RNTI). The RA-RNTI may be given based on at least a time/frequency resource of the random access preamble transmitted by the terminal apparatus 1. The TC-RNTI may be given by a PDSCH (referred to also as random access message 2, message 2 (Msg2), or random access response (RAR)) scheduled in accordance with the DCI format accompanying the CRC sequence scrambled using the RA-RNTI. The type 1 PDCCH common search space may be given based on at least the higher layer parameter ra-SearchSpace. The higher layer parameter ra-SearchSpace may be included in the SIB1. The higher layer parameter ra-SearchSpace may be included in the higher layer parameter PDCCH-ConfigCommon.

The type 2 PDCCH common search space may be used for a DCI format accompanying a CRC sequence scrambled using a Paging-Radio Network Temporary Identifier (P-RNTI) by Paging-Radio Network Temporary Identifier (P_RNTI). The P-RNTI may be used at least for transmission of a DCI format that includes information used for a notification of a change in the SIB. The type 2 PDCCH common search space may be given based on at least the higher layer parameter PagingSearchSpace. The higher layer parameter PagingSearchSpace may be included in the SIB1. The higher layer parameter PagingSearchSpace may be included in the higher layer parameter PDCCH-ConfigCommon.

The type 3 PDCCH common search space may be used for a DCI format accompanying a CRC sequence scrambled using a Cell-Radio Network Temporary Identifier (C-RNTI). The C-RNTI may be given based on at least the PDSCH (it may also be referred to as a random access message 4, a message 4 (Msg4), or a contention resolution) scheduled in accordance with a DCI format accompanying a CRC sequence scrambled using the TC-RNTI. The type 3 PDCCH common search space may be a search space set that is given in a case that the higher layer parameter SearchSpaceType is set to be common.

The UE-specific PDCCH search space may be used at least for a DCI format accompanying the CRC sequence scrambled using the C-RNTI.

In a case that the C-RNTI is given to the terminal apparatus 1, the type 0 PDCCH common search space, the type 0a PDCCH common search space, the type 1 PDCCH common search space, and/or the type 2 PDCCH common search space may be used at least for the DCI format accompanying the CRC sequence scrambled using the C-RNTI.

In a case that the C-RNTI is given to the terminal apparatus 1, a search space set given based on at least one of the higher layer parameter PDCCH-ConfigSIB1, the higher layer parameter SearchSpaceZero, the higher layer parameter SearchSpaceSIB1, the higher layer parameter SearchSpaceOtherSystemInformation, the higher layer parameter ra-SearchSpace, and the higher layer parameter PagingSearchSpace may be used at least for a DCI format accompanying the CRC sequence scrambled using the C-RNTI.

The common CORESET may include at least one or both of the CSS and the USS. The dedicated CORESET may include at least one or both of the CSS and the USS.

A physical resource of the search space includes a Control Channel Element (CCE) of the control channel. The CCE include six Resource Element Groups (REGs). An REG may include a single OFDM symbol of a single Physical Resource Block (PRB). In other words, the REG may include 12 Resource Elements (REs). The PRBs may also be referred to simply as a resource blocks (RB).

The PDSCH is used at least for transmitting the TB. In addition, the PDSCH may be used at least for transmitting a random access message 2 (RAR, Msg2). The PDSCH may be used at least for transmitting system information including parameters used for an initial access.

In FIG. 1, the following downlink physical signals are used for the downlink radio communication. The downlink physical signals may not be used for transmitting information output from a higher layer, but are used by the physical layer.

Synchronization signal
DownLink DeModulation Reference Signal (DL DMRS)
Channel State Information-Reference Signal (CSI-RS)
DownLink Phrase Tracking Reference Signal (DL PTRS)
Tracking Reference Signal (TRS)

The synchronization signal is used for the terminal apparatus 1 to establish synchronization in a frequency domain and a time domain in the downlink. The synchronization signal includes a Primary Synchronization Signal (PSS) and a Second Synchronization Signal (SSS).

An SSB (SS/PBCH block) is configured to include at least some or all of the PSS, the SSS, and the PBCH. Respective antenna ports of some or all of the PSS, SSS, and PBCH included in the SS block may be the same. Some or all of the PSS, the SSS, and the PBCH included in the SSB may be mapped into consecutive OFDM symbols. The CP configurations of some or all of the PSS, the SSS, and the PBCH included in the SSB may be the same. As the SCS configurations μ for some or all of the PSS, the SSS, the PBCH included in the SSB, the same value may be applied.

The DL DMRS is associated with transmission of the PBCH, PDCCH, and/or PDSCH. The DL DMRS is multiplexed with the PBCH, the PDCCH, and/or PDSCH. The terminal apparatuses 1 may use the DL DMRS corresponding to the PBCH, PDCCH, or PDSCH in order to perform channel compensation of the PBCH, PDCCH, or PDSCH. Hereinafter, transmission of both the PBCH and a DL DMRS associated with the PBCH may be referred to as transmission of the PBCH. In addition, transmission of both the PDCCH and a DL DMRS associated with the PDCCH may be simply referred to as transmission of the PDCCH. Furthermore, transmission of both the PDSCH and a DL DMRS associated with the PDSCH may be simply referred to as transmission of the PDSCH. The DL DMRS associated with the PBCH may also be referred to as a DL DMRS for the PBCH. The DL DMRS associated with the PDSCH may also be referred to as a DL DMRS for the PDSCH. The DL DMRS associated with the PDCCH may also be referred to as a DL DMRS associated with the PDCCH.

The DL DMRS may be a reference signal individually configured for the terminal apparatus 1. The sequence of the DL DMRS may be given at least based on a parameter individually configured for the terminal apparatus 1. The sequence of the DL DMRS may be given at least based on a UE-specific value (for example, C-RNTI, or the like). The DL DMRS may be individually transmitted for the PDCCH and/or the PDSCH.

The CSI-RS may be a signal that is used at least for calculating the CSI. The CSI-RS may be used for measuring Reference Signal Received Power (RSRP) and Reference Signal Received Quality (RSRQ). A pattern of the CSI-RS assumed by the terminal apparatus 1 may be given by at least a higher layer parameter.

The PTRS may be a signal to be at least used to compensate for phase noise. A pattern of the PTRS assumed by the terminal apparatus 1 may be given based on at least a higher layer parameter and/or the DCI.

The DL PTRS may be associated with a DL DMRS group that includes at least an antenna port used for one or multiple DL DMRSs. The association of the DL PTRS with the DL DMRS group may mean that the antenna port for the DL PTRS and some or all of the antenna ports included in the DL DMRS group are at least QCL. The DL DMRS group may be identified at least based on the antenna port of the lowest index of antenna ports for the DL DMRS included in the DL DMRS group.

The TRS may be a signal to be used at least for time and/or frequency synchronization. A pattern of the TRS assumed by the terminal apparatus may be given based at least on a higher layer parameter and/or DCI.

The downlink physical channels and the downlink physical signals may also be collectively referred to as downlink signals. The uplink physical channels and the uplink physical signals may also be collectively referred to as uplink signals. The downlink signals and the uplink signals may also be collectively referred to as physical signals or signals. The downlink physical channels and the uplink physical channels may also be collectively referred to as physical channels. In the downlink, the physical signal may include some or all of the SSB, the PDCCH (CORESET), the PDSCH, the DL DMRS, the CSI-RS, the DL PTRS, and the TRS. In addition, in the uplink, the physical signal may include some or all of the PRACH, the PUCCH, the PUSCH, the UL DMRS, the UL PTRS, and the SRS. The physical signal may be a signal other than the signals described above. In other words, the physical signal may include one or multiple types of physical channels and/or physical signals or may include one or multiple physical channels and/or physical signals.

A Broadcast CHannel (BCH), an Uplink-Shared CHannel (UL-SCH) and a Downlink-Shared Channel (DL-SCH) are transport channels. A channel used in a medium access control (MAC) layer may also be referred to as a transport channel. A unit of the transport channel used in the MAC layer may also be referred to as a TB or a MAC PDU. Control of the HARQ is performed for each TB in the MAC layer. The TB is a unit of data that the MAC layer delivers to the physical layer. In the physical layer, the TB is mapped into codewords, and a modulation process is performed for each of the codeword.

The base station apparatus 3 and the terminal apparatus 1 exchange (transmit and/or receive) higher layer signaling in the higher layer. For example, the base station apparatus 3 and the terminal apparatus 1 may transmit and/or receive RRC signaling (an RRC message, RRC information, an RRC parameter, and an RRC information element) in the radio resource control (RRC) layer. Furthermore, the base station apparatus 3 and the terminal apparatus 1 may transmit and/or receive, in the MAC layer, a MAC Control Element (CE). Here, the RRC signaling and/or the MAC CE is also referred to as higher layer signaling.

The PUSCH and the PDSCH may be used at least to transmit the RRC signaling and/or the MAC CE. Here, the RRC signaling transmitted from the base station apparatus 3 through the PDSCH may be signaling common to multiple terminal apparatuses 1 in a serving cell. The signaling that is common to multiple terminal apparatuses 1 with the serving cell may also be referred to as common RRC signaling. The RRC signaling transmitted from the base station apparatus 3 in the PDSCH may be signaling dedicated to a certain terminal apparatus 1 (it may also be referred to as dedicated signaling or UE-specific signaling). The signaling dedicated to the terminal apparatus 1 may also be referred to as dedicated RRC signaling. A serving cell-specific higher layer parameter may be transmitted by using the signaling common to the multiple terminal apparatuses 1 in the serving cell or the signaling dedicated to a certain terminal apparatus 1. A UE-specific higher layer parameter may be transmitted by using the signaling dedicated to the certain terminal apparatus 1.

A Broadcast Control CHannel (BCCH), a Common Control CHannel (CCCH), and a Dedicated Control CHannel (DCCH) are logical channels. For example, the BCCH is a higher layer channel used to transmit the MIB. Furthermore, the Common Control CHannel (CCCH) is a higher layer channel used to transmit information common to the multiple terminal apparatuses 1. Here, the CCCH may be used for a terminal apparatus 1 that is not in an RRC connected state, for example. Furthermore, the Dedicated Control CHannel (DCCH) is a higher layer channel at least used to transmit control information dedicated to the terminal apparatus 1 (dedicated control information). Here, the DCCH may be used for a terminal apparatus 1 that is in an RRC connected state, for example.

The BCCH in the logical channel may be mapped to the BCH, the DL-SCH, or the UL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped into the PUSCH in the physical channel. The DL-SCH in the transport channel may be mapped into the PDSCH in the physical channel. The BCH in the transport channel may be mapped into the PBCH in the physical channel.

A configuration example of the terminal apparatus 1 according to the one aspect of the present embodiment will be described below.

Figure 5:
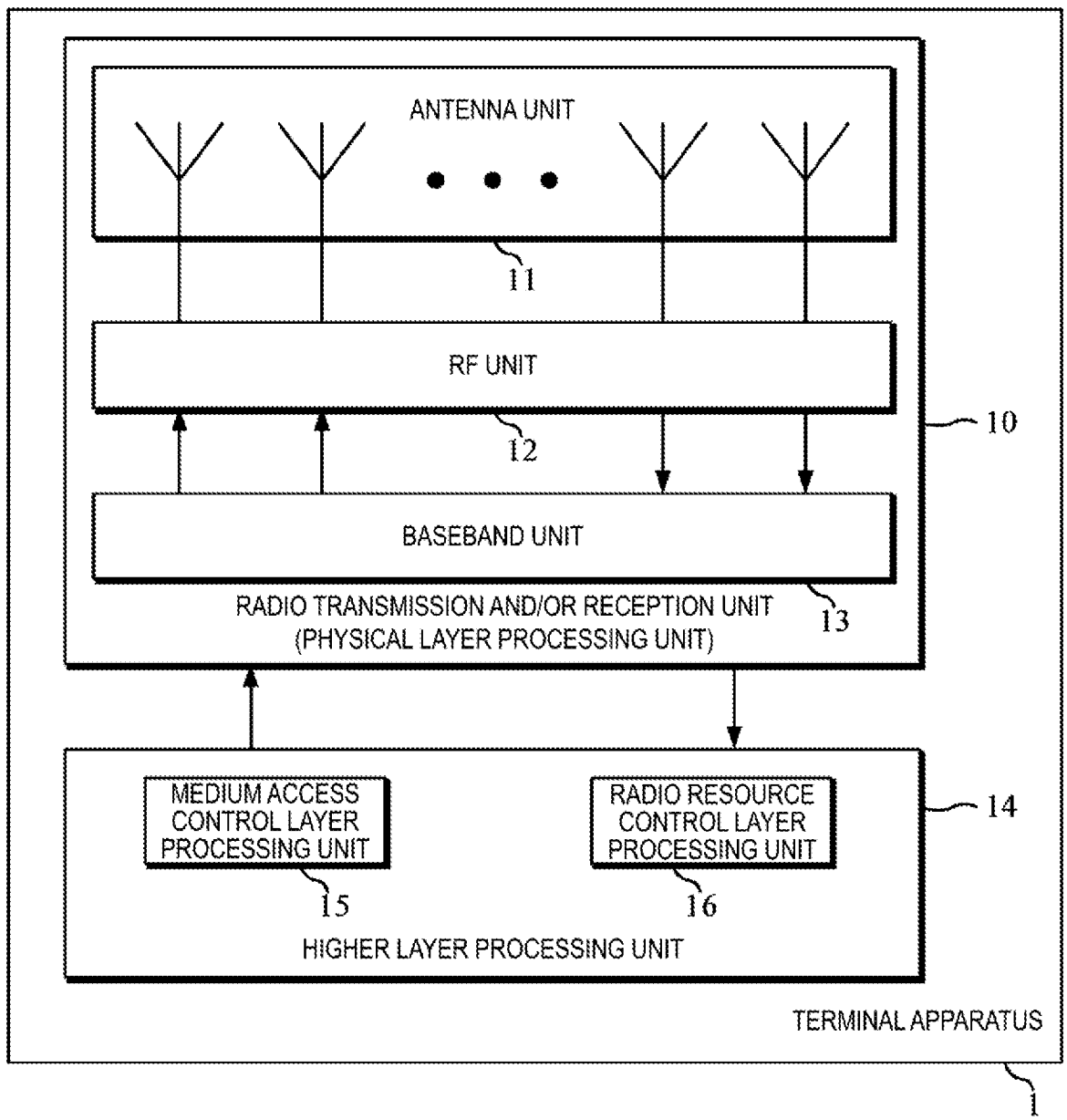
FIG. 5 is a schematic block diagram illustrating a configuration of a terminal apparatus according to one aspect of the present embodiment.

FIG. 5 is a schematic block diagram illustrating a configuration of the terminal apparatus 1 according to an aspect of the present embodiment. As illustrated, the terminal apparatus 1 is configured to include a radio transmission and/or reception unit 10 and a higher layer processing unit 14. The radio transmission and/or reception unit 10 is configured to include at least some or all of an antenna unit 11, a Radio Frequency (RF) unit 12, and a baseband unit 13. The higher layer processing unit 14 is configured to include at least some or all of a medium access control layer processing unit 15 and a radio resource control layer processing unit 16. The radio transmission and/or reception unit 10 may also be referred to as a transmitting unit, a receiving unit, a physical layer processing unit, and/or a lower layer processing unit.

The higher layer processing unit 14 outputs uplink data (the TB, the UL-SCH) generated in accordance with a user's operation or the like to the radio transmission and/or reception unit 10. The higher layer processing unit 14 performs processing of the MAC layer, the packet data convergence protocol (PDCP) layer, the radio link control (RLC) layer, and the RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various types of configuration information/parameters of the terminal apparatus 1. The radio resource control layer processing unit 16 sets various types of configuration information/parameters based on a higher layer signaling received from the base station apparatus 3. Namely, the radio resource control layer processing unit 16 sets the various configuration information/parameters in accordance with the information for indicating the various configuration information/parameters received from the base station apparatus 3. The parameters may be parameters and/or information elements of a higher layer.

The radio transmission and/or reception unit 10 performs processing of the physical layer such as modulation, demodulation, coding, decoding, and the like. The radio transmission and/or reception unit 10 demultiplexes, demodulates, and decodes a received physical signal and outputs the decoded information to the higher layer processing unit 14. These processes may also be referred to as a receiving process. The radio transmission and/or reception unit 10 generates a physical signal (uplink signal) by performing modulation and coding of data and generation of a baseband signal (conversion into a time-continuous signal) and transmits the generated physical signal to the base station apparatus 3. These processes may also be referred to as a transmission process.

The RF unit 12 converts (down-converts) a signal received via the antenna unit 11 into a baseband signal through orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to the CP from a digital signal acquired through the conversion, performs fast Fourier transform (FFT) on the signal from which the CP has been removed, and extracts a signal of the frequency domain.

The baseband unit 13 generates an OFDM symbol by performing Inverse Fast Fourier Transform (IFFT) on the data, adds a CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

A configuration example of the base station apparatus 3 according to one aspect of the present embodiment will be described below.

Figure 6:
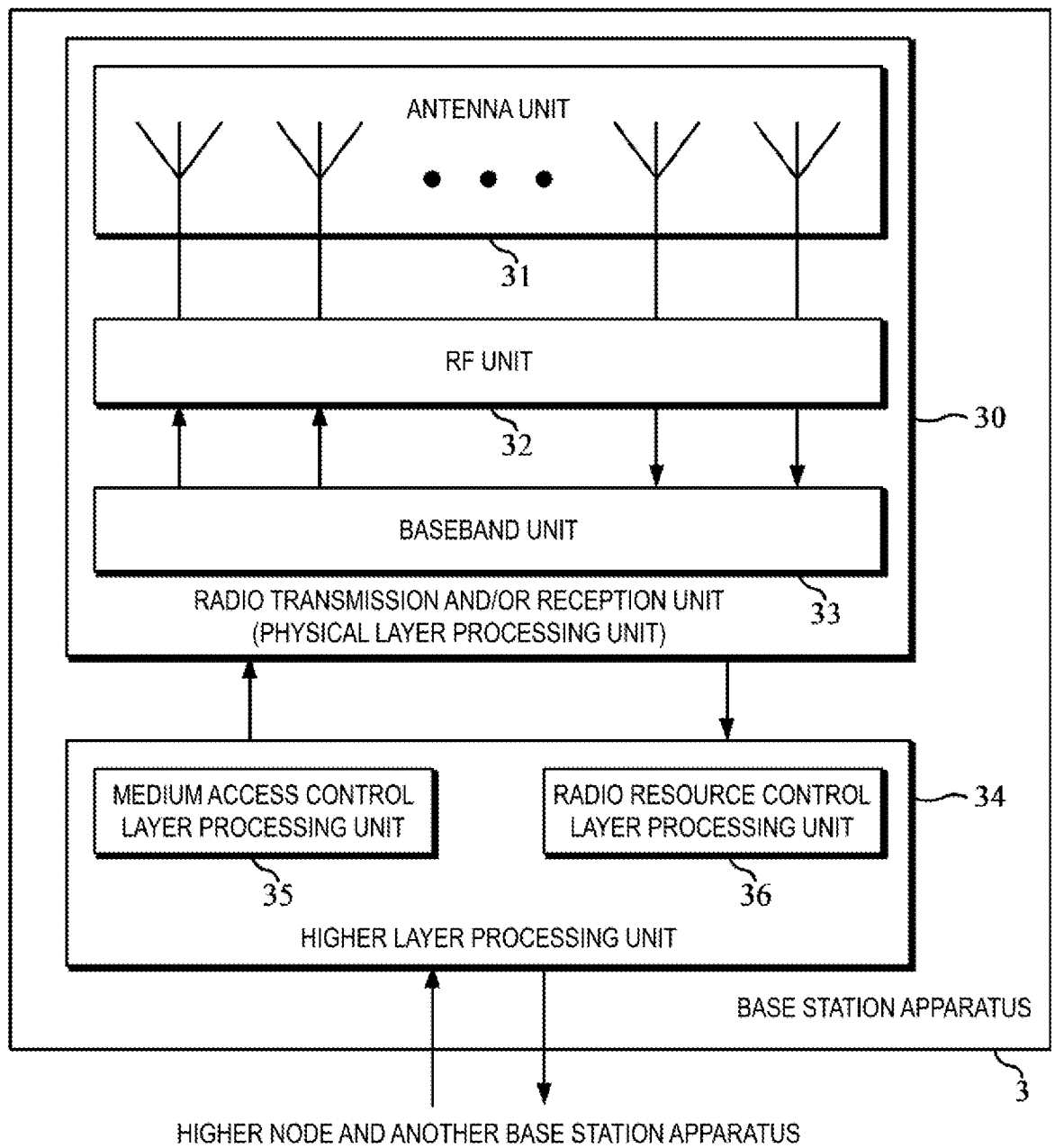
FIG. 6 is a schematic block diagram illustrating a configuration of a base station apparatus according to one aspect of the present embodiment.

FIG. 6 is a schematic block diagram illustrating a configuration of the base station apparatus 3 according to an aspect of the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit.

The higher layer processing unit 34 performs processing of a MAC layer, a PDCP layer, an RLC layer, and an RRC layer.

The medium access control layer processing unit 35 included in the higher layer processing unit 34 performs the process of the MAC layer.

The radio resource control layer processing unit 36 included in the higher layer processing unit 34 performs the process of the RRC layer. The radio resource control layer processing unit 36 generates downlink data (a TB, a DL-SCH), system information, an RRC message, a MAC CE, and the like arranged in the PDSCH or acquires them from a higher node and outputs the acquired data to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/reports information indicating various types of configuration information/parameters.

The basic function of the radio transmission and/or reception unit 30 is similar to that of the radio transmission and/or reception unit 10, and thus, description thereof will be omitted. A physical signal generated by the radio transmission and/or reception unit 30 is transmitted to the terminal apparatus 1 (in other words, a transmission process is performed). In addition, the radio transmission and/or reception unit 30 performs the process of receiving the received physical signal.

The medium access control layer processing unit 15 and/or 35 may also be referred to as a MAC entity.

Each of the units having the reference signs 10 to 16 included in the terminal apparatus 1 may be configured as a circuit. Each of the units having the reference signs 30 to 36 included in the base station apparatus 3 may be configured as a circuit. Some or all of units 10 to 16 included in the terminal apparatus 1 may be configured as a memory and a processor connected to the memory. Some or all of units 30 to 36 included in the base station apparatus 3 may be configured as a memory and a processor connected to the memory. Various aspects (operations and processes) according to the present embodiment may be realized (performed) by a memory included in the terminal apparatus 1 and/or the base station apparatus 3 and the processor connected to the memory.

Figure 7:
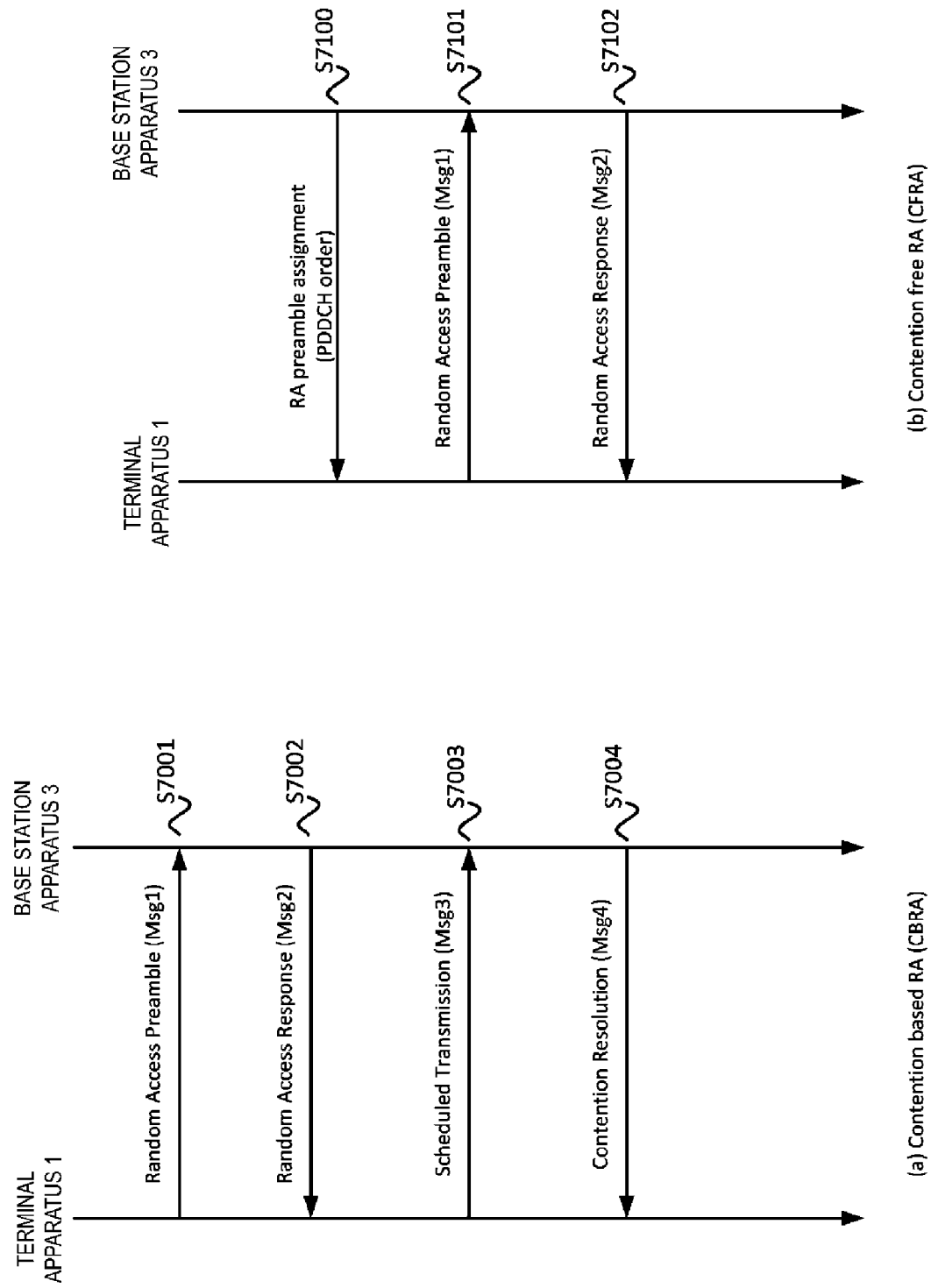
FIG. 7 is a diagram illustrating an example of a random access procedure according to one aspect of the present embodiment.

FIG. 7 is a diagram illustrating an example of the random access procedure according to an aspect of the present embodiment. FIG. 7(*a*) is an example of an RA based on contention (Contention-Based Random Access (CBRA)). FIG. 7(*b*) is an example of Contention-Free RA (CFRA), Non-Contention-Based RA (NCBRA).

The random access procedure is performed for an initial access from RRC idle, RRC connection (re-) establishment, beam failure recovery, handover, downlink data arrival, uplink data arrival, positioning, Timing Advance or Timing Alignment (TA). Although the CBRA may be performed for all the cases, the CFRA is performed for the handover, the downlink data arrival, the positioning, and the TA.

The CBRA is performed by the terminal apparatus 1 as a subject (spontaneously), and thus, there are cases that a contention occurs due to multiple terminal apparatuses 1 simultaneously performing the random access procedure (in other words, initiating the random access procedure at the same timing). On the other hand, by giving an indication to the terminal apparatuses 1 to which the base station apparatus 3 is connected, the CFRA can cause random access procedures to be performed such that a contention does not occur between multiple terminal apparatuses 1.

The CBRA procedure of FIG. 7(*a*) will be described.

S7001 is a step in which the terminal apparatus 1 requests a response for an initial access from a target cell through the PRACH. In S7001, a message transmitted by the terminal apparatus 1 through the PRACH may be referred to as Msg1. Msg1 may be a random access preamble configured by a higher layer parameter.

Before the process of S7001 is performed, the terminal apparatus 1 may perform time-frequency synchronization, frame synchronization, and/or acquisition of system information (acquisition/configuration of one or multiple higher layer parameters relating to the cell) through reception of the SSB.

S7002 is a step in which the base station apparatus 3 responds to Msg1 for the terminal apparatus 1. The message used for the response may also be referred to as Msg2. Msg2 may be transmitted through the PDSCH. The PDSCH including Msg2 may be scheduled by a PDCCH mapped into type 1 PDCCHCSS. In other words, after transmitting Msg1, the terminal apparatus 1 may monitor the PDCCH to be used for scheduling of the PDSCH including Msg2. A Cyclic Redundancy Check (CRC) bit included in the PDCCH may be scrambled using a Random Access-Radio Network Temporary Identifier (RA-RNTI). Msg2 may include an uplink grant (RAR grant) to be used for scheduling of the PUSCH including Msg3. The RAR grant may include at least a Temporary Cell-RNTI (TC-RNTI). The RAR grant may include a Transmission Power Control (TPC) command indicating a correction value for a power control adjustment value that is used for transmission power of the PUSCH including Msg3.

S7003 is a step in which the terminal apparatus 1 transmits at least a request for an RRC connection or RRC connection re-establishment and the C-RNTI of the terminal apparatus 1 to a target cell (the base station apparatus 3 that is a target). For example, a message transmitted by the terminal apparatus 1 may be referred to as Msg3. Msg3 may include an ID (Identifier, Identity) for identifying the terminal apparatus 1. The ID may be an ID managed in a higher layer. The ID may be an SAE Temporary Mobile Subscriber Identity (S-TMSI). The ID may be mapped into the CCCH of the logical channel.

S7004 is a step in which the base station apparatus 3 transmits a contention resolution message (Msg4) to the terminal apparatus 1. After transmitting Msg3, the terminal apparatus 1 may monitor the PDCCH that is used for scheduling of the PDSCH including Msg4. Msg4 may include a contention resolution ID (UE contention resolution ID). The contention resolution ID may be used for resolving a contention in which multiple terminal apparatuses 1 transmit signals using the same radio resource.

In S7004, in a case that a contention resolution ID included in Msg4 received by the terminal apparatus 1 has the same value as an ID used for identifying the terminal apparatus 1, the terminal apparatus 1 may consider that contention resolution has been successfully completed and set the value of the TC-RNTI in the C-RNTI field. The terminal apparatus 1 having the value of the TC-RNTI set in the C-RNTI field may be considered to have completed an RRC connection. In order to notify the base station apparatus 3 of the completion of the RRC connection, the terminal apparatus 1 that has completed the RRC connection may set (map) Ack (Msg5) in the PUCCH (PUCCH resource) indicated by the PUCCH resource indication field included in the PDCCH that has scheduled Msg4 and transmit the PUCCH. This Ack may correspond to the HARQ process ID (HPID, HARQ process number) included in the PDCCH that has scheduled Msg4.

The CORESET for monitoring the PDCCH used for scheduling Msg4 may be the same as or different from the CORESET monitoring the PDCCH used for scheduling Msg2 or may be individually configured.

In a case that carrier aggregation or Dual Connectivity (DC) is configured, S7001, S7002, and S7003 may be performed in the SpCell, and S7004 may be performed in a cell (SpCell or SCell) indicated in accordance with cross carrier scheduling.

The CFRA procedure of FIG. 7(b) will be described.

S7100 is a step in which the base station apparatus 3 requests the terminal apparatus 1 to transmit a random access preamble (Msg1) for the purpose of handover or the like. S7100 is a random access procedure performed in a state in which an RRC connection is established between the base station apparatus 3 and the terminal apparatus 1. The base station apparatus 3 may perform assignment (resource assignment) of the random access preamble (Msg1) through dedicated signaling. The PDCCH for such dedicated signaling may also be referred to as a PDCCH order. This Msg1 may be assigned using a set different from Msg1 used in the CBRA. The terminal apparatus 1 monitors the PDCCH (the PDCCH order) for performing resource assignment of Msg1 in S7100. The PDCCH order may be a DCI format in which the CRC of the DCI format 1_0 is scrambled using the C-RNTI, and all the values of 3B described above are "1".

In the DCI format 1_0 used for the random access procedure initiated by the PDCCH order, at least one or all of the following 5A to 5E may be included as fields.

5A) Random access preamble index field
5B) UL/SUL indicator field
5C) SS/PBCH Index field
5D) PRACH mask index field
5E) Reserved bit 5A described above corresponds to the higher layer parameter ra-PreambleIndex. In a case that all the values of 5A described above are not "0", 5B described above is used for indicating a carrier for transmitting the PRACH. Otherwise, this field is reserved. In a case that all the values of 5A described above are not "0", 5C described above indicates an index of the SSB used for determining the transmission timing (PRACH occasion) of the PRACH. Otherwise, this field is reserved. In a case that none of all the values of 5A described above are "0", 5D described above is used for indicating the transmission timing of the RACH associated with the SSB corresponding to 5C described above. Otherwise, this field is reserved. Here, "0" may be a zero padding bit.

S7101 is a step in which Msg1 to which the terminal apparatus 1 is assigned is transmitted in a case that the PDCCH including resource assignment of Msg1 has been received. After transmitting Msg1, the terminal apparatus 1 may monitor the PDCCH (PDCCH search space) used for scheduling the PDSCH including Msg2.

S7102 is a step in which the base station apparatus 3 responds to Msg1 for the terminal apparatus 1. The basic process is the same as that of S7002, and thus description thereof will be omitted.

In a case that the CFRA is performed in the SpCell, S7100, S7101, and S7102 may be performed in the SpCell.

A higher layer parameter for the random access procedure may be configured.

In the random access procedure, the following 6A to 6I may be used as variables of the terminal apparatus 1 by a MAC entity of the terminal apparatus 1.

6A) PREAMBLE_INDEX
6B) PREAMBLE_TRANSMISSION_COUNTER
6C) PREAMBLE_POWER_RAMPING_COUNTER
6D) PREAMBLE_POWER_RAMPING_STEP
6E) PREAMBLE_RECEIVED_TARGET_POWER
6F) PREAMBLE_BACKOFF
6G) PCMAX
6H) SCALING_FACTOR_BI
6I) TEMPORARY_C-RNTI

In a case that the random access procedure is initiated in a certain serving cell (in other words, in S7001 or S7100 illustrated in FIG. 7), the MAC entity of the terminal apparatus 1 may flush an Msg3 buffer, set the value of 6B described above to 1, set the value of 6C described above to 1, set the value of 6F described above to 0 ms, set the value of 6H described above to 1, set the values of 6D, 6E, and 6G described above based on corresponding one or multiple higher layer parameters, and perform a random access resource selecting procedure.

In S7001 or S7101 illustrated in FIG. 7, the value of 6A described above may be set to the value of ra-PreambleIndex corresponding to the selected SSB or CSI-RS or ra-PreambleIndex values explicitly indicated by the PDCCH or the RRC. The terminal apparatus 1 may configure the PRACH resource (the resource of the random access preamble) corresponding to the set index and perform a random access preamble transmitting procedure.

In S7001 or S7101 illustrated in FIG. 7, in a case that the value of 6B described above is greater than 1 for the random access preamble, in a case that a stop notification for a power ramping counter has not been received from a lower layer, and in a case that the selected SSB has not been changed, the MAC entity of the terminal apparatus 1 may increment the value of 6C described above by one. In addition, the MAC entity of the terminal apparatus 1 may set the value of 6E described above to a value of transmission power based on at least the higher layer parameter preambleReceivedTargetPower, the value of 6C described above, and the value of 6D described above and indicate the physical layer to transmit a random access preamble using the selected PRACH, the corresponding RA-RNTI, 6A described above and 6E described above. The higher layer parameter preambleReceivedTargetPower corresponds to an initial value of the transmission power of the random access preamble.

In a case that the random access preamble is transmitted, the MAC entity of the terminal apparatus 1 starts ra-ResponseWindow configured by the higher layer parameter BeamFailureRecoveryConfig at a first PDCCH reception timing (first PDCCH occasion) from the end of transmission of the random access preamble in S7101 regardless of possible generation of a measurement gap. The MAC entity of the terminal apparatus 1 may monitor the PDCCH of the SpCell for the response to a beam failure recovery request identified by the C-RNTI while ra-ResponseWindow is running.

Similarly, in S7001, the MAC entity of the terminal apparatus 1 starts ra-ResponseWindow configured by the higher layer parameter RACH-ConfigCommon at a reception timing of the first PDCCH from the end of transmission of the random access preamble. The MAC entity of the terminal apparatus 1 may monitor the PDCCH of the SpCell for the RAR identified by the RA-RNTI while ra-ResponseWindow is running.

In S7001 to S7002 or S7101 to S7102, in a case that ra-ResponseWindow has expired, and corresponding Msg2 has not been received, the MAC entity of the terminal apparatus 1 may increment the value of 6B described above by one. In a case that the incremented value of 6B described above is the higher layer parameter preambleTransMax+1, a random access problem is indicated to the higher layer (the RRC layer).

In S7003, in a case that Msg3 is transmitted, the MAC entity of the terminal apparatus 1 may start or restart the higher layer parameter ra-ContentionResolutionTimer at the first symbol at the end of the transmission of Msg3 and monitor the PDCCH while the ra-ContentionResolutionTimer is running.

In S7003 to S7004, in a case that the ra-ContentionResolutionTimer expires, the MAC entity of the terminal apparatus 1 discards the value of 6I described above and considers that contention resolution is not successful. In a case that the contention resolution is considered not successful, the MAC entity of the terminal apparatus 1 may flush the HARQ buffer used for the transmission of the MAC PDU in Msg3 buffer and increment the value of 6B described above by one. In a case that the incremented value of 6B is the higher layer parameter preambleTransMax+1, the random access problem is indicated to the higher layer (RRC layer). In other words, in a case that the value of 6B described above exceeds the maximum number of times of transmission of the preamble, the MAC entity of the terminal apparatus 1 indicates the random access problem to the higher layer (the RRC layer). In a case that the random access procedure has not been completed, the MAC entity of the terminal apparatus 1 may select a random backoff time between 0 and 6F described above, delay the transmission of the random access preamble by the back-off time, and perform the random access resource selecting procedure. The value of the higher layer parameter preambleTransMax may be the maximum value of 6B described above.

Based on the completion of the random access procedure, the MAC entity of the terminal apparatus 1 discards the CFRA resource except for a CFRA resource for a beam failure recovery request and flushes the HARQ buffer used for the transmission of the MAC PDU of Msg3.

Figure 8:
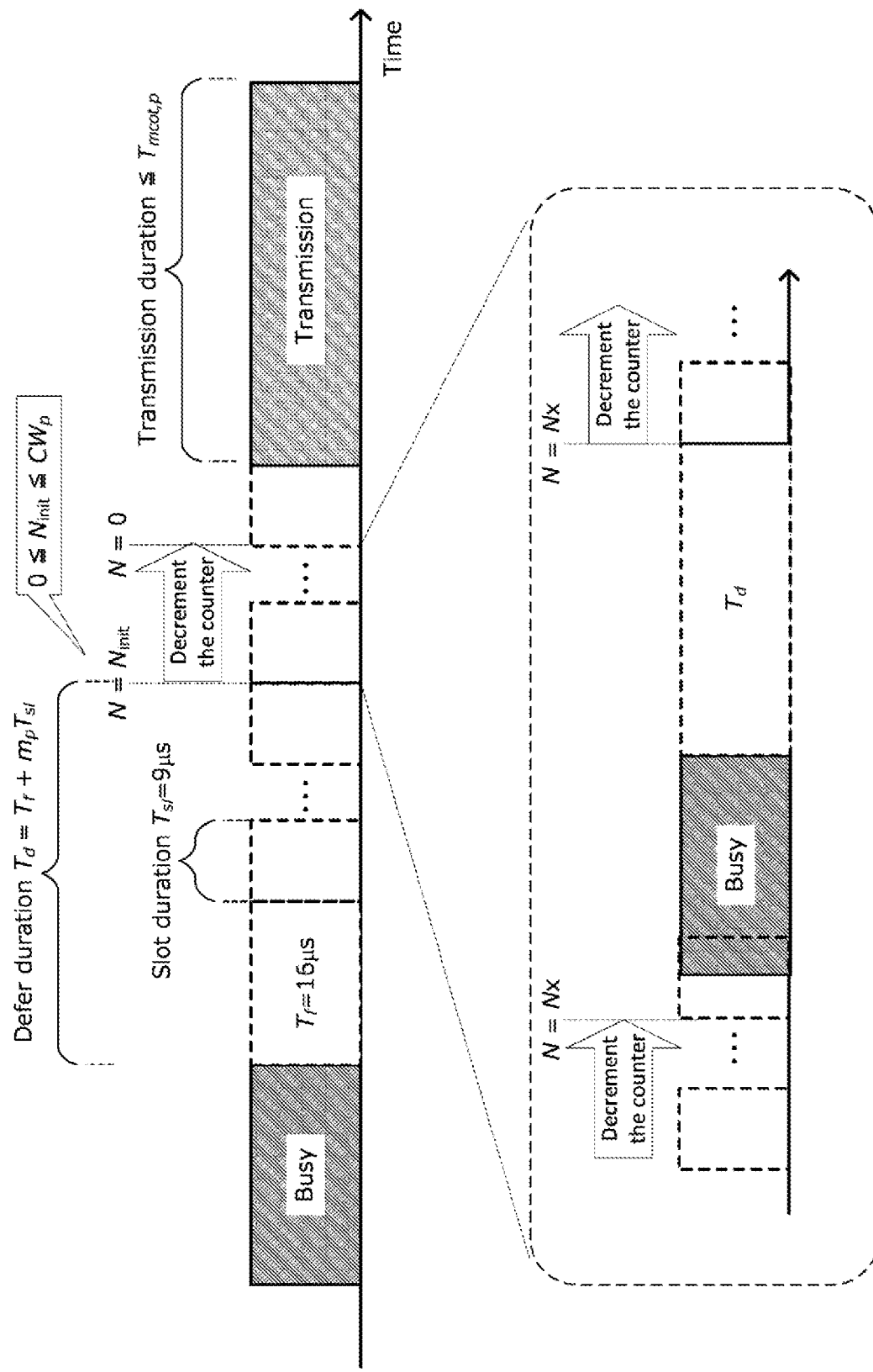
FIG. 8 is a diagram illustrating an example of a channel access procedure (CAP) according to one aspect of the present embodiment.

FIG. 8 is a diagram illustrating an example of a channel access procedure (CAP) according to an aspect of the present embodiment. The terminal apparatus 1 or the base station apparatus 3 performs energy detection before transmission of a predetermined physical signal, and, in a case that it is determined that a carrier (that is, the NR-U carrier), a BWP (in that is, the NR-U BWP), or a channel (that is, the NR-U channel) for which NR-U cell transmission is performed is idle (clearing, freeing, or communication has not been performed, a specific physical signal has not been transmitted, power (energy) of a specific physical signal has not been detected, or detected (measured) power (energy) or a sum of power levels does not exceed a predetermined threshold) for a predetermined period, the terminal apparatus 1 or the base station apparatus 3 may transmit a physical signal in the carrier, the BWP, or the channel. In other words, in a case that communication is performed in the NR-U cell, the terminal apparatus 1 or the base station apparatus 3 performs Clear Channel Assessment (CCA) or channel measurement for checking that the NR-U cell has been idle for a predetermined period. The predetermined period may be determined from a delay period $T_d$, a counter N, and a CCA slot period $T_{sl}$. In a case that the CCA is performed, not being idle may also be referred to as being busy. The CCA may be performed by the radio transmission and/or reception unit 10 of the terminal apparatus 1 and/or the radio transmission and/or reception unit 30 of the base station apparatus 3. The channel access procedure may include performing of CCA for a predetermined period before the terminal apparatus 1 or the base station apparatus 3 transmits a physical signal in a certain channel. A procedure for performing energy detection for determining whether a channel is idle before transmission of such a physical signal or a procedure of determining whether a channel is idle and transmitting a physical signal in the case of being idle may also be referred to as a channel access procedure and/or a CCA procedure, and/or a Listen Before Talk (LBT) procedure. Here, the NR-U cell may be an NR-U carrier and/or an NR-U BWP and/or an NR-U channel and may include at least a frequency band that can be used for transmission of a physical signal of the NR-U. In other words, the NR-U cell, the NR-U carrier, the NR-U BWP, and the NR-U channel may be synonymous.

The predetermined period is a period in which the counter N is 0 in a channel that has been sensed for the first time as being idle in a delay period after detection of a signal of an apparatus other than its own apparatus. The terminal apparatus 1 or the base station apparatus 3 can transmit a signal after the value of the counter N becomes 0. In a case that being busy is determined in the CCA slot period, a decrease in the counter N may be postponed. An initial value $N_{int}$ of the counter N may be determined based on the value of the channel access priority class and the value (CWS: CW size) of the corresponding Contention Window ($CW_p$). For example, the value of $N_{int}$ may be determined based on a random function uniformly distributed between 0 and the value of $CW_p$. The value (the range of the value) that can be taken by $N_{int}$ in accordance with update of the value of $CW_p$ may be expanded.

In a case that one or multiple physical signals are transmitted in the NR-U cell, the terminal apparatus 1 or the base station apparatus 3 sets the value of the counter N to $N_{int}$.

In a case that the value of N is greater than 0, and that being clear is determined in one CCA slot period, the terminal apparatus 1 or the base station apparatus 3 sets the value of N to N−1. In other words, in a case that being clear is determined in one CCA slot period, the terminal apparatus 1 or the base station apparatus 3 may decrease the value of the counter N by one.

In a case that the value of the N that has been decreased becomes 0, the terminal apparatus 1 or the base station apparatus 3 may stop the CCA in the CCA slot period. Otherwise, in other words, in a case that the value of N is greater than 0, the terminal apparatus 1 or the base station apparatus 3 may continuously perform the CCA for the CCA slot period until the value of N becomes 0.

The terminal apparatus 1 or the base station apparatus 3 performs CCA in an added CCA slot period, and, in a case that being idle is determined, and the value of N is 0, the terminal apparatus 1 or the base station apparatus 3 can transmit a physical signal.

The terminal apparatus 1 or the base station apparatus 3 may perform CCA until being busy is determined in the added delay period or being idle is determined in all the slots of the added delay period. In a case that being idle is determined and the value of N is 0 in the added delay period, the terminal apparatus 1 or the base station apparatus 3 can transmit a physical signal. In a case that where it is determined that being busy is determined in the added delay period, the terminal apparatus 1 or the base station apparatus 3 may continuously perform the CCA.

A channel access procedure in which the value p of the CAPC and the value of the $CW_p$ can be changed based on configuration information or conditions may be referred to as a type 1 channel access procedure, and a channel access procedure in which the value of $CW_p$ is constantly 0, or a counter N corresponding to the value of $CW_p$ is not used, or CCA is performed only once before transmission may be referred to as a type 2 channel access procedure. In other words, the type 1 channel access procedure is a channel access procedure in which the CCA period changes in accordance with the value of the $CW_p$ updated based on the value p of the configured CAPC and conditions. In addition, the type 2 channel access procedure is a channel access procedure in which CCA is performed only once before transmission of a physical signal, and transmission can be performed in a case that a channel (frequency band) in which the physical signal is transmitted is determined to be idle. Here, "before transmission" may include immediately prior to the transmission. In a case that the channel access procedure has not been completed before transmission of a physical signal, the terminal apparatus 1 and/or the base station apparatus 3 may not transmit the physical signal at the transmission timing or postpone the transmission.

Figure 9:
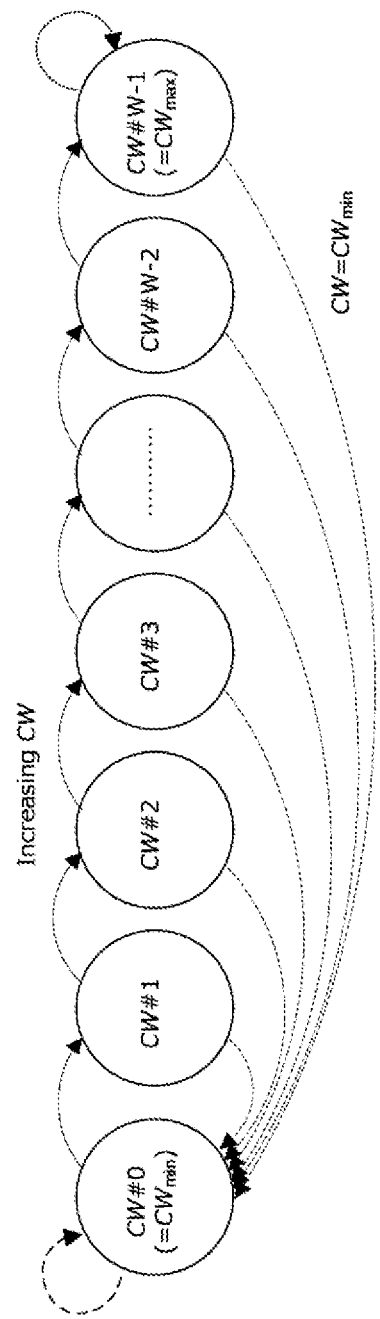
FIG. 9 is a diagram illustrating an example of a channel access priority class (CAPC) and a contention window (CW) adjustment procedure (CWAP) according to one aspect of the present embodiment.

FIG. 9 is a diagram illustrating an example of a channel access priority class (CAPC) and a CW adjustment procedure according to an aspect of the present embodiment.

The value p of the CAPC is used for indicating the number $m_p$ of the CCA slot periods $T_{sl}$ included in the delay period $T_d$, a minimum value and a maximum value of the CW, a maximum channel occupancy time, and an acceptable $CW_p$ value (CWS). The value p of the CAPC may be configured in accordance with a priority level of the physical signal. The value p of the CAPC may be indicated by being included in the DCI format.

The terminal apparatus 1 may adjust the value of the CW used for determining the value of $N_{init}$ before setting $N_{init}$ in the value of the counter N. In a case that the random access procedure has been successfully completed, the terminal apparatus 1 may maintain the updated value of the CW for the random access procedure. In a case that the random access procedure has been successfully completed, the terminal apparatus 1 may set the updated value of the CW in the $CW_{min}$ for the random access procedure. Here, in the present embodiment, for example, the $CW_{min}$ may be CW #0 illustrated in FIG. 9, that is, the initial value of the $CW_p$ corresponding to the value p of the CAPC. Here, the setting of the updated value of the CW to the $CW_{min}$ may be updating of the value of the CW updated in a case that one or multiple predetermined conditions are satisfied to $CW_{min}$. In addition, the setting of the updated CW value to $CW_{min}$ may be setting of the CW value to the $CW_{min}$ again.

The terminal apparatus 1 may adjust the value of the CW for determining the value of $N_{init}$ before setting $N_{init}$ to the value of the counter N corresponding to the CCA performed before the transmission of Msg1. In a case that the reception of Msg2 is considered to be successful and/or the reception of Msg4 is considered to be successful, the terminal apparatus 1 may maintain the updated value of the CW. In addition, in a case that the reception of Msg2 is considered to be successful and/or the reception of Msg4 is considered to be successful, the terminal apparatus 1 may set the updated value of the CW to $CW_{min}$.

Here, the adjusting of the value of the CW may be increasing the value by one level each time until the value reaches $CW_{max}$ from $CW_{min}$ in a case that the value of $CW_p$ satisfies a predetermined condition. In a case that the value reaches $CW_{max}$, the value is increased from $CW_{min}$ by one level each time again. In other words, the adjusting of the value of the CW may be updating the value of the $CW_p$. The updating of the value of the $CW_p$ may be setting the value of the $CW_p$ to a one level higher value. For example, it may be increasing from CW #3 to CW #4 or may be increasing from CW #n−1 to CW #n. The terminal apparatus 1 and/or the base station apparatus 3 may determine the value of $N_{init}$ based on a random function uniformly distributed between 0 and the updated value of the $CW_p$ in a case that the value of the CW is adjusted.

The value p of the channel access priority class (CAPC) applied to the transmission of Msg1 may be determined based on system information, may be determined based on higher layer parameters, or may be associated with an SSB. For example, in a case that the value p of the CAPC corresponding to Msg1 is P, the value of $N_{init}$ is determined based on a random function that is uniformly distributed between 0 and CW #0.

For example, in S7002, S7004, and S7102 illustrated in FIG. 7, in a case that reception of Msg2 or Msg4 is considered to be unsuccessful (not successful), the terminal apparatus 1 increments the value of 6B described above by one. Thereafter, in a case that the terminal apparatus 1 transmits Msg1, the value of the $CW_p$ used for the value of $N_{init}$ is updated from CW #0 to CW #1. The terminal apparatus 1 may adjust (update) the value of the $CW_p$ used for the value of $N_{init}$ in accordance with the value of 6B described above. In a case that a total number of $CW_p$s corresponding to the value p of the CAPC is smaller than the higher layer parameter preambleTransMax, before the value of 6B described above becomes the higher layer parameter preambleTransMax+1, the value of the $CW_p$ may return to $CW_{min}$ (that is, CW #0), and the value of $CW_p$ may be updated again. The value (allowable value) of the $CW_p$ may correspond to a value obtained using mod (the value of 6B described above, the total number of $CW_p$s (for example, W from CW #0 to CW #W−1)). Here, mod (A, B) may be a function for outputting the remainder of A divided by B. For example, in a case that the value of 6B described above is 10, and the total number of $CW_p$s is 7, the value of $CW_p$ may be CW #3.

In S7002 and S7003 illustrated in FIG. 7, in a case that, after the base station apparatus 3 transmits Msg2, a predetermined time has elapsed or the timer has expired, and the base station apparatus 3 considers that reception of Msg3 corresponding to Msg2 to be unsuccessful (not successful), the base station apparatus 3 may adjust the value of the CW for determining the value of $N_{init}$ before transmitting or retransmitting Msg2 and before setting $N_{init}$ to the value of the counter N corresponding to the CCA for Msg2. In a case that the base station apparatus 3 considers reception of Msg3 corresponding to Msg2 to be successful, the updated value of the CW may not be adjusted. In other words, the base station apparatus 3 may maintain the updated value of the CW. In addition, in a case that the base station apparatus 3 considers the reception of Msg3 corresponding to $Msg_2$ to be successful, the updated value of the CW may be set to $CW_{min}$.

In S7004 in FIG. 7, in a case that, after transmitting Msg4, the base station apparatus 3 considers reception of Ack (Msg5) corresponding to Msg4 to be unsuccessful (not successful), the base station apparatus 3 may adjust the value of the CW for determining the value of $N_{init}$ before transmitting or retransmitting Msg4 and before setting the $N_{init}$ to the value of the counter N corresponding to the channel access procedure performed before the transmission of Msg4. In a case that Msg4 is transmitted to multiple terminal apparatuses 1 in a predetermined period, the base station apparatus 3 may determine whether the value of the CW is to be adjusted based on a success rate of the reception of Msg5. In a case that Msg4 is transmitted to multiple terminal apparatuses 1 in a predetermined period, the base station apparatus 3 may determine whether the value of the CW is to be adjusted based on a success rate of the reception of Msg5. In other words, in a case that the success rate of the reception of Msg5 exceeds a predetermined threshold, the base station apparatus 3 may not adjust (maintain) the updated value of the CW. In a case that the success rate of the reception of Msg5 exceeds the predetermined threshold, the base station apparatus 3 may set the updated value of the CW to the $CW_{min}$.

In a case that the terminal apparatus 1 considers the reception of Msg2 to be unsuccessful (not successful), the terminal apparatus 1 may configure the length (value) of ra-ResponseWindow to be a one-level longer value. In addition, in a case that the terminal apparatus 1 considers the reception of Msg4 to be unsuccessful, the terminal apparatus 1 may configure the length (value) of the ra-ContentionResolutionTimer to a one-level longer value. The terminal apparatus 1 may determine the length of ra-ResponseWindow and/or the length of ra-ContentionResolutionTimer based on a value based on the higher layer parameter, the value of the $CW_p$, and the CCA slot period. For example, in a case that the value based on the higher layer parameter is 10 slots (for example, 10 ms), the value p of the CAPC is 4, and the value of the $CW_p$ is 63, the length of ra-ResponseWindow and/or the length of ra-ContentionResolutionTimer may be obtained from 10 ms+63×9+µs+$T_d$ (for example, 25 µs). The value based on the higher layer parameter may be configured for each of ra-ResponseWindow and ra-ContentionResolutionTimer. In a case that the reception of Msg2 is considered to be successful, the terminal apparatus 1 may maintain the length (value) of ra-ResponseWindow. Similarly, in a case that the reception of Msg4 is considered to be successful, the terminal apparatus 1 may maintain the length (value) of ra-ContentionResolutionTimer. In addition, in a case that the reception of Msg2 is considered to be successful, the terminal apparatus 1 may set (return) the length (value) of ra-ResponseWindow to a value configured using the higher layer parameter (in other words, the initial value). Similarly, in a case that the reception of Msg4 is considered to be successful, the terminal apparatus 1 may set (return) the length (value) of the ra-ContentionResolutionTimer to a value configured as a higher layer parameter (in other words, an initial value).

In S7004 in FIG. 7, in a case that Msg1 received in S7001 is received again after the base station apparatus 3 transmits Msg4, the base station apparatus 3 may adjust the value of the CW for determining the value of $N_{init}$ before transmitting Msg2 corresponding to the retransmitted Msg1 and before setting $N_{init}$ to the value of the counter N corresponding to the CCA for Msg2. In a case that the base station apparatus 3 receives Ack (Msg5) for Msg4 after transmitting Msg4, in other words, in a case that the random access procedure has been successfully completed, the base station apparatus 3 may maintain the updated value of the CW. In addition, in a case that the random access procedure has been successfully completed, the base station apparatus 3 may set the updated value of the CW to $CW_{min}$ that is the initial value of the $CW_p$.

In S7101 of FIG. 7, in a case that a predetermined time has elapsed, or the timer has expired, and the base station apparatus 3 considers the reception of Msg1 corresponding to the PDCCH order to be unsuccessful (not successful), the base station apparatus 3 may adjust the value of the CW for determining the value of $N_{init}$ before transmitting or retransmitting the PDCCH order and before setting $N_{init}$ to the value of the counter N corresponding to CCA for the PDCCH order. In a case that the base station apparatus 3 considers the reception of Msg1 corresponding to the PDCCH order to be successful, the base station apparatus 3 may maintain the updated value of the CW. In addition, in a case that the base station apparatus 3 considers the reception of Msg1 corresponding to the PDCCH order to be successful, the base station apparatus 3 may set the updated value of the CW to the $CW_{min}$.

In S7101 of FIG. 7, in a case that a predetermined time has elapsed, or the timer has expired, and the base station apparatus 3 considers the reception of Msg1 corresponding to the PDCCH order to be unsuccessful (not successful), whether the value of the CW for determining the value of $N_{init}$ is to be adjusted may be based on a case that reception of Msg1 corresponding to the PDCCH order transmitted to multiple terminal apparatuses 1 is considered to be unsuccessful (not successful) at a predetermined rate in a predetermined period. For example, in a case that a PDCCH order is transmitted to a terminal apparatus A to a terminal apparatus E in a predetermined first period, in a case that corresponding Msg1 is received from each of the terminal A to the terminal E, the transmission of the PDCCH order is considered to be successful, and the base station apparatus 3 may not adjust the value of the CW. In addition, in a case that a PDCCH order is transmitted to the terminal apparatus A to the terminal apparatus E in a predetermined first period, and that corresponding Msg1 is received from the terminal apparatus A and the terminal apparatus E, and reception of Msg1 from the other terminal apparatuses is considered as being unsuccessful (for example, a success rate of the reception of Msg1 is 40%), the transmission of the PDCCH order is considered to be unsuccessful, and the base station apparatus 3 may adjust the value of the CW for the PDCCH order. In addition, in a case that the success rate of the reception of Msg1 exceeds a predetermined threshold, the base station apparatus 3 may consider the transmission of the PDCCH order to be successful and may maintain the updated value of the CW. In addition, in a case that the success rate of the reception of Msg1 exceeds a predetermined threshold, the base station apparatus 3 may set the updated value of the CW to the $CW_{min}$.

Next, the procedure of a SR according to the present embodiment will be described.

In the MAC entity of the terminal apparatus 1, none, one, or two or more SR configurations may be configured. One SR configuration constitutes a set of PUCCH resources for SRs across different BWPs and/or different cells. For a logical channel, PUCCH resources for one SR at the most may be configured for each BWP. The set of PUCCH resources may include one or multiple PUCCH resources.

Each SR configuration may correspond to one or multiple logical channels. Each logical channel may be mapped to none or one SR configuration. It may be configured by the RRC (in other words, a higher layer parameter, RRC information). The SR configuration of a logical channel that has triggered a Buffer Status Report (BSR) may be seen as an SR configuration corresponding to the triggered SR.

The higher layer parameter (RRC parameter) of the following 7A to 7C may be configured for the SR procedure. 7A and 7B may be configured for each SR configuration. In a case that 7A is not configured, the terminal apparatus 1 may apply 0 as the value of 7A.

7A) sr-ProhibitTimer
7B) sr-TransMax
7C) sr-ConfigIndex

As a variable of the terminal apparatus 1, SR_COUNTER configured for each SR configuration may be used for the SR procedure.

In a case that an SR has been triggered, and there is no other pending SR corresponding to the same SR configuration, the MAC entity of the terminal apparatus 1 sets SR_COUNTER of the corresponding SR configuration to 0.

In a case that an SR is triggered, the SR is seen as pending until the SR is cancelled. In a case that all the pending SRs triggered before assembly of a MAC PDU are cancelled, and the MAC PDU is transmitted, each sr-ProhibitTimer stops, and this MAC PDU includes a BSR MAC CE including a buffer status up to the last event that has triggered the BSR before the assembly of the MAC PDU. In a case that the uplink grant (a resource assigned in accordance with the uplink grant) is able to correspond to all pending data that can be transmitted, all the pending SRs are canceled.

In the terminal apparatus 1, only the PUCCH resource is considered valid in a BWP that is active in a case that there is an SR transmission occasion (SR transmission timing).

In a case that at least one SR is pending, and that a valid PUCCH resource is not configured for each of the pending SRs, the MAC entity of the terminal apparatus 1 initiates the random access procedure in the SpCell and cancels the pending SRs. Otherwise, for the SR configuration corresponding to the pending SR, in a case that the MAC entity of the terminal apparatus 1 has an SR transmission occasion for a valid PUCCH resource in the configured SR, and that sr-ProhibitTimer is not running in the SR transmission occasion, the PUCCH resource for the SR transmission occasion does not overlap with the measurement gap, the PUCCH resource for the SR transmission occasion does not overlap with the UL-SCH resource, and the value of SR_COUNTER is smaller than the value of sr-TransMax, the MAC entity of the terminal apparatus 1 increments the value of SR_COUNTER by one, indicates the physical layer to signal the SR using one valid PUCCH resource for the SR, and starts sr-ProhibitTimer. Otherwise (for example, in a case that the value of SR_COUNTER is the same as the value of sr-TransMax), release of the PUCCH is notified to the RRC (the RRC layer, the RRC layer processing unit) for all the serving cells, release of the SRS is notified to the RRC for all the serving cells, all the downlink assignments (downlink grants) and uplink grants that are configured are cleared, the random access procedure is initiated in the SpCell, and all the pending SRs may be cancelled. Here, release of a physical signal may include release of a resource that has been secured for a target physical signal (here, the PUCCH or the SRS) or may include release of the configuration relating to a target physical signal.

The MAC entity of the terminal apparatus 1 may stop the ongoing random access procedure initiated by the MAC entity before the MAC PDU assembly for the pending SR having no valid PUCCH resource that is configured. In a case that the MAC PDU is transmitted using an uplink grant other than the uplink grant provided by the RAR, such a random access procedure may be stopped. Before the MAC PDU is assembled, or in a case that uplink grants (resources assigned in accordance with the uplink grants) can respond to all the pending data that can be transmitted, this MAC PDU includes the BSR MAC CE including a buffer status up to the last event that has triggered the BSR.

In a case that the terminal apparatus 1 (the MAC entity of the terminal apparatus 1) transmits an SR using the PUCCH resource (indicates the physical layer of the terminal apparatus 1 to trigger transmission of the SR) in the NR-U cell (the NR-U carrier, the NR-U BWP, the NR-U channel), the terminal apparatus 1 may determine whether the channel access procedure is performed before transmission of the SR based on the configured information. The SR may be a PUCCH (PUCCH resource) including at least an SR and/or a PUCCH resource used for transmission of the SR.

In a case that the type 1 channel access procedure is performed before the transmission of the SR (or a PUCCH including the SR), the terminal apparatus 1 sets the value of the CW used for determining the value of the $N_{init}$ used for the type 1 channel access procedure performed before the transmission of the SR corresponding to SR_COUNTER configured for each SR configuration to CW #0 and performs CCA until the value of the counter N becomes 0 before the transmission of the SR. In a case that the NR-U channel is determined to be idle, the terminal apparatus 1 can transmit the SR. In a case in which the NR-U channel is determined to be busy, the terminal apparatus 1 holds (postpones) the transmission of the SR until there is a next transmission occasion. In a case that the value of the SR_COUNTER is incremented by 1, the value of the CW used for the value of the $N_{init}$ corresponding to the SR_COUNTER may be reset from CW #0 ($CW_{min}$) to CW #1 (in other words, the value of the CW may be updated). In a case that the value of the CW used for the value of the $N_{init}$ corresponding to the SR_COUNTER is $CW_{max}$, and the value of the CW value is to be adjusted, the value of the $CW_p$ may be reset to CW #0 ($CW_{min}$), that is, the initial value.

In a case that the SR_COUNTER is set to 0 in the MAC entity, the terminal apparatus 1 and/or the physical layer of the terminal apparatus 1 may set the value of the CW used for the type 1 channel access procedure to the initial value $CW_{min}$. In addition, in a case that it is determined that there is no other pending SR by the MAC entity, the terminal apparatus 1 and/or the physical layer of the terminal apparatus 1 may set the value of the CW used for the type 1 channel access procedure to the initial value $CW_{min}$.

In a case that the type 2 channel access procedure is performed before transmission of an SR (or a PUCCH including an SR), the terminal apparatus 1 performs the CCA only once before transmission of the SR. In a case that the NR-U channel is determined to be idle, the terminal apparatus 1 can transmit the SR, and, in a case that the NR-U channel used for the transmission of the SR is determined to be busy, the terminal apparatus 1 holds (postpones) the transmission of the SR until there is a next transmission occasion. In a case that the terminal apparatus 1 holds the transmission of the SR and performs the type 1 CAP before the transmission of the SR in the next SR transmission occasion, the terminal apparatus 1 may update the value of the CW used for the type 1 CAP with a one-level higher allowable value. In addition, in a case that the terminal apparatus 1 holds the transmission of the SR and has notified the MAC layer (the MAC entity) of holding the transmission of the SR from the physical layer, the terminal apparatus 1 may increment the SR_COUNTER used for the transmission of the SR by one. In a case that the transmission of the SR is on hold based on that the NR-U channel is determined to be busy, the terminal apparatus 1 may not increment the value of SR_COUNTER used for the transmission of the SR.

In a case that the MAC entity of the terminal apparatus 1 cancels all the pending SRs and initiates the random access procedure in the SpCell, and in a case that the channel access procedure before the transmission of the SR is the type 1 channel access procedure, the value of the CW used for the value of the $N_{init}$ for Msg1 of the random access procedure may be configured based on the higher layer parameter or may be a minimum value ($CW_{min}$) of the value of the CW used for the value of the $N_{init}$ for the configuration of the SR. In a case that the channel access procedure before the transmission of the SR is the type 2 channel access procedure, it may be determined whether the NR-U channel is idle by performing the CCA only once before the transmission of Msg1.

Figure 10:
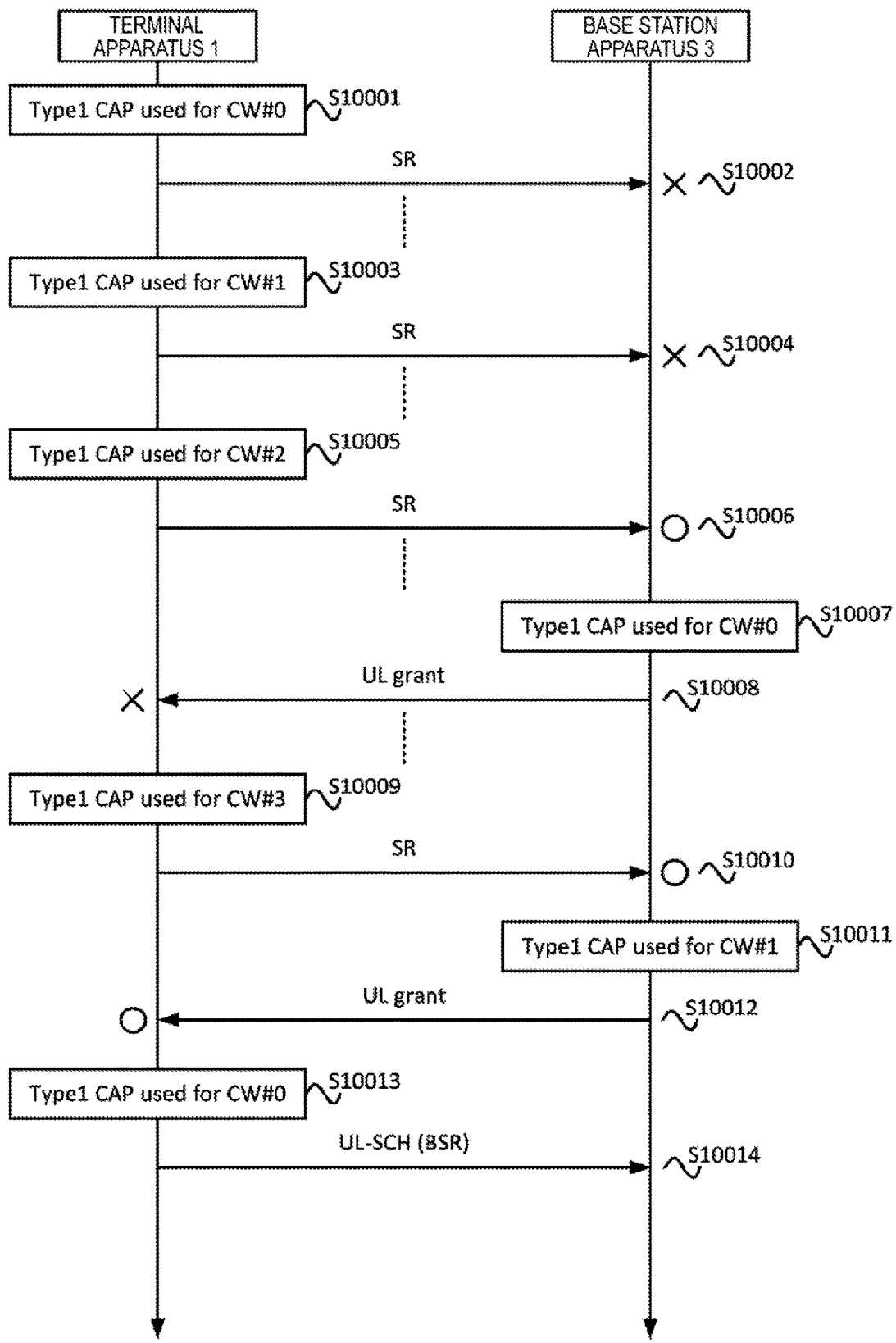
FIG. 10 is a diagram illustrating an example of a CAP and a CWAP at the time of transmission of a scheduling request (SR) according to one aspect of the present embodiment.

FIG. 10 is a diagram illustrating an example of a channel access procedure (CAP) and a CW adjustment procedure (CWAP) at the time of transmission of an SR according to the present embodiment.

In S10001, in a case that the valid PUCCH resource is configured for the pending SR in the NR-U cell, in a case that the conditions described above are satisfied, and the MAC entity indicates the physical layer to signal the SR using the PUCCH resource, the terminal apparatus 1 or the MAC entity of the terminal apparatus 1 performs the channel access procedure (CAP) configured for the PUCCH resource and/or the SR in the physical layer. In a case that the CAP is the type 1 CAP, the value of the $N_{init}$ may be set based on the value of the CW (for example, CW #0) used for the $N_{init}$ set as an initial value in the counter N of the type 1 CAP and the random function. In a case that the values of the $N_{init}$ and N are determined, the terminal apparatus 1 performs the CCA until the value of the counter N becomes 0, performs CCA once immediately before the transmission of the SR, and, in a case that all the cells are idle, the SR is transmitted in an SR transmission occasion.

In S10002, in a case that the terminal apparatus 1 transmits the SR, a predetermined timer may be caused to run (start). In a case that the terminal apparatus 1 cannot successfully receive the uplink grant for the SR until the predetermined timer has expired, the terminal apparatus 1 considers detection of the SR to be unsuccessful in the base station apparatus 3. At this time, the physical layer of the terminal apparatus 1 may notify the MAC entity of the terminal apparatus 1 of being unsuccessful. In a case that the predetermined timer has not expired, and there is an SR transmission occasion, the terminal apparatus 1 performs the type 2 CAP and may transmit the SR in the case of being idle. Here, although the predetermined timer is used, a channel occupancy time (COT) of the terminal apparatus 1 or a predetermined period may be used.

In S10003, in a case that retransmission of the same SR (the SR of the same SR configuration) is performed in the same NR-U cell, the terminal apparatus 1 or the MAC entity of the terminal apparatus 1 increments the value of the SR_COUNTER corresponding to the SR configuration by 1, and, in a case that the conditions described above are satisfied, the MAC entity indicates the physical layer to signal the SR using the PUCCH resource. Based on the indication, the physical layer may update the value of the CW from CW #0 to CW #1 and set the value of the $N_{init}$. The terminal apparatus 1 performs the CCA until the value of the counter N becomes 0 and performs the CCA once immediately before transmission of the SR and, in a case that being idle is determined in all the CCA slot periods, transmits the SR in an SR transmission occasion.

In S10004, in a case that the terminal apparatus 1 transmits the SR, the terminal apparatus 1 may run (start) a predetermined timer. In a case that the terminal apparatus 1 cannot successfully receive an uplink grant for the SR until the predetermined timer expires, the terminal apparatus 1 considers detection of the SR to be unsuccessful in the base station apparatus 3. At this time, the physical layer of the terminal apparatus 1 may notify the MAC entity of the terminal apparatus 1 of the detection being unsuccessful.

In S10005, in a case that retransmission of the same SR (the SR of the same SR configuration) is performed in the same NR-U cell, the terminal apparatus 1 or the MAC entity of the terminal apparatus 1 increments the value of the SR_COUNTER corresponding to the SR configuration by 1, and, in a case that the conditions described above are satisfied, the MAC entity indicates the physical layer to signal the SR using the PUCCH resource. Based on the indication, the physical layer may update the value of the CW from CW #1 to CW #2 and set the value of the $N_{init}$. The terminal apparatus 1 performs the CCA until the value of the counter N becomes 0 and performs the CCA once immediately before transmission of the SR and, in a case that all being idle is determined, transmits the SR in an SR transmission occasion. In a case that there are only CW #0 and CW #1 as allowable values of the CW that can be configured (in other words, there are only two allowable values of the CW that can be configured), the value of the CW may return from CW #1 to CW #0. In a case that there is only one allowable value of the CW that can be configured (for example, only CW #0), the terminal apparatus 1 may set the value of the CW used for the $N_{init}$ between values of 0 to CW #0 based on a random function in a case that the value of the SR_COUNTER is incremented.

In S10006, in a case that the base station apparatus 3 succeeds in reception of an SR, the base station apparatus 3 may transmit a PDCCH including a DCI format (uplink grant) used for scheduling the UL-SCH (PUSCH) for new transmission.

In S10007, in a case that the base station apparatus 3 transmits the uplink grant in the NR-U cell, the base station apparatus 3 performs the CAP before transmitting the uplink grant. In a case that the type 1 CAP is configured for the uplink grant or the PDCCH including the uplink grant, the base station apparatus 3 may set the value of the counter N for the CAP before the transmission of the PDCCH to the value of the $N_{init}$ based on a random function of CW #0, perform the CCA based on the type 1 CAP, and, in the case of all being idle, transmit the uplink grant.

In S10008, in a case that the base station apparatus 3 transmits the uplink grant, the base station apparatus 3 may run a predetermined timer. In addition, in a case that the UL-SCH corresponding to the uplink grant has not been able to be successfully received for a predetermined period after the transmission of the uplink grant, and that the predetermined timer has not expired, the uplink grant may be transmitted by performing the type 2 CAP. Although the predetermined timer is used, a COT of the base station apparatus 3 or a predetermined period may be used. In a case that the predetermined timer has expired, the base station apparatus 3 may not transmit the uplink grant.

In S10008, in a case that the terminal apparatus 1 has not been able to successfully receive the uplink grant, and in a case that the predetermined timer has expired (a predetermined period has elapsed), the type 1 CAP may be performed in a next SR transmission occasion.

In S10009, in a case that retransmission of the same SR (the SR of the same SR configuration) is performed in the same NR-U cell, the terminal apparatus 1 or the MAC entity of the terminal apparatus 1 increments the value of the SR_COUNTER corresponding to the SR configuration by 1, and, in a case that the conditions described above are satisfied, the MAC entity indicates the physical layer to signal the SR using the PUCCH resource. Based on the indication, the physical layer may update the value of the CW from CW #2 to CW #3 and set the value of the $N_{init}$. The terminal apparatus 1 performs the CCA until the value of the counter N becomes 0 and performs the CCA once immediately before transmission of the SR and, in a case that all are idle, transmits the SR in an SR transmission occasion. Although CW #3 has been described, CW #3 may be CW #0 or CW #1 in accordance with the number of values of the CWs that can be configured.

In S10010, in a case that the terminal apparatus 1 transmits an SR, and the base station apparatus 3 has been able to successfully receive the SR, the uplink grant corresponding to the SR may be transmitted.

In S10011, in a case that the base station apparatus 3 transmits the uplink grant in the NR-U cell, the base station apparatus 3 performs the CAP before transmitting the uplink grant. In a case that the type 1 CAP is configured for the uplink grant or the PDCCH including the uplink grant, the base station apparatus 3 updates the value of the CW from CW #0 to CW #1. The base station apparatus 3 may set the value of the counter N for the CAP before the transmission of the PDCCH to the value of the $N_{init}$ based on a random function of CW #1, perform the CCA based on the type 1 CAP, and, in the case of all being idle, transmit the uplink grant.

In S10012, in a case that the terminal apparatus 1 has successfully receive the uplink grant, the terminal apparatus 1 may transmit the UL-SCH using the PUSCH resource scheduled in accordance with the uplink grant. At that time, in a case that the uplink grant includes the CAPC field and a field indicating the type of CAP, the terminal apparatus 1 may determine the type of CAP before the transmission of the PUSCH including the UL-SCH and the value of the CW used for the CAP based on these two fields.

In S10013, in a case that the terminal apparatus 1 has successfully received the uplink grant in the NR-U cell, the terminal apparatus 1 performs the CAP before the transmission of the PUSCH including the corresponding UL-SCH. In a case that being idle is determined in the CAP, the terminal apparatus 1 may transmit the PUSCH. In a case that the type 1 CAP is set in the field indicating the type of CAP included in the uplink grant, the terminal apparatus 1 transmits the PUSCH after performing the type 1 CAP. In a case that the type 2 CAP is set in the field indicating the type of CAP, the terminal apparatus 1 transmits the PUSCH after performing the type 2 CAP. In S10013, an example of a case that the type 1 CAP is set in the field indicating the type of CAP is illustrated. In the case of the type 1 CAP, the terminal apparatus 1 may determine the value of the CW based on the value p of the CAPC set in the CAPC field. In a case that the transmission of the PUSCH is the initial transmission for the terminal apparatus 1, the value of CW may be CW #0. The terminal apparatus 1 may set the value of the counter N for the CAP before the transmission of the PUSCH to the value of the $N_{init}$ based on a random function of CW #0, perform the CCA based on the type 1 CAP, and, in the case of all being idle, transmit the PUSCH (S10014). In addition, in a case that the terminal apparatus 1 has successfully received the uplink grant, the terminal apparatus 1 may set the updated value of the CW used for the transmission of the SR to the $CW_{min}$. In other words, in a case that the transmission of the SR is considered to be successful, the terminal apparatus 1 may set the value of the CW to the $CW_{min}$.

In a case that the value of the SR_COUNTER is set to 0 by the MAC entity, the terminal apparatus 1 may set the updated value of the CW to the $CW_{min}$. In a case that it is determined by the MAC entity that there is no other pending SR, the terminal apparatus 1 may set the updated value of the CW to the $CW_{min}$. In addition, in a case that it is determined that the UL-SCH including the BSR has been successfully transmitted, the terminal apparatus 1 may set the updated value of the CW to the $CW_{min}$.

In S10014, in a case that the base station apparatus 3 has successfully received the UL-SCH, and the BSR is included in the UL-SCH, the base station apparatus 3 may transmit one or multiple uplink grants for assigning the necessary PUSCH with the BSR taken into account. In a case that the UL-SCH has been successfully received, the base station apparatus 3 may set the updated value of the CW to the $CW_{min}$. In other words, in a case that the uplink grant corresponding to the SR is considered to have been successfully received by the terminal apparatus 1, the base station apparatus 3 may set the updated value of the CW to the $CW_{min}$.

In a case that the random access procedure is initiated in the NR-U cell (the NR-U cell as a SpCell) for transmission of the SR, the terminal apparatus 1 may set the updated value of the CW to the $CW_{min}$. In a case that all the pending SRs are canceled by the MAC entity, the terminal apparatus 1 may set the updated value of the CW to the $CW_{min}$. In addition, in a case that one or multiple configured downlink assignments and/or uplink grants are cleared, the terminal apparatus 1 may set the updated value of the CW to the $CW_{min}$. In a case that release of the PUCCH is notified to the RRC for all the serving cells, the terminal apparatus 1 may set the updated value of the CW to the $CW_{min}$.

The value p of the CAPC may be individually configured for each of the PUSCH, the PUCCH, and the PRACH. In addition, as the value p of the CAPC, a common value as a cell-specific higher layer parameter may be configured for the PUSCH, the PUCCH, and the PRACH. The value p of the CAPC may be configured as individual higher layer parameters for the PUSCH, the PUCCH, and the PRACH. In addition, the value p of the CAPC for the PUSCH may be indicated with being included in the DCI format used for scheduling the PUSCH. The value p of the CAPC for the PUCCH may be indicated with being included in the DCI format including the PUCCH resource indication field. In addition, the value p of the CAPC for the PRACH may be indicated with being included in the DCI format for the PDCCH order. The value p of the CAPC for the PRACH may be determined in accordance with the type of random access procedure. For example, the value p of the CAPC for the CBRA may be determined based on system information and/or higher layer parameters. In addition, the value p of the CAPC for the CFRA may be determined based on the higher layer parameter or may be configured with being included in the DCI format corresponding to the PDCCH order. In the CFRA, whether the value p of the CAPC is based on the higher layer parameter or the field of the DCI format may be determined based on the configuration of the system information and/or the higher layer parameter.

In a case that the terminal apparatus 1 transmits the HARQ-ACK for the PDSCH using the PUCCH resource, the type of channel access procedure and/or the value p of the CAPC for the PUCCH may be configured with one or multiple dedicated fields included in the DCI format used for scheduling the PDSCH. The DCI format may include a PUCCH resource indication field. In other words, for the PUCCH resource indicated by the PUCCH resource indication field, the type of channel access procedure and/or the value of the CAPC for the PUCCH may be used. In a case that the terminal apparatus 1 transmits the SR using the PUCCH resource, the type of channel access procedure and/or the value p of the CAPC for the PUCCH may be configured based on one or multiple higher layer parameters included in the PUCCH configuration or the SR configuration.

The value p of the CAPC may be determined in association with the information to be transmitted for the PUSCH and the PUCCH. For example, in a case that transmission is performed with the UCI included in the PUSCH or the PUCCH, the value p of the CAPC may be individually configured in accordance with the type or a combination of information (the HARQ-ACK, the SR, the CSI, or the like) included in the UCI.

In the present embodiment, although the value p of the CAPC is described, the type of channel access procedure (CAP) (the type 1 CAP or the type 2 CAP), the value of the CW and/or the value of the maximum channel occupancy time ($T_{mcot}$) may be similarly configured.

For example, the DCI formats (DCI formats 0_0, 0_1, 1_0, and 1_1) used for scheduling the PDSCH and the PUSCH and resource assignment of the PRACH in the NR-U cell may include some or all of the following 8A to 8E as fields for performing the channel access procedure.

8A) Type of Channel Access Procedure (CAP)
8B) Value p of Channel Access Priority Class (CAPC)
8C) Maximum Channel Occupancy Time $T_{mcot}$
8D) Value of CW
8E) Maximum number m of CCA slot periods In a case that the PUCCH resource indication field is included in the DCI format (1_0, 1_1) used for scheduling the PDSCH in addition to some or all of 8A described above to 8E described above, the channel access procedure before transmission of the PUCCH to the HARQ-ACK of the PDSCH may be performed based on at least one of 8A described above to 8E described above included in the DCI format.

In a case that the received DCI format indicates a resource assignment of the random access preamble (e.g., in a case that the PDCCH order is received, and some or all of 8A described above to 8E described above are included in the PDCCH order), the channel access procedure before transmission of the random access preamble may be performed based on some or all of 8A described above to 8E described above included in the PDCCH order.

In a case that the SR is transmitted in the PUCCH by the NR-U carrier, some or all of 8A to 8E described above may be included in the PUCCH configuration or the SR configuration. In other words, in a case that the channel access procedure is performed for the PUCCH including the SR, parameters for the channel access procedure may be configured based on the higher layer parameter. In a case that the channel access procedure is performed for the PUCCH including the SR, parameters for the channel access procedure may be transmitted from the base station apparatus 3 to the terminal apparatus 1 through a signal in the RRC layer and be configured.

Next, a HARQ operation according to the present embodiment will be described.

The MAC entity of the terminal apparatus 1 may include at least one HARQ entity for each serving cell. At least one HARQ entity can maintain a number of parallel HARQ processes. Each HARQ process may be associated with one HPID. The HARQ entity guides the HARQ information and the relating TB received in the DL-SCH to the corresponding one or multiple HARQ processes.

The number (maximum number) of DL HARQ processes that can be configured in parallel for each HARQ entity may be configured based on a higher layer parameter (for example, the RRC parameter) or may be a default value in a case that the higher layer parameter has not been received. A dedicated broadcast HARQ process may be used for the BCCH. The broadcast HARQ process may also be referred to as a broadcast process.

The HARQ process supports one TB in a case that downlink spatial multiplexing is not configured in the physical layer. In addition, the HARQ process supports one or two TBs in a case that downlink spatial multiplexing is configured in the physical layer.

In a case that the higher layer parameter pdsch-AggregationFactor having a value larger than "1" is configured in the MAC entity of the terminal apparatus 1, the pdsch-AggregationFactor may provide the number of times of transmission of the TB within a bundle of a dynamic downlink assignment. A bundling operation (a HARQ-ACK bundling operation) depends on a HARQ entity for calling (activating) the same HARQ process for the transmission of each time that is a part of the same bundle. After the initial transmission, retransmission of HARQs of which the number is smaller than a value configured using the pdsch-AggregationFactor by one (in other words, pdsch-AggregationFactor−1) continues within the bundle.

In a case that a downlink assignment is indicated, the MAC entity of the terminal apparatus 1 may assign one or multiple TBs and associated HARQ information received from the physical layer to a HARQ process indicated by the associated HARQ information. In a case that a downlink assignment is indicated for a broadcast HARQ process, the MAC entity of the terminal apparatus 1 may assign the TB received in the broadcast HARQ process.

In a case that transmission is performed for the HARQ process, HARQ information associated with one or two (in the case of downlink spatial multiplexing) TBs is received from the HARQ entity.

For each TB and associated HARQ information that have been received in a HARQ process (a HARQ process associated with a certain HPID), in a case that an NDI is provided, this transmission is considered to be a new transmission (1) in a case that the NDI has toggled with respect to a value of a transmission (a value of the NDI associated with the HPID included in the PDCCH) which has been previously received, corresponding to this TB, or (2) in a case that a HARQ process corresponds to a broadcast process, and this is a transmission which has been received first, for the TB according to a system information schedule indicated by the RRC, or (3) in a case that this is a transmission that is actually received first for this TB (in other words, for this TB, there is no previous NDI (not present), and is a new transmission). Otherwise, the HARQ process considers this transmission to be a retransmission. In addition, the transmission that has been previously received may be a transmission that has been received in the past. Here, the transmission may be a TB transmitted from the base station apparatus 3.

In a case that this (the received TB) is a new transmission, the MAC entity attempts to decode the received data (data for the received TB). In a case that this is a retransmission, and that the data for this TB has not yet been successfully decoded, the MAC entity indicates the physical layer to combine latest data and the received data within a soft buffer for this TB and decode the combined data. In addition, in a case that the data that has been attempted to be decoded by the MAC entity is successfully decoded for this TB, or the data for this TB has been successfully decoded in advance, and the HARQ process is the same as the broadcast process, the MAC entity transfers the decoded MAC PDU to a higher layer (the RLC layer, the PDCP layer, and/or the RRC layer). In addition, in a case that this is the first successful decoding of the data for this TB, the MAC entity transfers the decoded MAC PDU to a disassembly and demultiplexing entity. Otherwise, the MAC entity indicates the physical layer to replace data attempted to be decoded by the MAC entity with the data in the soft buffer for the TB thereof. In relation with transmission indicated with the HARQ process accompanying the TC-RNTI, in a case that contention resolution has not yet been successful, or the HARQ process corresponds to a broadcast process, or timeAlignmentTimer associated with the timing advance group (TAG) including the serving cell to which a HARQ feedback is transmitted has stopped or expired, the MAC entity indicates the physical layer to generate an acknowledgement to data in this TB. The acknowledgement may be ACK or NACK.

In the NR-U cell, in a case that this transmission is considered a retransmission in this HARQ process, the MAC entity of the terminal apparatus 1 and/or the terminal apparatus 1 may update the value of the CW used for the $N_{init}$ in a case that the physical layer of the terminal apparatus 1 that is indicated to generate acknowledgement to the data in the TB performs the type 1 channel access procedure before transmission of the PUCCH or the PUSCH including the HARQ-ACK. In the NR-U cell, in a case that this transmission is considered to be a new transmission in this HARQ process, and that the physical layer of the terminal apparatus 1 indicated to generate acknowledgement to the data of this TB performs the type 1 channel access procedure before transmission of the PUCCH or the PUSCH including the HARQ-ACK, the terminal apparatus 1 and/or the MAC entity of the terminal apparatus 1 may set the value of the CW used for the $N_{init}$ to the initial value of the $CW_p$ or may not update the value of the CW (in other words, may maintain the value of the CW). In a case that the physical layer of the terminal apparatus 1 performs the type 2 channel access procedure before transmission of the PUCCH or the PUSCH including the HARQ-ACK, the physical layer may perform the CCA only once before the transmission of the PUCCH or the PUSCH including the HARQ-ACK regardless whether this transmission is a new transmission or retransmission and transmit the PUCCH or the PUSCH including the HARQ-ACK in a case that the NR-U channel is determined to be idle.

Here, updating of the value of the CW represents that, for example, in a case that there are three types of allowable values of the CW including CW #0, CW #1, and CW #2 (here, CW #0<CW #1<CW #2) that can be configured, and that the value of the CW is CW #0, the value of the CW is updated with CW #1 that is a one-level higher value. In addition, updating of the value of the CW represents that, in a case that the value of the CW is CW #1, the value of the CW is updated with CW #2 that is a one-level higher value. Furthermore, updating of the value of the CW may represent that, in a case that the value of the CW is CW #2 ($CW_{max}$), and that there is no one-level higher value, the value of the CW is updated with CW #0 ($CW_{min}$) again.

Here, the physical layer may include at least one of a transmitting unit, a receiving unit, a radio transmission and/or reception unit, and/or a measurement unit, or may be a physical layer processing unit. The MAC entity may be a MAC layer or a MAC layer processing unit.

In a case that it is determined that the NDI in the PDCCH for the C-RNTI has toggled with respect to a value in the previous transmission, the MAC entity ignores the NDI received in all the downlink assignments in the PDCCH for the TC-RNTI.

In a case that the DCI format used for scheduling the PDSCH in the NR-U cell is detected in the PDCCH, and that a HARQ process ID (HPID) and an NDI are included in the DCI format, the terminal apparatus 1 can determine whether the transmission of the PDSCH is a new transmission or retransmission based on whether the NDI has toggled for the HPID. Furthermore, in a case that a field indicating the PUCCH resource is included in the DCI format, it may be determined whether the value of the CW is to be adjusted based on whether the NDI has toggled. For example, in a case that the value of the NDI for the HARQ process associated with the first HPID has toggled, the terminal apparatus 1 sets the value of the $CW_p$ corresponding to the value p of each CAPC to $CW_{min}$. Otherwise (in other words, in a case that the value of the NDI has not toggled), the terminal apparatus 1 may increase the value of the $CW_p$ to a one-level higher allowable value (the value of the CW) (in other words, the terminal apparatus 1 may update the value of the $CW_p$ (the value of the CW)).

In a case that a HARQ-ACK codebook for the HARQ process relating to one or multiple HPIDs is generated, and that the value of the NDI for at least one HPID has not toggled, the terminal apparatus 1 may update the value of the CW for the type 1 channel access procedure performed before transmission of the PUCCH or the PUSCH including the HARQ-ACK codebook.

In a case that the PDCCH and the PDSCH including the DCI format used for scheduling the PDSCH in the NR-U cell are transmitted, the base station apparatus 3 performs the type 1 channel access procedure before transmission of the PDCCH and the PDSCH. In a case that the NR-U channel is determined to be idle in all the CCA slot periods, the base station apparatus 3 may transmit the PDCCH and the PDSCH, and, in a case that the NR-U channel is determined to not be idle, the base station apparatus 3 may postpone the transmission of the PDCCH and the PDSCH until the NR-U channel can be determined to be idle in all the CCA slot periods.

In a case that a predetermined period elapses after transmission of the PDCCH and the PDSCH, and that a PUCCH or a PUSCH including the HARQ-ACK for the PDSCH has not been able to be successfully received, the base station apparatus 3 may retransmit the PDCCH and the PDSCH. In a case that the base station apparatus 3 retransmits the PDCCH and the PDSCH, the base station apparatus 3 transmits the value of the NDI for the HPID without toggling the value. In other words, the base station apparatus 3 may indicate that the PDSCH is a retransmission by not toggling the value of the NDI for the HPID. At that time, in a case that the base station apparatus 3 performs the type 1 channel access procedure, the value of the CW may be updated.

In addition, in a case that a PUCCH or a PUSCH including the HARQ-ACK for the PDSCH corresponding to the HARQ process associated with the HPID have been able to be successfully received within a predetermined period after the transmission of the PDCCH and the PDSCH, the base station apparatus 3 may reset the value of the CW corresponding to the HARQ process for the HPID to the $CW_{min}$. In other words, in order to toggle the value of the NDI for the HARQ process associated with the HPID, the base station apparatus 3 may set the value of the CW to the $CW_{min}$ in a case that the channel access procedure is performed before the transmission of the PDCCH and the PDSCH. Here, in a case that a HARQ process associated with multiple HPIDs can be managed, the base station apparatus 3 may perform the channel access procedure and/or the CW adjustment procedure for each HPID.

In a case that a PDCCH and the PDSCH scheduled by the PDCCH are transmitted, and the base station apparatus 3 has not been able to receive the PUCCH or the PUSCH including the HARQ-ACK corresponding to the PDSCH (in other words, the HARQ-ACK for the HPID associated with the PDSCH) within a predetermined period (for example, before a predetermined timer has expired), the base station apparatus 3 may update the value of the CW for the PDCCH and the PDSCH. In a case that the PUSCH including the HARQ-ACK for the HPID corresponding to the PDSCH has been successfully received in place of the PUCCH, the base station apparatus 3 may not update the value of the CW for the PDCCH and the PDSCH.

In a case that a HARQ operation of the HARQ process of a certain HPID is considered to be successful, the base station apparatus 3 and/or the terminal apparatus 1 may set the value of the CW that has been updated in relation with the operation to the $CW_{min}$.

In a case that a PDSCH having the same HPID and indicating a retransmission has been received after the transmission of the HARQ-ACK for the received PDSCH through the PUCCH or the PUSCH, or a case that retransmission of the HARQ-ACK for the PDSCH is requested, or a case that the type 1 channel access procedure is performed before the transmission of the PUCCH including the HARQ-ACK for the PDSCH, the terminal apparatus 1 may update the value of the CW used for the $N_{init}$. In other words, in a case that retransmission is indicated for the PDSCH of the same HPID, and that the type 1 channel access procedure is performed before the transmission of the PUCCH including the HARQ-ACK for the PDSCH, the terminal apparatus 1 may update the value of the CW used for the corresponding $N_{init}$.

The SSB and/or the CSI-RS in the NR-U cell may be collectively referred to as NR-U Discovery Reference Signals (DRS). The NR-U DRS may be detected for the terminal apparatus 1 to check whether the NR-U cell is activated or deactivated.

Next, a procedure for reporting the CSI according to the present embodiment will be described.

Time-frequency resources that can be used by the terminal apparatus 1 for reporting the CSI may be controlled (configured) by the base station apparatus 3. The CSI may be configured to include at least one of a Channel Quality Indicator (CQI), a Precoding Matrix Indicator (PMI), a CSI-RS resource indicator (CRI), an SS/PBCH Block Resource Indicator (SSBRI), a layer indicator (L1), a Rank Indicator (RI), and/or a Layer-1 Reference Signal Received Power (L1-RSRP).

For the CQI, the PMI, the CRI, the SSBRI, the L1, the RI, and the L1-RSRP, the terminal apparatus 1 may configure N CSI-ReportConfig reporting settings (here, N is a value that is the same as or greater than "1"), M CSI-ResourceConfig resource settings (here, M is a value that is the same as or greater than "1") and one or two lists of trigger states as higher layer parameters using the higher layer (higher layer processing unit). The trigger state may be given by AperiodicTriggerStateList and/or CSI-SemiPersistentOnPUSCH-TriggerStateList that are higher layer parameters. Each trigger state in AperiodicTriggerStateList may include a list of one or multiple associated CSI-ReportConfigs indicating resource set IDs for channels and optionally interferences. Each trigger state in CSI-SemiPersistentOnPUSCH-TriggerStateList may be included in one associated CSI-ReportConFig.

The CSI-ResourceConfig may include at least one or all of CSI-ResourceConfigId, csi-RS-ResourceSetList, bwp-Id, and/or resourceType. The csi-RS-ResourceSetList may select any one of nzp-CSI-RS-SSB and csi-IM-ResourceSetList. The nzp-CSI-RS-SSB may include nzp-CSI-RS-ResourceSetList and/or csi-SSB-ResourceSetList.

Each report setting CSI-ReportConfig relates to one downlink BWP given in the CSI-ResourceConfig associated with the channel measurement and may include one CSI report band, a codebook configuration including a codebook subset limit, a behavior in the time domain, frequency granularity for the CQI and the PMI, a measurement limit configuration, and one or multiple parameters for CSI relating amounts reported by the terminal apparatus 1 such as the L1, the L1-RSRP, the CRI, and the SSBRI. Here, the frequency granularity may be the size of the frequency domain (for example, a bandwidth or the number of PRBs).

The behavior of the CSI-ReportConfig in the time domain is indicated by the higher layer parameter (RRC parameter) reportConfigType and can be set to 'aperiodic', 'semiPersistentOnPUCCH', 'semiPersistentOnPUSCH', or 'periodic'. A configured periodicity and a slot offset (an offset in the time domain) are applied to the CSI reports of the periodic, the emiPersistentOnPUCCH, and the semiPersistentOnPUSCH in the numerology of the uplink BWP in which transmission of the CSI report is configured. If the PMI/CQI report is wideband or subband, the reportFreqConfiguration indicates the report particle size of the frequency domain including the CSI report band. The timeRestrictionForChannelMeasurements parameter in the CSI-ReportConfig may be configured such that a limit in the time domain can be applied for one or multiple channel measurements, and the timeRestrictionForInterferenceMeasurements may be configured such that a limit in the time domain can be applied for one or multiple interference measurements. The CSI-ReportConfig may further include CodebookConfig including one or multiple configuration parameters for a type I CSI or a type II CSI including a codebook subset limit and one or multiple configurations of group-based reports.

Each CSI resource setting CSI-ResourceConfig may include a configuration of a list of S CSI resource sets (here, S is a value that is the same as or greater than "1") given by the higher layer parameter csi-RS-ResourceSetList. The list may be configured as references to one or both of one or multiple NZP CSI-RS resource sets and one or multiple SS/PBCH block sets, or the list may be configured as references to one or multiple CSI-interference measurement (CSI-IM) resource sets. Each resource setting is disposed in the DL BWP identified by the higher layer parameter bwp-Id, and all the CSI resource settings linked to one CSI report setting are disposed in the same DL BWP.

The behavior of one or multiple CSI-RS resources in the CSI resource setting in the time domain is indicated by the higher layer parameter resourceType and may be set to aperiodic, periodic, or semi-persistent. For the periodic resource setting and the semi-persistent CSI resource setting, the number of configured CSI-RS resource sets may be limited to S=1. For the periodic resource setting and the semi-persistent CSI resource setting, the periodicity and the slot offset that are configured may be given in the numerology of the associated DL BWP given by the bwp-Id. In a case that the terminal apparatus 1 configures multiple CSI-ResourceConfigs configured from the same NZP CSI-RS resource ID, behaviors of the same time domain may be configured for the multiple CSI-ResourceConfig. All the CSI resource settings linked to one CSI report setting may have behaviors of the same time domain, configuration of the same time domain may be performed, or parameters of the same time domain may be configured.

For one or multiple CSI-IM resource settings for channel measurement and interference measurement, one or multiple CSI resources for the interference measurement, one or multiple NZP CSI-RS resources for the interference measurement, and one or multiple NZP CSI-RS resources for channel measurement may be configured through higher layer signaling.

The terminal apparatus 1 may assume that one or multiple NZP CSI-RS resources for channel measurement and one or multiple CSI-IM resources for interference measurement, which are configured for one CSI report, are resource-wisely Quasi-CoLocated (QCL) in association with 'QCL-TypeD'. In a case that one or multiple NZP CSI-RS resources are used for interference measurement, the terminal apparatus 1 may assume that one or multiple NZP CSI-RS resources for channel measurement and one or multiple CSI-IM resources for interference measurement and/or one or multiple NZP CSI-RS resources for interference measurement, which are configured for one CSI report, are Quasi-CoLocated (QCL) in relation to 'QCL-TypeD'.

The terminal apparatus 1 may calculate one or multiple CSI parameters by assuming dependency between the CSI parameters. The LI may be calculated based on the CQI, the PMI, the RI, and the CRI that have been reported. The CQI may be calculated based on the PMI, the RI, and CRI that have been reported. The PMI may be calculated based on the RI and the CRI that have been reported. The RI may be calculated based on the CRI that has been reported.

The report configuration for CSI may be configured as being aperiodic using the PUSCH, as being periodic using the PUCCH, or as being semi-persistent using the PUCCH or the DCI-activated PUSCH. The CSI-RS resource may be configured as being periodic, semi-persistent, or aperiodic.

FIG. 11 is a diagram illustrating an example of triggering/activation of a CSI report for a possible CSI-RS configuration according to an aspect of the present embodiment. FIG. 11 illustrates one or multiple CSI report configurations, supported combinations of one or multiple CSI-RS resource configurations, and how a CSI report is triggered for each CSI-RS resource configuration. The periodic CSI-RS is configured by a higher layer. The semi-persistent CSI-RS is activated/deactivated by an activation command. The aperiodic CSI-RS is configured by a higher layer and is triggered/activated by the DCI or the activation command.

In a case that the higher layer parameter NZP-CSI-RS-ResourceSet is configured and that the higher layer parameter repetition is set to 'off' in the terminal apparatus 1, the terminal apparatus 1 may determine one CRI from a supported set of one or multiple CRI values or may report the number (a number, a value) in each CRI report. In a case that the higher layer parameter repetition is set to 'on', the CRI report may not be supported. In a case that the higher layer parameter codebookType is set to 'typeII' or 'typeII-Port-Selection', the CRI report may not be supported.

The periodicity measured in one or multiple slots may be configured by the higher layer parameter reportSlotConfig for the periodic CSI report or the semi-persistent CSI report in the PUCCH. The periodic CSI may also be referred to as a P-CSI. The semi-persistent CSI may also be referred to as an SP-CSI.

For the aperiodic CSI report or the semi-persistent CSI report in the PUSCH, an allowed slot offset may be configured by the higher layer parameter reportSlotOffsetList. The offset may be selected using the activating/triggering DCI. The aperiodic CSI may also be referred to as an A-CSI.

For the CSI report, the terminal apparatus 1 may configure one of the two possible subband sizes through higher layer signaling. The subband may be defined as an $N^{SB}_{PRB}$ consecutive PRB or may depend on the total number of PRBs of the BWP.

FIG. 12 is a diagram illustrating an example of configurable subband sizes according to an aspect of the present embodiment. The subband size may be given in association with the bandwidth (the number of PRBs) of the BWP. Any one of the two possible subband sizes may be configured by the higher layer parameter subbandSize.

reportFreqConfiguration included in the CSI-ReportConfig indicates the frequency granularity of the CSI report. The CSI report setting configuration may define the CSI report band as a subset of one or multiple subbands of the BWP. The reportFreqConfiguration indicates csi-ReportingB and as a consecutive or non-consecutive subset of the one or multiple subbands of the BWP for which the CSI is reported. The terminal apparatus 1 may not be expected such that the csi-ReportingBand in which the CSI-RS resource linked to the CSI report setting includes a subband subset in which the frequency density of each CSI-RS port for each PRB in the subband is lower than the configured density of the CSI-RS resource. In a case that the CSI-IM resource is linked to the CSI report setting, the terminal apparatus 1 may not be expected such that the csi-ReportingBand including a subband in which the CSI-IM resource element (RE) is not present in all the PRBs in the subband is configured. In other words, in a case that the csi-ReportingBand is configured, at least one CSI-IM RE may be present in each subband.

Whether the CQI report is configured as a wideband CQI report or a subband CQI report is configured by the higher layer parameter cqi-FormatIndicator. In a case that the wideband CQI report is configured, the wideband CQI may be reported for each codeword for the entire CSI report band. In a case that the subband CQI report is configured, one CQI for each codeword may be reported for each subband in the CSI report band.

Whether the PMI report is configured as the wideband PMI report or the subband PMI report is configured by the higher layer parameter pmi-FormatIndicator. In a case that the wideband PMI report is configured, the wideband PMI may be reported for each codeword for the entire CSI report band. In a case that the subband PMI report is configured, except for two antenna ports, one wideband indication may be reported for the entire CSI report band, and one subband indication may be reported to each subband of the CSI report band. In the subband PMI, in a case that two antenna ports are configured, the PMI may be reported for each subband in the CSI report band.

The CSI report setting may have wideband frequency granularity in a case that any one condition of the following 9A to 9D is satisfied. In other words, in a case that at least one condition among the conditions described below is satisfied, the terminal apparatus 1 may consider the frequency granularity for the CSI report setting to be a wideband.

9A) reportQuantity is set to 'cri-RI-PMI-CQI' or 'cri-RI-LI-PMI-CQI', cqi-FormatIndicator indicates one CQI report, and pmi-FormatIndicator indicates one PMI report 9B) reportQuantity is set to 'cri-RI-i1'

9C) reportQuantity is set to 'cri-RI-CQI' or 'cri-RI-i1-CQI', and cqi-FormatIndicator indicates one CQI report 9D) reportQuantity is set to 'cri-RSRP' or 'ssb-Index-RSRP'

In a case that none of conditions of 9A through 9D described above are satisfied, the CSI report setting may have subband frequency granularity. In other words, the terminal apparatus 1 may consider the frequency granularity for the CSI report setting as being a subband.

In the CSI report setting, in a case that the subband is configured, the first subband size may be given based on the subband size corresponding to the bandwidth (the number of PRBs) of the BWP and a start index of the BWP. In addition, the last subband size may be given based on the subband size corresponding to the bandwidth (the number of PRBs) of the BWP, the start PRB index of the BWP, and the bandwidth of the BWP.

In a case that the terminal apparatus 1 configures the semi-persistent CSI report, the terminal apparatus 1 may report the CSI in a case that both the CSI-IM resource and the NZP CSI-RS resource are configured as being periodic or semi-persistent. In a case that the terminal apparatus 1 configures the aperiodic CSI report, the terminal apparatus 1 may report the CSI in a case that both the CSI-IM resource and the NZP CSI-RS resource are configured as being periodic, semi-persistent, or aperiodic. For each of the CSI-IM resource and the NZP CSI-RS resource, one or multiple resources may be configured.

The terminal apparatus 1 in which the DCI format 1_0 is configured may not be expected such that multiple CSI reports accompanying the same CSI-ReportConfigId are triggered.

For the aperiodic CSI, in each trigger state configured using the higher layer parameter CSI-AperiodicTrigger-State, each CSI-ReportConfig may be associated with one or multiple CSI-ReportConfigs, each linked to the periodic resource setting, the semi-persistent resource setting, or the aperiodic resource setting. In a case that one resource setting is configured, the resource setting given by the higher layer parameter resourceForChannelMeasurement may be used for channel measurement for calculation of the L1-RSRP. In a case that two resource settings are configured, a first resource setting given by the higher layer parameter resourceForChannelMeasurement may be used for channel measurement, and a second resource setting given by the higher layer parameter csi-IM-ResourcesForInterference or the higher layer parameter nzp-CSI-RS-ResourcesForInterference may be used for interference measurement performed in the CSI-IM (one or multiple CSI-IM resources) or the NZP CSI-RS (one or multiple Non Zero Power CSI-RSs). In a case that three resource settings are configured, a first resource setting given by the higher layer parameter resourceForChannelMeasurement may be used for channel measurement, a second resource setting given by the higher layer parameter csi-IM-ResourcesForInterference may be used for CSI-IM based interference measurement, and a third resource setting given by the higher layer parameter nzp-CSI-RS-ResourcesForInterference may be used for NZP CSI-RS based interference measurement.

For the semi-persistent CSI or the periodic CSI, each CSI-ReportConfig may be linked to one or multiple periodic resource settings or semi-persistent resource settings. In a case that one resource setting is configured, the resource setting given by the higher layer parameter resource-ForChannelMeasurement may be used for channel measurement for calculation of the L1-RSRP. In a case that two resource settings are configured, a first resource setting given by the higher layer parameter resourceForChannelMeasurement may be used for channel measurement, and a second resource setting given by the higher layer parameter csi-IM-ResourcesForInterference may be used for interference measurement performed in the CSI-IM (one or multiple CSI-IM resources).

The terminal apparatus 1 is not expected such that more than one CSI-RS resource are configured in a resource set for channel measurement for one CSI-ReportConfig including the higher layer parameter codebookType set to 'typeII' or 'typeII-PortS election'.

The terminal apparatus 1 is not expected such that more than 64 NZP CSI-RS resources are configured in a resource set for channel measurement for one CSI-ReportConfig including the higher layer parameter codebookType set to 'none', 'cri-RI-CQI', 'cri-RSRP', or 'ssb-Index-RSRP'.

In a case that the interference measurement is performed in the CSI-IM, each CSI-RS resource for channel measurement may be resource-wisely associated with the CSI-IM resource by numbering CSI-RS resources and CSI-IM resources in the corresponding one or multiple resource sets. The number of CSI-RS resources for channel measurement may be the same as the number of CSI-IM resources.

In a case that interference measurement is performed in the NZP CSI-RS, the terminal apparatus 1 may not be expected such that more than one NZP CSI-RS resources are configured in the associated resource set within the resource setting for the channel measurement. The terminal apparatus 1 in which the higher layer parameter nzp-CSI-RS-ResourcesForInterference is configured may be expected such that no more than 18 CSI-RS ports are configured in the NZP CSI-RS resource set.

For CSI measurement, each NZP CSI-RS port configured for interference measurement corresponds to an interference transmission layer, and the terminal apparatus 1 may assume different interference signals in one or multiple REs of the NZP CSI-RS resources for channel measurement, NZP CSI-RS resources for interference measurement, or CSI-IM resources for interference measurement with a relating Energy Per Resource Element (EPRE) ratio taken into account in all the interference transmission layers in one or multiple NZP CSI-RS ports for the interference measurement.

Here, the CSI measurement may be performed by measuring CSI-RS resources and calculating the CSI. The CSI measurement includes channel measurement and interference measurement. The channel measurement may be performed using NZP CSI-RS resources. The interference measurement may be performed using CSI-IM resources and/or NZP CSI-RS resources and/or ZP CSI-RS resources.

As indicated by the higher layer parameters CSI-ResourceConfig and NZP-CSI-RS-ResourceSet, one or multiple NZP CSI-RS resource set configurations may be configured in the terminal apparatus 1. Each NZP CSI-RS resource set may be constituted of K (here, K is a value that is the same as or greater than 1) NZP CSI-RS resources.

In a case that some or all of the following parameters 10A to 10M are configured, the terminal apparatus 1 assumes non-zero transmission power (in other words, the NZP CSI-RS resource) for the CSI-RS resource. The NZP CSI-RS resource may be configured by higher layer parameters NZP-CSI-RS-Resource, CSI-ResourceConfig, and NZP-CSI-RS-ResourceSet for each CSI-RS resource configuration.

10A) nzp-CSI-RS-ResourceId
10B) periodicityAndOffset
10C) resourceMapping
10D) nrofPorts
10E) density
10F) cdm-Type
10G) powerControlOffset
10H) powerControlOffsetSS
10I) scramblingID
10J) bwp-Id
10K) repetition
10L) qcl-InfoPeriodicCSI-RS
10M) trs-Info For all the CSI-RS resources in one set, the same value of 10E and the same value of 10D may be configured except for a case in which the NZP CSI-RS resource is used for the interference measurement.

10A described above may be used for determining the ID of the CSI-RS resource configuration.

10B described above may be used for defining the periodicity and the slot offset of the CSI-RS for the P-CSI and/or the SP-CSI.

10C described above may be used for defining the number of ports, the code division multiplexing (CDM) type, the OFDM symbol, and the subcarrier occupancy rate of the CSI-RS resource in the slot.

10D described above is a parameter included in 10C described above and may be used for defining the number of CSI-RS ports.

10E described above is a parameter included in 10C described above and may be used for defining the CSI-RS frequency density of each CSI-RS port for each PRB. In a case that the value of 10E is ½, it may also be used for defining a PRB offset. The odd/even PRB arrangement indicated by 10E may be related to a common resource block grid.

10F described above is a parameter included in 10C described above and may be used for defining a CDM value and a pattern.

10G described above may be a presumed ratio of the PDSCH EPRE and the NZP CSI-RS EPRE in a case that the terminal apparatus 1 derives a CSI report (CSI feedback).

10H described above may be an assumed ratio of the SS/PBCH block EPRE and the NZP CSI-RS EPRE.

10I described above is used for defining a scrambling ID of the CSI-RS and may have a length of 10 bits.

10J described above is a parameter included in the CSI-ResourceConfig and may be used for defining a BWP in which the configured CSI-RS is provided.

10K described above is a parameter included in the NZP-CSI-RS-ResourceSet and may be associated with one CSI-RS resource set. 10K described above may be used for defining whether the terminal apparatus 1 can assume that one or multiple CSI-RS resources in the NZP CSI-RS resource set are transmitted using the same downlink space area transmission filter. In addition, 10K described above may be configured only in a case that the higher layer parameter reportQuantity associated with all report settings linked to the CSI-RS resource set is set to 'cri-RSRP' or 'none'.

10L described above may include one or multiple QCL sources RS and a reference to the TCI-State indicating a QCL type. In a case that a reference to an RS accompanying association of the TCI-State with 'QCL-TypeD' is configured, the RS may be an SS/PBCH block provided in the same or different CC/DL BWPs or may be a CSI-RS resource configured as being periodic that is provided in the same or different CC/DL BWPs.

10M described above is a parameter included in the NZP-CSI-RS-ResourceSet and may be associated with a CSI-RS resource set. In addition, in 10M described above, the terminal apparatus 1 may assume that antenna ports accompanying the same port index of one or multiple CSI-RS resources configured in the NZP-CSI-RS-ResourceSet are the same. 10M described above may be configured in a case that the report setting is not configured or in a case that reportQuantity associated with all the report settings linked to the CSI-RS resource set is set to 'none'.

The bandwidth (the number of PRBs) of the CSI-RS resource in one BWP and an initial Common Resource Block (CRB) index may be determined respectively based on the higher layer parameters nrofRBs and startingRB inside the CSI-FrequencyOccupation IE configured by the higher layer parameter freqB and inside the CSI-ResourceMapping IE.

The nrofRBs and the startingRB may be configured to be integer multiples of 4 RBs. A reference point of the startingRB may be CRB0 of a common resource block grid. In a case that the startingRB has a value smaller than the $N^{start}_{RB}$, the terminal apparatus 1 may assume that the initial CRB index $N_{initialRB}$ of the CSI-RS resource has the same value as the $N^{start}_{RB}$. Otherwise, the $N_{initialRB}$ may have the same value as the startingRB.

The value of the nrofRBs may not match the bandwidth of the carrier or the bandwidth of the BWP, or may be configured such that it has the same value as that thereof. The startingRB may be configured to have the same value as the PRB index 0 (initiation PRB index) of the carrier, may be configured to have the same value as the PRB index 0 of a certain BWP, or may be configured independently from those. The value of the nrofRBs may be indicated as the bandwidth of the CSI report band. The value of the startingRB may indicate an initiation position of the CSI report band in the frequency domain. Mapping of the frequency domain of the CSI-RS may be indicated based on the nrofRBs and the startingRB.

In a case that the nrofRBs has a value greater than $N^{size}_{BWP}+N^{start}_{RB}-N_{initialRB}$, the terminal apparatus 1 may assume that the bandwidth $N^{BW}_{CSI-RS}$ of the CSI-RS resource has the same value as $N^{size}_{BWP}+N^{start}_{RB}-N_{initialRB}$. Otherwise, the $N^{BW}_{CSI-RS}$ may have the same value as the nrofRBs. In all the cases, the terminal apparatus 1 may be expected such that the $N^{BW}_{CSI-RS}$ has the same value as a smaller value of the 24 PRBs and the $N^{size}_{BWP}$ PRBs or has a value larger than that.

One or multiple CSI-IM resource set configurations indicated by the higher layer parameter csi-IM-ResourceSet may be configured in the terminal apparatus 1. Each CSI-RS resource set may be composed of K (here, K is the same as or greater than 1) CSI-IM resources.

The following parameters may be configured for each CSI-IM resource configuration by using the higher layer parameter csi-IM-Resource.

11A) csi-IM-ResourceId
11B) subcarrierLocation-p0
11C) subcarrierLocation-p1
11D) symbolLocation-p0
11E) symbolLocation-p1
11F) periodicityAndOffset
11G) freqB and
The terminal apparatus 1 may assume that at least one CSI-IM resource is disposed in each of one or multiple PRBs configured by 11G described above. 11G may be CSI-FrequencyOccupation.

11A described above may be used for determining the ID of the CSI-IM resource configuration.

11B described above or 11C described above may be used for defining a subcarrier occupancy rate of the CSI-IM resource in the slot for the csi-IM-ResourceElementPattern set to 'pattern0' or 'pattern1'.

11D described above or 11E described above may be used for defining an OFDM symbol arrangement of the CSI-IM resource in the slot for the csi-IM-ResourceElementPattern set to 'pattern0' or 'pattern1'.

11F described above may be used for defining the periodicity and the slot offset of the CSI-IM for the periodic and/or semi-persistent CSI-IM.

11G described above may include a parameter used for configuring the frequency occupancy rate of the CSI-IM.

The MAC entity of the terminal apparatus 1 may perform at least some or all of the following 12A to 12H for each activated serving cell in which the BWP is configured in a case that the BWP (a DL BWP and/or a UL BWP) is activated.

12A) Transmission of UL-SCH in BWP

12B) In a case that the PRACH occasion is configured, transmission in RACH in BWP 12C) Monitoring of PDCCH in BWP 12D) Transmission of PUCCH in BWP in case of being configured 12E) Report of CSI for BWP 12F) Transmission of SRS in BWP in case of being configured 12G) Reception of DL-SCH in BWP 12H) Initiation or re-initiation of the postponed and configured uplink grant of grant type 1 configured in the active BWP according to maintained configuration and start at a symbol based on a predetermined rule In a case that the BWP (DL BWP and/or UL BWP) is deactivated, the MAC entity of the terminal apparatus 1 may not perform at least some or all of 12A to 12H described above or may perform one or both of 12I and 12J described below.

12I) Clear of one of the configured downlink assignment and the configured uplink grant of grant type 2 configured in the BWP 12J) Postpone of one of the configured uplink grants of grant type 1 configured in the inactive BWP CSI-ReportConfig accompanying the higher layer parameter reportQuantity set to at least one of 'none', 'cri-RI-PMI-CQI', 'cri-RI-i1', 'cri-RI-i1-CQI', 'cri-RI-CQI', 'cri-RSRP', 'ssb-Index-RSRP', and/or 'cri-RI-LI-RMI-CQI' may be configured in the terminal apparatus 1.

In a case that CSI-ReportConfig accompanying the higher layer parameter reportQuantity set to 'none' is configured in the terminal apparatus 1, the terminal apparatus 1 may not report any quantity for CSI-ReportConfig.

In a case that CSI-ReportConfig accompanying the higher layer parameter reportQuantity set to 'cri-RI-PMI-CQI' or 'cri-RI-LI-RMI-CQI' is configured in the terminal apparatus 1, the terminal apparatus 1 may report a desired precoding matrix for the entire report band and/or a desired precoding matrix for each subband.

In a case that CSI-ReportConfig accompanying the higher layer parameter reportQuantity set to 'cri-RI-i1' is configured in the terminal apparatus 1, the terminal apparatus 1 may be expected such that codebookType set to 'Type1-SinglePanel' and the pmi-FormatIndicator configured in the wideband PMI report for the CSI-ReportConfig are configured, and the terminal apparatus 1 may report one PMI configuring one wideband indication (for example, $i_1$) for the entire CSI report band.

In a case that CSI-ReportConfig accompanying the higher layer parameter reportQuantity set to 'cri-RI-i1-CQI' is configured in the terminal apparatus 1, the terminal apparatus 1 may be expected such that codebookType set to 'TypeI-SinglePanel' and the pmi-FormatIndicator configured in the wideband PMI report are configured for the CSI-ReportConfig, and the terminal apparatus 1 may report one PMI constituting one wideband indication (for example, $i_1$) for the entire CSI report band. In addition, in this case, the CQI may be calculated based on the reported $i_1$ assuming the transmission of the PDSCH accompanying $N_p$ (here $N_p$ is the same as or larger than 1) precoders. The terminal apparatus 1 may randomly select one precoder from among the $N_p$ precoders for each Precoding Resource block Group (PRG) of the PDSCH. The PRG size for the calculation of the CQI may be configured by the higher layer parameter pdsch-BundleSizeForCSI.

In a case that the CSI-ReportConfig accompanying the higher layer parameter reportQuantity set to the 'cri-RI-CQI' is configured in the terminal apparatus 1, and that the higher layer parameter non-PMI-PortIndication included in one CSI-ReportConfig is configured, an r port (here, r has a value that is 1 or more) appears in the order of layer ordering for the rank r, and each CSI-RS resource in the CSI resource setting may be linked to the CSI-ReportConfig by the terminal apparatus 1 based on an order of the associated nzp-CSI-RS-ResourceId in the CSI resource setting that is linked for channel measurement given by the higher layer parameter esourcesForChannelMeasurement. The configured higher layer parameter non-PMI-PortIndication may include sequences $p^{(1)}_0, p^{(2)}_0, p^{(2)}_1, p^{(3)}_0, p^{(3)}_1, p^{(3)}_2, \ldots, p^{(R)}_0, p^{(R)}_1, \ldots, p^{(R)}_{R-1}$ of one or multiple port indexes. $p^{(v)}_0, \ldots, p^{(v)}_{v-1}$ is one or multiple CSI-RS port indexes associated with the rank v, and it may be configured such that $R \in \{1, 2, \ldots, P\}$. The $P \in \{1, 2, 4, 8\}$ may be the number of ports in the CSI-RS resource. The terminal apparatus 1 may only report RI that corresponds to one or multiple configured fields of the PortIndexFor8Ranks. In a case that the higher layer parameter non-PMI-PortIndication is not configured in the terminal apparatus 1, for each CSI-RS resource in the CSI resource setting linked to the CSI-ReportConfig, the terminal apparatus 1 may associate one or multiple CSI-RS port indexes $p^{(v)}_0, p^{(v)}_{v-1}$, which are $\{0, \ldots, v-1\}$, with one or multiple ranks $v=1, 2, \ldots, p$. In a case that the CQI for the rank is calculated, the terminal apparatus 1 may use one or multiple ports indicated for the rank for the selected CSI-RS resource. The indicated precoder for one or multiple ports may be assumed to be an identifier matrix scaled using a value obtained using v (for example, $1/\sqrt{(v)}$).

In a case that the CSI-ReportConfig accompanying the higher layer parameter reportQuantity set to 'cri-RSRP' or 'ssb-Index-RSRP' is configured in the terminal apparatus 1, and that the higher layer parameter groupBasedBeamReporting set to 'disabled' is configured in the terminal apparatus 1, the terminal apparatus 1 may not need to update measurements of more than 64 CSI-RS resources and the SSB resources. The terminal apparatus 1 may report nrof-ReportedRS different CRIs or SSBRIs for each report setting in one report. Furthermore, in this case, in a case that the higher layer parameter groupBasedBeamReporting set to 'enabled' is configured, the terminal apparatus 1 may not need to update measurements of more than 64 CSI-RS resources and/or SSB resources. The terminal apparatus 1 may report two different CRIs or SSBRIs for each report setting in one report period. One or multiple CSI-RS resources and/or one or multiple SSB resources may be simultaneously received by the terminal apparatus 1 using one spatial area reception filter or multiple simultaneous spatial area filters.

Here, 'being different' may include a meaning of 'being independent,' 'being individually configured/calculated,' and/or 'being identifiable.'

In a case that CSI-ReportConfig accompanying the higher layer parameter reportQuantity set to 'cri-RSRP', 'cri-RI-PMI-CQI', 'cri-RI-i1', 'cri-RI-i1-CQI', 'cri-RI-CQI', and/or 'cri-RI-LI-RMI-CQI' is configured in the terminal apparatus 1, and that Ks (here, $K_S$ is a value larger than 1) resources are configured in the nzp-CSI-RS-ResourceSet corresponding to channel measurement, the terminal apparatus 1 may derive a CSI parameter other than the CRI based on the reported CRI. In a case that CRIk (here, k is a value of one or more) is configured as the configured (k+1)th entry of the associated nzp-CSI-RS-Resource of nzp-CSI-RS-ResourceSet corresponding to the channel measurement and/or a higher layer parameter, it may correspond to the (k+1)th entry of the associated csi-IM-Resource in the corresponding csi-IM-ResourceSet. In a case that CSI-RS resources with $K_S$ set to 2 are configured, each resource may include at most 16 CSI-RS ports. In a case that CSI-RS resources with $K_S$ set to a value larger than 2 and up to 8 are configured, each resource may include 8 CSI-RS ports at the most.

In a case that the CSI-ReportConfig accompanying the higher layer parameter reportQuantity set to 'cri-RI-PMI-CQI', 'cri-RI-i1', 'cri-RI-i1-CQI', 'cri-RI-CQI', and/or 'cri-RI-LI-RMI-CQI' is configured in the terminal apparatus 1, the terminal apparatus 1 may not be expected such that more than eight CSI-RS resources are configured in one CSI-RS resource set included in the resource setting linked to the CSI-ReportConfig.

In a case that the CSI-ReportConfig accompanying the higher layer parameter reportQuantity set to 'cri-RSRP' or 'none' is configured in the terminal apparatus 1, and that the CSI-ReportConfig is linked to a resource setting configured in the higher layer parameter resourceType set to "aperiodic", the terminal apparatus 1 may not be expected such that more than 16 CSI-RS resources are configured in one CSI-RS resource set included in the resource setting.

LI indicates that a column of a precoder matrix of the reported PMI corresponds to a strongest layer of a codeword corresponding to the largest reported wideband CQI. In a case that two wideband CQIs are reported and have the same value, the LI may correspond to a strongest layer of a first codeword.

In a case that 'QCL-TypeC' and 'QCL-TypeD' are resource-wisely QCL for the calculation of the L1-RSRP, one or multiple CSI-RS resources, one or multiple SS/PBCH block resources, or both the one or multiple CSI-RS resources and the one or multiple SS/PBCH block resources may be configured in the terminal apparatus 1. A CSI-RS resource setting up to 16 CSI-RS resource sets having up to 64 resources may be configured in each set. In other words, the base station apparatus 3 does not perform such a configuration. The total number of different CSI-RS resources in all the resource sets may be configured not to be more than 128. In other words, the terminal apparatus 1 may not be expected such that more than 128 CSI-RS resources are configured. In other words, the base station apparatus 3 does not configure more than 128 CSI-RS resources.

The number (an upper limit value) of configurable CSI-RS resources may change in accordance with one or multiple predetermined conditions.

The CSI-ReportConfig may include at least some or all of the following parameters 13A to 13P.

13A) reportConfigId
13B) carrier
13C) resourcesForChannelMeasurement
13D) csi-IM-ResourcesForInterference
13E) nzp-CSI-RS-ResourceForInterference
13F) reportConfigType
13G) reportQuantity
13H) reportFreqConfiguration
13I) timeRestrictionForChannelMeasurements
13J) timeRestrictionForInterferenceMeasurements
13K) codebookConfig
13L) groupBasedBeamReporting
13M) cqi-Table
13N) subbandSize
13O) non-PMI-PortIndication
13P) semiPersistentOnPUSCH In 13B, a serving cell index may be configured. 13H described above may include the cqi-FormatIndicator, the pmi-FormatIndicator, and/or the csi-ReportingBand described above.

The CSI reference resource for a certain serving cell may be defined based on at least some or all of the following 14A to 14B.

14A) In the frequency domain, the CSI reference resource may be defined by a group of one or multiple downlink PRBs corresponding to a band associated with a derived CSI.

14B) In the time domain, the CSI reference resource for the CSI report in the uplink slot n' may be defined by one downlink slot $n-n_{CSI\_ref}$.

The downlink slot n may be determined based on the uplink slot n' and a floor function of $\mu_{DL}$, and $\mu_{UL}$. The $\mu_{DL}$ may be a downlink SCS configuration, and the $\mu_{UL}$ may be an uplink SCS configuration.

For the P-CSI report and/or the SP-CSI report, in a case that one CSI reference resource is configured for channel measurement, and the $n_{CSI\_ref}$ corresponds to a valid downlink slot, the $n_{CSI\_ref}$ may be a value that is equal to or greater than a value of $4*2^{\mu_{DL}}$ or $4*2^{\mu_{UL}}$. In addition, in a case that multiple CSI reference resources are configured for channel measurement, and the $n_{CSI\_ref}$ corresponds to a valid downlink slot, the $n_{CSI\_ref}$ may be a value that is equal to or greater than a value of $5*2^{\mu_{DL}}$.

In a case that an A-CSI report is indicated in the DCI (the CSI request field) for allowing the terminal apparatus 1 to report the CSI in the same slot as that of the CSI request, the $n_{CSI\_ref}$ is present in a valid downlink slot that is the same as that of a CSI request to which the reference resource corresponds. Otherwise, in a case that the slot $n-n_{CSI\_ref}$ corresponds to a valid downlink slot, the $n_{CSI\_ref}$ may be a value that is equal to or greater than a predetermined value. The predetermined value may satisfy a delay requirement.

In a case that a periodic and/or semi-persistent CSI-RS and/or CSI-IM or an SSB are used for channel measurement and/or interference measurement, the terminal apparatus 1 may not be expected to measure a channel and/or an interference in the CSI-RS/CSI-IM/SSB in which the last OFDM symbol is received prior to a symbol with a delay requirement taken into account, before a transmission time of the first OFDM symbol of the A-CSI report.

A slot in the serving cell may be a valid downlink slot in a case that it configures a downlink or a flexible symbol configured in at least one-level higher layer and is not within the measurement gap for the terminal apparatus 1.

In a case that there is no valid downlink slot for the CSI reference resource corresponding to the CSI report setting in a certain serving cell, the CSI report may be excluded for the serving cell in the uplink slot n' (it may not be transmitted or may not be included in the CSI report).

After the CSI report (re)-configuration (in which the CSI-ReportConfig is configured), serving cell activation, BWP changing, or activation of the SP-CSI, the terminal apparatus 1 may transmit (report) the CSI report only after reception of the CSI-RS/CSI-IM at least in one among one or multiple CSI-RS transmission occasions for channel measurement and/or one or multiple CSI-IM occasions for interference measurement after the CSI reference resource. Otherwise, the report may be dropped.

In a case that the DRX is configured, the terminal apparatus may transmit (report) the CSI report only after reception of the CSI-RS/CSI-IM at least in one among one or multiple CSI-RS transmission occasions for channel measurement and/or one or multiple CSI-IM occasions for interference measurement at a DRX active time after the CSI reference resource. Otherwise, the report may be dropped.

In a case that a CSI feedback is derived, the terminal apparatus 1 may not describe that at least one CSI-RS resource for the channel measurement overlaps with the CSI-IM resource for the interference measurement or the NZP CSI-RS resource for the interference measurement.

In a case that the terminal apparatus 1 is configured for reporting the CQI index and is further configured for deriving the CQI index, in order to derive the PMI and the RI, at least some or all of the following 15A to 15N may be assumed in the CSI reference resource.

15A) The first two OFDM symbols are occupied through control signaling (the PDCCH, the CORESET).
15B) The number of the PDSCHs and the DMRS symbols is 12.
15C) The same BWP SCS as that at the time of reception of the PDSCH is configured.
15D) The bandwidth is configured for the corresponding CQI report.
15E) The reference resource uses CP length and the SCS configured for the reception of PDSCH.
15F) There is no RE that is used for PSS, SSS, and PBCH.
15G) The value of RV is 0.
15H) A ratio between PDSCH EPRE and CSI-RS EPRE is given based on a predetermined rule.
15I) There is no RE provided for the NZP CSI-RS and the ZP CSI-RS.
15J) The same number of front loaded DM-RS symbols as the maximum number of front loaded symbols configured by the higher layer parameter maxLength in DMRS-DownlinkConFig are assumed.
15K) The same number of additional DM-RS symbols as the number of additional symbols configured by the higher layer parameter dmrs-AdditionalPosition are assumed.
15L) The PDSCH symbol does not include DM-RS.
15M) The PRB band ring size is 2 PRBs.
15N) For calculation of CQI, an antenna port of the PDSCH signal and an antenna port of the CSI-RS have a correspondence relationship in the terminal apparatus 1.

The terminal apparatus 1 may perform aperiodic CSI reporting using the PUSCH of the serving cell based on successful decoding of the DCI format 0_1 that triggers an aperiodic CSI trigger state.

The aperiodic CSI report carried in the PUSCH may support wideband/subband frequency granularity. The aperiodic CSI report carried in the PUSCH may support type I and type II CSI.

The terminal apparatus 1 may perform the semi-persistent CSI reporting in the PUSCH based on successful decoding of the DCI format 0_1 for activating the semi-persistent CSI trigger state. The DCI format 0_1 may include a CSI field indicating the semi-persistent CSI trigger state as being activated or being deactivated. The semi-persistent CSI reporting in the PUSCH may support type I and type II CSI accompanying wideband/subband frequency granularity. The PUSCH resource and the MCS may be disposed in the semi-persistent CSI report by the uplink DCI.

The CSI reporting in the PUSCH may be multiplexed with the uplink data in the PUSCH. The CSI reporting in the PUSCH may also be performed without multiplexing with the uplink data from the terminal apparatus 1.

The type I CSI feedback (type I CSI report) may be supported for CSI reporting in the PUSCH. The type I wideband/subband CSI may be supported for CSI reporting in the PUSCH. The type II CSI may be supported for CSI reporting in the PUSCH.

For type I and type II CSI feedback (type I and type II CSI report) in the PUSCH, the CSI report may be composed of two parts. Part 1 (CSI part 1, part 1 CSI) may have a fixed payload size and used for identifying the number of information bits of Part 2 (CSI part 2, part 2 CSI). Part 1 may be transmitted completely before Part 2.

For the type I CSI feedback, Part 1 may include an RI, a CRI, and/or a CQI for a first codeword. Part 2 includes a PMI and may include a CQI for a second codeword in a case that the RI has a value larger than 4.

For the type II CSI feedback, Part 1 may include an RI, a CQI, and/or an indication of the number of non-zero wideband amplitude coefficients for each layer for the type II CSI. Each field of Part 1 may be individually encoded. Part 2 may include a PMI of the type II CSI. Part 1 and Part 2 may be individually encoded.

The type II CSI report carried in the PUSCH may be calculated independently of any one of the type II CSI reports carried in PUCCH formats 3 and 4.

In a case that the higher layer parameter reportQuantity is configured to be one of 'cri-RSRP' and 'ssb-Index-RSRP', the CSI feedback may be composed of one part.

Although configured for the PUCCH, as an encoding method for both the type I and type II reports transmitted in the PUSCH, the method for the PUCCH may be used.

FIG. 13 is a diagram illustrating an example of a priority report level for a part 2 CSI according to an aspect of the present embodiment. In a case that the CSI report in the PUSCH is composed of two parts, the terminal apparatus 1 may exclude a part of the part 2 CSI. The exclusion of the part 2 CSI may be determined based on FIG. 13. $N_{Rep}$ may be the number of CSI reports configured to be carried in the PUSCH. Priority0 is the highest priority level, and Priority$N_{Rep}$ is the lowest priority level. A CSI report n may correspond to a CSI report accompanying the n-th lowest priority level (the priority level is high) among $N_{Rep}$ CSI reports. One or multiple subbands for a CSI report n indicated by the higher layer parameter csi-ReportingBand may be numbered sequentially in an increasing order from the lowest subband of csi-ReportingBand as subband 0. In a case that the part 2 CSI information for a specific priority level is to be excluded, the terminal apparatus 1 may exclude all the information in the priority level.

In a case that the terminal apparatus 1 is scheduled to transmit the TB in the PUSCH accompanying one or multiple CSI reports, the part 2 CSI may be excluded only in a case that the number of bits mappable to the PUSCH exceeds a predetermined value. In addition, until the number of bits mappable to the PUSCH becomes equal to or smaller than the predetermined value, the part 2 CSI may be excluded sequentially from the part 2 CSI having a low priority level level by level. Furthermore, in a case that the part 2 CSI is transmitted in the PUSCH without accompanying the TB, until the code rate of the part 2 CSI becomes lower than a threshold code rate, the part may be excluded in order from one or multiple bits having a low priority level.

In a case that an active semi-persistent CSI report configuration is configured in the PUSCH in the terminal apparatus 1, the CSI direction may be deactivated in a case that the downlink BWP or the uplink BWP is changed.

Another activation command may be required for validating the semi-persistent CSI report.

The terminal apparatus 1 may be semi-statically configured by a higher layer to perform periodic CSI reporting in the PUCCH. The terminal apparatus 1 may be configured by a higher layer for one or multiple periodic CSI reports corresponding to one or multiple related CSI report settings configured by the higher layer. The periodic CSI reporting in PUCCH formats 2, 3, and 4 may support Type I CSI accompanying wideband frequency granularity.

After the HARQ-ACK corresponding to the PDSCH that carries a selection command is transmitted in the slot n, the terminal apparatus 1 may perform the semi-persistent CSI reporting in the PUCCH to which start from the slot n+3 $N^{subframe\mu}_{slot}+1$ is applied. The selection command may include one or multiple CSI report settings with the associated CSI resource setting configured. The semi-persistent CSI report at PUCCH may support the type I CSI. The semi-persistent CSI report in PUCCH format 2 may support type I CSI accompanying wideband frequency granularity. The semi-persistent CSI reporting in PUCCH format 3 or 4 may support type I CSI and type II CSI part 1 accompanying wideband/subband frequency granularity.

In a case that the PUCCH carries the type I CSI accompanying the wideband frequency granularity, CSI payloads carried in accordance with the PUCCH format 2 and the PUCCH format 3 or 4 may be identified and may be the same regardless of the RI and the CRI. For the type I CSI subband reporting in the PUCCH format 3 or 4, the payload may be divided into two parts. A first part may include the RI, the CRI, and/or the CQI for the first codeword. A second part includes the PMI and may include the CQI for the second codeword in a case that the value of the RI is greater than 4.

Although the semi-persistent reports carried in the PUCCH format 3 or 4 support the type II CSI feedback, only Part 1 of the type II CSI feedback may be supported. Supporting of the type II CSI report in the PUCCH format 3 or 4 may be determined based on the capability information of the terminal apparatus 1. The type II CSI report carried in the PUCCH format 3 or 4 may be calculated independently from one or multiple type II CSI reports carried in the PUSCH.

In a case that the CSI report in the PUCCH format 2, 3, or 4 is configured in the terminal apparatus 1, each PUCCH resource may be configured for each candidate UL BWP.

In a case that the active semi-persistent CSI report configuration is configured in the PUCCH in the terminal apparatus 1, and that a deactivation command has not been received, the CSI reporting is executed in a case that the BWP configured such that reporting is executed is an active BWP, and the CSI reporting may be postponed otherwise.

In a case that the PUCCH format 4 is configured, the terminal apparatus 1 may not be expected to report a CSI accompanying a payload size larger than 115 bits. In a case that, for one or multiple CSI reports transmitted in the PUCCH, each of all the CSI reports is composed of one part, the terminal apparatus 1 may exclude some of the one or multiple CSI reports. The exclusion of the CSI may be determined based on a predetermined priority rule. The CSI report may continue to exclude a CSI having a low priority level until the CSI report code rate becomes a value that is the same as a threshold configured by the higher layer parameter maxCodeRate or a value lower than the threshold.

In a case that one of the one or multiple CSI reports is composed of two parts, the terminal apparatus 1 may exclude a part of the part 2 CSI. The exclusion of the part 2 CSI may be performed similar to that illustrated in FIG. 13. In addition, the part 2 CSI may continue to exclude a CSI having a low priority level until the part 2 CSI code rate becomes a value that is the same as a threshold configured by the higher layer parameter maxCodeRate or a value lower than the threshold.

In a case that the semi-persistent CSI report carried in the PUSCH simultaneously overlaps with transmission of the PUSCH data of one or multiple symbols, and that the earliest symbol in such a PUSCH channel is not earlier than the last symbol of the DCI scheduling the PUSCH by $N_2+D_2$ (in other words, a predetermined timing, a predetermined time interval), the CSI report may not be transmitted. Otherwise, the timeline request condition is not satisfied, and thus an error case may be determined.

The terminal apparatus 1 transmits a first PUSCH including one or multiple semi-persistent CSI reports and a second PUSCH including a UL-SCH, and, in a case that the transmission of the first PUSCH overlaps with the transmission of the second PUSCH, the terminal apparatus 1 may transmit the second PUSCH without transmitting the first PUSCH. In a case that at least one of the transmission of the first PUSCH and the transmission of the second PUSCH relates to detection of the DCI format using the terminal apparatus 1, the terminal apparatus 1 may expect that the transmission of the first PUSCH and the transmission of the second PUSCH satisfy the above-described time condition for the overlapping transmission of the PUSCH.

The CSI reporting procedure described above may be applied in a case that the size of the LBT subband is the same as the size of the BWP in the NR-U cell.

In a case that the size of one LBT subband is a value (the number of PRBs, bandwidth) that is the same as or larger than the BWP size in the serving cell, in a case that the BWP is included in the LBT subband in the frequency domain, in other words, in a case that the BWP is present in the LBT subband, and in a case that the CSI-RS is indicated as being punctured in the LBT subband, the terminal apparatus 1 may not update the CSI in the BWP and may not transmit the CSI for the subband which has not been updated and/or of which the CSI-RS could not be measured (or has not been measured) as a CSI report.

Here, in the LBT subband, the CSI-RS being punctured may mean that there is notransmission of the CSI-RS in the frequency domain of a certain LBT subband. For example, before transmitting the SSB and/or the PDCCH and/or the PDSCH and/or the CSI-RS, the base station apparatus 3 performs the CAP in each LBT subband and, in an LBT subband in which the channel has not been evaluated as being clear in each LBT subband, the base station apparatus 3 may not transmit a certain downlink signal including the CSI-RS. In other words, the base station apparatus 3 may transmit one downlink signal including the CSI-RS in the LBT subband of which channel is determined to be clear. Similarly, the terminal apparatus 1 may transmit any uplink signal in the LBT subband of which channel is determined to be clear. The terminal apparatus 1 may not transmit any uplink signal in the LBT subband of which channel is determined not to be clear.

The base station apparatus 3 may not expect a corresponding CSI report to be transmitted from the terminal apparatus 1 in an LBT subband indicating that the CSI-RS is punctured.

In a case that, in the frequency domain, the frequency domain of a part of the BWP is included in the LBT subband (in other words, in a case that the frequency domain of the BWP and a part of the frequency domain of the LBT subband overlap each other) and/or in a case that one BWP overlaps with multiple LBT subbands, and in a case that cqi-FormatIndicator of the CSI-ReportConfig for the BWP indicates a wideband CQI, the terminal apparatus 1 may not update the CQI for the BWP and may not transmit the CSI including the wideband CQI that has not been updated as a CSI report, in a case that at least one LBT subband among the multiple LBT subbands indicates that the CSI-RS is punctured. In addition, under these circumstances, in a case that the cqi-FormatIndicator indicates the subband CQI, the terminal apparatus 1 may not update the subband CQI for each of one or multiple subbands overlapping with one or multiple LBT subbands of which the CSI-RS has been punctured and may transmit a CSI acquired by excluding one or multiple subband CQIs which have not been updated and/or of which the CSI-RS could not be measured as a CSI report. In other words, for one or multiple subbands overlapping with one or multiple LBT subbands of which the CSI-RS has not been punctured, the terminal apparatus 1 may calculate and update a subband CQI, may transmit a CSI including one or multiple subband CQIs that have been updated as a CSI report, and may not transmit one or multiple subband CQIs which have not been updated and/or of which the CSI-RS could not be measured (or has not been measured).

In a case that, in the frequency domain, the frequency domain of a part of the BWP is included in the LBT subband (in other words, a case that the frequency domain of the BWP and a part of the frequency domain of the LBT subband overlap each other and/or a case that one BWP overlaps with multiple LBT subbands), and in a case that the pmi-FormatIndicator of CSI-ReportConfig for the BWP indicates a wideband PMI, the terminal apparatus 1 may not update the PMI for the BWP and may not transmit a CSI including the wideband PMI that has not been updated as a CSI report, in a case that at least one LBT subband among the multiple LBT subbands indicates that the CSI-RS is punctured. In addition, under these circumstances, in a case that the pmi-FormatIndicator indicates the subband PMI, the terminal apparatus 1 may not update the subband PMI for each of one or multiple subbands overlapping with the LBT subband of which the CSI-RS has been punctured and may transmit an CSI acquired by excluding the subband PMI that has not been updated as a CSI report. In other words, the terminal apparatus 1 may calculate and update the subband PMI for each of one or multiple subbands overlapping with one or multiple LBT subbands of which the CSI-RS has not been punctured, may transmit a CSI including one or multiple subband PMIs that have been updated as a CSI report, and may not transmit one or multiple subband PMIs that have not been updated and/or of which the CSI-RS could not been measured (or has not been measured).

The LBT subband may be configured for causing the terminal apparatus 1 and/or the base station apparatus 3 to perform the LBT (in other words, the CCA and/or the CAP) and indicate a frequency domain (in other words, a channel, an NR-U carrier, an NR-U BWP) used for determining whether the channel is clear. For example, the size of the frequency domain of the LBT subband may be 20 MHz (in other words, a predetermined value), may be the number of PRBs corresponding to 20 MHz (in other words, a predetermined value), or may be configured as a higher layer parameter. The start RB indicating the start position of the frequency domain used for defining the LBT subband and the bandwidth (the number of PRBs) may be configured as higher layer parameters. In a case that at least one LBT subband is configured, and in a case that uplink transmission and downlink transmission are performed in the same operating band, the frequency domain and the time domain of the LBT subband may be common to the terminal apparatus 1 and the base station apparatus 3 and/or a common configuration, and/or common recognition. The LBT subband may also be referred to as an LBT carrier (a CCA carrier, a CAP carrier), an LBT band (a CCA band, a CAP band), or LBT-BWP (CCA-BWP, CAP-BWP).

The subband and the wideband used for the CSI measurement including the CQI measurement and/or PMI measurement (in other words, CSI measurement for performing CQI calculation and/or PMI calculation) may also be referred to as a CSI subband and a CSI wideband, respectively. Similarly, the subband and wideband used for the CQI measurement may also be referred to as a CQI subband and a CQI wideband, respectively. The subband and wideband used for the PMI measurement may also be referred to as a PMI subband and a PMI wideband, respectively. In addition, the CSI subband/wideband may be a generic term in a case that it includes one or both of the CQI subband/wideband and the PMI subband/wideband. The bandwidth (the number of PRBs) of the CSI wideband may be the same value as the bandwidth configured for the CSI report band. Alternatively, the CSI report band may be composed of one or multiple CSI subbands.

Figure 14:
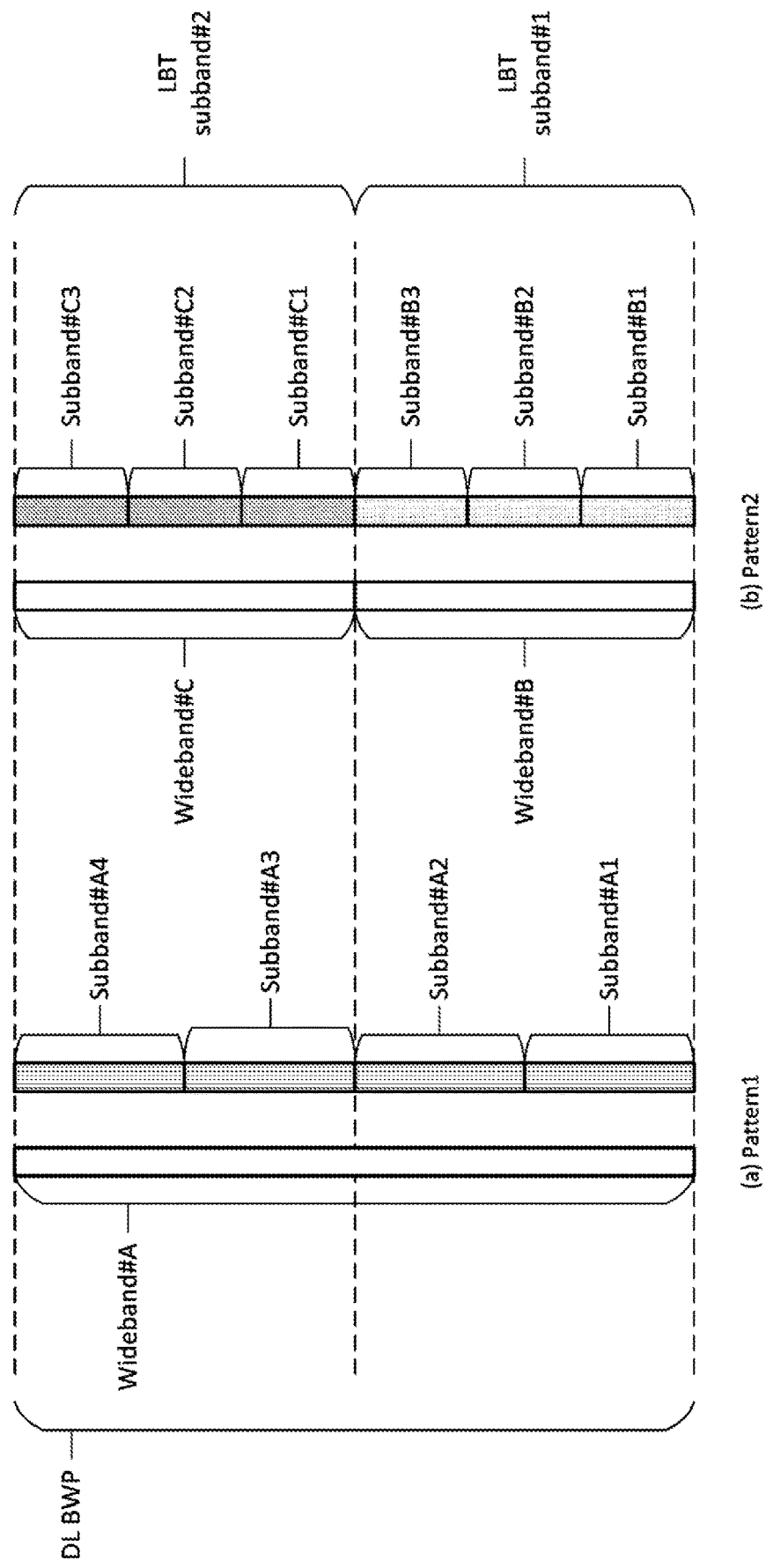
FIG. 14 is a diagram illustrating an example of a mapping pattern of a CSI wideband and a CSI subband according to one aspect of the present embodiment.

FIG. 14 is a diagram illustrating an example of mapping patterns of a CSI wideband and a CSI subband according to an aspect of the present embodiment. FIG. 14(*a*) illustrates an example in which start RBs and bandwidths of the DL BWP and the CSI wideband overlap each other. FIG. 14(*b*) illustrates an example in which start RBs and bandwidths of LBT subbands and the CSI widebands overlap each other.

In the terminal apparatus 1 and the base station apparatus 3, for example, a case that acquisition of the COT can be indicated (in other words, a case that such a capability is supported) for each of an LBT subband #1 and an LBT subband #2 in accordance with the DCI format 2_0 and a case that acquisition of the COT is indicated for both the LBT subband #1 and the LBT subband #2 will be described. In FIG. 14(*a*), in accordance with one or multiple CSI-ReportConfigs configured in the terminal apparatus 1, the terminal apparatus 1 can update and report the value of each of the wideband CQI and/or the wideband PMI for the wideband #A and can update and report the value of each of the subband CQI and/or the subband PMI for each of a subband #A1 to a subband #A4. In a case that a priority rule of the CSI report is applied, the priority level of the wideband CSI (CQI/PMI) for the wideband #A may be the highest, and the priority level may be lowered in order from the subband #A1. In FIG. 14(*b*), in accordance with one or multiple CSI-ReportConfigs configured in the terminal apparatus 1, the terminal apparatus 1 can update and report the value of each of the wideband CQI and/or the wideband PMI for each of a wideband #B and/or a wideband #C and can update and report the value of each of the subband CQI and the subband PMI for each of a subband #B1 to a subband #B3 and a subband #C1 to a subband #C3. In a case that a priority rule of the CSI report is applied, the priority level of the wideband CSI (CQI/PMI) for the wideband #B and/or the wideband #C may be the highest, the priority level may be lowered in order from the subband #B1 to the subband #C3, and, for the subbands, the priority level may be lowered in order of the subband #B1, the subband #C1, the subband #B2, the subband #C2, . . . , the subband #C3. In this case, the cqi-FormatIndicator may be either a wideband CQI or a subband CQI, and even in a case that the pmi-FormatIndicator is either a wideband PMI or a subband PMI, the terminal apparatus 1 can report the CSI of the relating CSI-ReportConfig. The base station apparatus 3 may assume the type and number of the CSI to be reported and the number of bits for the CSI based on the DCI format 2_0.

In a case that the channel is determined to be clear in the LBT subband, and the LBT is considered to be successful, the base station apparatus 3 and/or the terminal apparatus 1 may transmit physical signals/physical channels in the LBT subband. In accordance with the LBT being successful, the base station apparatus 3 and/or the terminal apparatus 1 may determine that the COT has been able to be acquired.

Next, in FIG. 14, in a case that acquisition of the COT has been indicated in only one of the two LBT subbands in accordance with the DCI format 2_0, for example, a case that, although the COT could be acquired in the LBT subband #1, the COT could not be acquired in the LBT subband #2 will be described. In FIG. 14($a$), in accordance with one or multiple CSI-ReportConfigs configured in the terminal apparatus 1, the terminal apparatus 1 may not update or report the values of the wideband CQI and/or the wideband PMI for the wideband #A. The terminal apparatus 1 may update and report the values of the subband CQI and/or the subband PMI for each of the subband #A1 and/or the subband #A2. The terminal apparatus 1 may not update or report the values of the subband CQI and the subband PMI for each of the subband #A3 and the subband #A4. In FIG. 14($a$), the wideband CQI may be calculated with the mapped CSI-RS of the LBT subband #2 excluded. In FIG. 14($b$), in accordance with one or multiple CSI-ReportConfigs configured in the terminal apparatus 1, the terminal apparatus 1 may update and report the value of each of the wideband CQI and the wideband PMI for a wideband #B. The terminal apparatus 1 may not update or report the value of each of the wideband CQI and/or the wideband PMI for a wideband #C. The terminal apparatus 1 may update and report the value of each of the subband CQI and/or the subband PMI for each of the subband #B1 to the subband #B3. The terminal apparatus 1 may not update or report the value of each of the subband CQI and/or the subband PMI for each of a subband #C1 to a subband #C3.

In the case of FIG. 14($b$), the CSI report band can be configured for each LBT subband, and thus, the configuration associated with the CSI report and/or the maximum number of higher layer parameters such as the number of CSI-RS resources (the NZP CSI-RS resource and/or the CSI-IM resource) and/or the number of CSI-RS resources for each resource set and/or the number of CSI-RS resource sets and/or the number of CSI resource configurations, the number of CSI-ReportConfigs, and the like that can be configured for one BWP may be expanded.

In the case of FIG. 14($a$) and/or FIG. 14($b$), an ID for identifying an LBT subband (for example, the LBT subband ID) may be configured as a higher layer parameter. In particular, in the case of FIG. 14($b$), the LBT subband ID may be included in CSI-ReportConfig. The base station apparatus 3 may enable reporting of the wideband CSI and/or the subband CSI to be triggered for each LBT subband.

In the interference measurement, as illustrated in FIG. 14($b$), in a case that the CSI-IM resource can be individually configured for each LBT subband, and that the acquisition status of the COT is indicated for each LBT subband, the terminal apparatus 1 can perform interference measurement in the LBT subband of which the COT has been acquired and report results thereof.

Although FIG. 14 illustrates a case that two LBT subbands are configured for one BWP, the description can be similarly applied even to a case that the number of LBT subbands configured in one BWP are more than two.

In FIG. 14, a guard band may be configured between the LBT subband #1 and the LBT subband #2. In such a case, in the CSI report band including the guard band, the wideband CQI, the wideband PMI, the subband CQI, and the subband PMI may be calculated with the CSI-RS mapping to the guide band taken into account.

In a case that the wideband CQI and/or the wideband PMI have not been updated, the associated RI and/or the CRI may not be updated, and the associated RI and/or the CRI may not be reported.

In a case that multiple LBT subbands are configured for one BWP, one or multiple NZP-CSI-RS-Resources and/or one or multiple csi-IM-Resources may be configured for each LBT subband, and one or multiple CSI-ReportConfigs may be configured. In other words, for each LBT subband, one or multiple CSI-RS resources may be configured such that the wideband CQI/PMI and the subband CQI/PMI can be calculated, and one or multiple CSI-ReportConfigs may be configured.

The start RB and the bandwidth of each of the BWP and/or the carrier and/or the serving cell and the start RB and the bandwidth of each of the CSI report bands may not coincide with each other. In other words, the start RB and the bandwidth of each of the BWP and/or the carrier and/or the serving cell and the start RB and the bandwidth of each of the CSI report bands may be individually configured.

Various aspects of apparatuses according to one aspect of the present embodiment will be described below.

(1) To accomplish the object described above, aspects of the present disclosure are contrived to provide the following measures. In other words, a first aspect of the present disclosure is a terminal apparatus including: a radio transmission and/or reception unit configured to transmit a random access preamble and monitor a corresponding random access response (RAR) in a random access procedure; and a Medium Access Control (MAC) layer processing unit configured to increment a value of a preamble transmission counter used for counting the number of times of transmission of the random access preamble in a case that reception of the RAR is considered to be unsuccessful, in which the radio transmission and/or reception unit performs a Clear Channel Assessment (CCA) before transmission of the random access preamble in a New Radio-Unlicensed (NR-U) carrier and sets an initial value $N_{init}$ used for determining a measurement period for the CCA to a counter N, and the $N_{init}$ is determined based on the value (CW size) of a Contention Window (CW) configured for at least the random access preamble before the $N_{init}$ is set in the N, and the value of the CW is updated in a case that a value of the preamble transmission counter has incremented.

(2) A second aspect of the present disclosure is the terminal apparatus according to the first aspect, in which, in the random access procedure, in a case that reception of the RAR is successful, a PUSCH (Msg3) corresponding to the RAR is transmitted, a contention resolution message (Msg4) corresponding to the Msg3 is monitored, and in a case that reception of the Msg4 is considered to be unsuccessful in the NR-U carrier, the value of the preamble transmission counter is incremented, and the value of the CW is updated.

(3) A third aspect of the present disclosure is a method used for a terminal apparatus, the method comprising: transmitting a random access preamble and monitoring a corresponding random access response (RAR) in a random access procedure; incrementing a value of a preamble transmission counter used for counting the number of times of transmission of the random access preamble in a case that reception of the RAR is considered to be unsuccessful; performing a Clear Channel Assessment (CCA) before transmission of the random access preamble in a New Radio-Unlicensed (NR-U) carrier and setting an initial value $N_{init}$ used for determining a measurement period for the CCA to a counter N, and the $N_{init}$ is determined based on the value (CW size) of a Contention Window (CW) configured for at least the random access preamble before the $N_{init}$ is set in the N, and the value of the CW is updated in a case that a value of the preamble transmission counter has incremented.

(4) A fourth aspect of the present disclosure is the method of the third aspect, in which, in the random access procedure, in a case that reception of the RAR is successful, a PUSCH (Msg3) corresponding to the RAR is transmitted, a contention resolution message (Msg4) corresponding to the Msg3 is monitored, and in a case that reception of the Msg4 is considered to be unsuccessful in the NR-U carrier, the value of the preamble transmission counter is incremented, and the value of the CW is updated.

(5) A fifth aspect of the present disclosure is a base station apparatus including a radio transmission and/or reception unit configured to transmit a Physical Downlink Control Channel (PDCCH) order for performing resource assignment of a random access preamble and monitor the random access preamble corresponding to the PDCCH order after transmission of the PDCCH order, in which the radio transmission and/or reception unit performs a Clear Channel Assessment (CCA) before transmission of the PDCCH order in a New Radio-Unlicensed (NR-U) carrier and sets an initial value $N_{init}$ used for determining a measurement period for the CCA as a value of a counter N, and the $N_{init}$ is determined based on the value (CW size) of a Contention Window (CW) configured for at least the PDCCH order before the $N_{init}$ is set in the N, and the value of the CW is updated in a case that reception of the random access preamble is considered to be unsuccessful.

(6) A sixth aspect of the present disclosure is a base station apparatus including: a radio transmission and/or reception unit configured to receive a random access preamble, transmit a corresponding random access response (RAR), and monitor a PUSCH (Msg3) corresponding to the RAR after transmission of the RAR in a random access procedure, in which the radio transmission and/or reception unit performs a Clear Channel Assessment (CCA) before transmission of the RAR in a New Radio-Unlicensed (NR-U) carrier and sets an initial value $N_{init}$ used for determining a measurement period for the CCA as a value of a counter N, and the $N_{init}$ is determined based at least on the value (CW size) of a Contention Window (CW) configured for the RAR before the $N_{init}$ is set in the N, and the value of the CW is updated in a case that reception of the Msg3 is considered to be unsuccessful.

(7) A seventh aspect of the present disclosure is a method used in a base station apparatus, the method comprising: transmitting a Physical Downlink Control Channel (PDCCH) order for performing resource assignment of a random access preamble; monitoring the random access preamble corresponding to the PDCCH order after transmission of the PDCCH order; performing a Clear Channel Assessment (CCA) before transmission of the PDCCH order in a New Radio-Unlicensed (NR-U) carrier; and setting an initial value $N_{init}$ used for determining a measurement period for the CCA as a value of a counter N, in which the $N_{init}$ is determined based on the value (CW size) of a Contention Window (CW) configured for at least PDCCH order before the $N_{init}$ is set in the N, and the value of the CW is updated in a case that reception of the random access preamble is considered to be unsuccessful.

(8) An eighth aspect of the present disclosure is a method used in a base station apparatus, the method comprising: receiving a random access preamble in a random access procedure; transmitting a corresponding random access response (RAR); monitoring a PUSCH (Msg3) corresponding to the RAR after transmission of the RAR; performing a Clear Channel Assessment (CCA) before transmission of the RAR in a New Radio-Unlicensed (NR-U) carrier; and setting an initial value $N_{init}$ used for determining a measurement period for the CCA as a value of a counter N, in which, the $N_{init}$ is determined based at least on the value (CW size) of a Contention Window (CW) configured for the RAR before the $N_{init}$ is set in the N, and the value of the CW is updated in a case that reception of the Msg3 is considered to be unsuccessful.

(9) A ninth aspect of the present disclosure is a terminal apparatus including: a physical layer processing unit configured to receive a higher layer signal including a scheduling request configuration (SR configuration) and a physical uplink control channel configuration (PUCCH configuration); and a Medium Access Control (MAC) layer processing unit configured to indicate the physical layer processing unit of transmission of an SR for new transmission in an uplink shared channel (UL-SCH), in which the physical layer processing unit performs a Clear Channel Assessment (CCA) based on a type of the channel access procedure before transmission of the PUCCH including the SR in a New Radio-Unlicensed (NR-U) carrier and sets an initial value $N_{init}$ used for determining a measurement period for the CCA to a counter N, in which the $N_{init}$ is determined based on the value (CW size) of a Contention Window (CW) configured for at least the SR before the $N_{init}$ is set to the N, and, in a case in which there are more than one allowed values of the CW that is configurable, the value of the CW is updated in a case that the value of the SR counter is incremented.

(10) A tenth aspect of the present disclosure is the terminal apparatus according to the ninth aspect, in which, the physical layer processing unit sets the value of the CW to an initial value $CW_{min}$ in a case that, after transmission of the SR, an uplink grant for the new transmission of the UL-SCH is detected.

(11) An eleventh aspect of the present disclosure is the terminal apparatus according to the ninth aspect, in which the physical layer processing unit sets the value of the CW to an initial value $CW_{min}$ in a case that the value of the SR counter is set to 0.

(12) A twelfth aspect of the present disclosure is a method used in a terminal apparatus, the method including: receiving a higher layer signal including a scheduling request configuration (SR configuration) and a physical uplink control channel configuration (PUCCH configuration); indicating the physical layer processing unit of transmission of an SR for new transmission in an uplink shared channel (UL-SCH); performing a Clear Channel Assessment (CCA) based on a type of the channel access procedure before transmission of the PUCCH including the SR in a New Radio-Unlicensed (NR-U) carrier; and setting an initial value $N_{init}$ used for determining a measurement period for the CCA to a counter N, in which the $N_{init}$ is determined based on the value (CW size) of a Contention Window (CW) configured for at least the SR before the $N_{init}$ is set to the N, and, in a case in which there are more than one allowed value of the CW that are configurable, the value of the CW is updated in a case that the value of the SR counter is incremented.

(13) A thirteenth aspect of the present disclosure is a terminal apparatus including: a receiver configured to receive at least a channel state information-reference signal (CSI-RS) in a bandwidth part (BWP); a measurer configured to measure and evaluate one or more values of a channel quality indicator (CQI) by using at least the CSI-RS, the CQI including a wideband CQI or a subband CQI, the measurer further configured to measure and update a value of the wideband CQI in a case that an indicator, corresponding to the BWP, indicates the wideband CQI, and at least one of a first condition and a second condition is not satisfied; and a transmitter configured to transmit a CSI report including the value of the wideband CQI. The first condition is that the BWP is in an unlicensed carrier and a plurality of Listen Before Talk (LBT) subbands are configured in the BWP, and the second condition is that an LBT failure is indicated for at least one LBT subband among the plurality of LBT subbands.

(14) A fourteenth aspect of the present disclosure is the terminal apparatus according to the thirteenth aspect, the measurer is further configured to update one or more values of the subband CQI for the plurality of LBT subbands in a case that the indicator indicates the subband CQI.

(15) A fifteenth aspect of the present disclosure is a method used in a terminal apparatus, the method including: receiving at least a CSI-RS in a BWP; measuring and evaluating one or more values of a CQI by using at least the CSI-RS, the CQI including a wideband CQI or a subband CQI; measuring and updating a value of the wideband CQI in a case that an indicator, corresponding to the BWP, indicates the wideband CQI, and at least one of a first condition and a second condition is not satisfied; and transmitting a CSI report including the value of the wideband CQI. The first condition is that the BWP is in an unlicensed carrier and a plurality of LBT subbands are configured in the BWP, and the second condition is that an LBT failure is indicated for at least one LBT subband among the plurality of LBT subbands.

(16) A sixteenth aspect of the present disclosure is the method according to the fifteenth aspect, further including updating one or more values of the subband CQI for the plurality of LBT subbands in a case that the indicator indicates the subband CQI.

Each of programs operating in the base station apparatus 3 and the terminal apparatus 1 according to the present disclosure may be a program (a program causing a computer to function) that controls a Central Processing Unit (CPU) and the like such that the functions of the above-described embodiment according to the present disclosure are realized. The information handled in these apparatuses is temporarily stored in a Random Access Memory (RAM) at the time of processing thereof, and thereafter, the information is stored in various types of Read Only Memory (ROM) such as a Flash ROM and a Hard Disk Drive (HDD) and is read by the CPU as is necessary and is modified or rewritten.

Note that the terminal apparatus 1 and the base station apparatus 3 according to the above-described embodiment may be partially achieved by a computer. In such a case, a program for realizing such control functions may be recorded on a computer-readable recording medium to cause a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system.

The "computer-readable recording medium" may include a medium that dynamically retains the program for a short period of time, such as a communication line that is used to transmit the program over a network such as the Internet or over a communication line such as a telephone line, and a medium that retains, in that case, the program for a certain period of time, such as a volatile memory within the computer system which functions as a server or a client. Furthermore, the above-described program may be configured to realize some of the functions described above, and, furthermore, may be configured to realize the functions described above in combination with a program already recorded in the computer system.

Furthermore, the base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group is required to have a complete set of functions or functional blocks of the base station apparatus 3. Furthermore, the terminal apparatus 1 according to the above-described embodiment can also communicate with the base station apparatus as the aggregation.

Moreover, the base station apparatus 3 according to the above-described embodiment may be an Evolved Universal Terrestrial Radio Access Network (EUTRAN) and/or a NextGen RAN (NG-RAN) or NR RAN. Moreover, the base station apparatus 3 according to the above-described embodiment may have some or all of the functions of a higher node for an eNodeB and/or a gNB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case that with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present disclosure is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present disclosure have been described in detail above referring to the drawings, but the specific configuration is not limited to the embodiments and include, for example, an amendment to a design and the like that fall within the scope that does not depart from the gist of the present disclosure. Various modifications are possible within the scope of the present disclosure defined by claims, and embodiments that are made by suitably combining technical means disclosed according to the different embodiments are also included in the technical scope of the present disclosure. Furthermore, a configuration in which constituent elements, described in the respective embodiments and having mutually the same effects, are substituted for one another is also included in the technical scope of the present disclosure.

What is claimed is:

1. A terminal apparatus, comprising:
   a receiver configured to receive at least a channel state information-reference signal (CSI-RS) in a bandwidth part (BWP);
   a measurer configured to measure and evaluate one or more values of a channel quality indicator (CQI) by using at least one of the CSI-RS and the CQI including a wideband CQI or a subband CQI,
   the measurer further configured to measure and update a value of the wideband CQI in a case that an indicator, corresponding to the BWP, indicates the wideband CQI, and at least one of a first condition and a second condition is not satisfied; and
   a transmitter configured to transmit a CSI report including the value of the wideband CQI, wherein:
   the first condition is that the BWP is in an unlicensed carrier and a plurality of Listen Before Talk (LBT) subbands is configured in the BWP,
   the second condition is that an LBT failure is indicated for at least one LBT subband among the plurality of LBT subbands, and
   the measurer is further configured to update one or more values of the subband CQI for the plurality of LBT subbands in a case that the indicator indicates the subband CQI.

2. The terminal apparatus according to claim 1, wherein in a case that the first condition and the second condition are satisfied, the measurer is further configured to update a value of the subband CQI for at least one of the plurality of LBT subbands in which an LBT is successful and does not update a value of the subband CQI for at least one of the plurality of LBT subbands in which the LBT is unsuccessful.

3. The terminal apparatus according to claim 1, wherein the indicator is a cqi-FormatIndicator.

4. A method comprising:
   receiving at least a channel state information-reference signal (CSI-RS) in a bandwidth part (BWP);
   measuring and evaluating one or more values of a channel quality indicator (CQI) by using at least one of the CSI-RS and the CQI including a wideband CQI or a subband CQI;
   measuring and updating a value of the wideband CQI in a case that an indicator, corresponding to the BWP, indicates the wideband CQI, and at least one of a first condition and a second condition is not satisfied;
   transmitting a CSI report including the value of the wideband CQI, wherein:
   the first condition is that the BWP is in an unlicensed carrier and a plurality of Listen Before Talk (LBT) subbands is configured in the BWP,
   the second condition is that an LBT failure is indicated for at least one LBT subband among the plurality of LBT subbands; and
   updating one or more values of the subband CQI for the plurality of LBT subbands in a case that the indicator indicates the subband CQI.

5. The method according to claim 4, further comprising;
   in a case that the first condition and the second condition are satisfied,
   updating a value of the subband CQI for at least one of the plurality of LBT subbands in which an LBT is successful; and
   not updating a value of the subband CQI for at least one of the plurality of LBT subbands in which the LBT is unsuccessful.

6. The method according to claim 4, wherein the indicator is a cqi-FormatIndicator.

* * * * *

UNITED STATES PATENT AND TRADEMARK OFFICE
CERTIFICATE OF CORRECTION

PATENT NO. : 11,997,048 B2  
APPLICATION NO. : 17/289967  
DATED : May 28, 2024  
INVENTOR(S) : Wataru Ouchi et al.

Page 1 of 1

It is certified that error appears in the above-identified patent and that said Letters Patent is hereby corrected as shown below:

On the Title Page

Please replace Item (54) and in the Specification Column 1, Line 1, with the following:
TERMINAL APPARATUS AND METHOD Signed and Sealed this
Eleventh Day of February, 2025

Coke Morgan Stewart
*Acting Director of the United States Patent and Trademark Office*